(12) United States Patent
Zhang et al.

(10) Patent No.: US 9,768,996 B2
(45) Date of Patent: *Sep. 19, 2017

(54) COMPRESSED ORTHOGONAL FREQUENCY DIVISION MULTIPLEXING (OFDM) SYMBOLS IN A WIRELESS COMMUNICATION SYSTEM

(71) Applicant: Marvell World Trade Ltd., St. Michael (BB)

(72) Inventors: Hongyuan Zhang, Fremont, CA (US); Xiayu Zheng, San Jose, CA (US); Rui Cao, Fremont, CA (US); Mingguang Xu, San Jose, CA (US); Sudhir Srinivasa, Campbell, CA (US); Jie Huang, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,927

(22) Filed: Jul. 18, 2016

(65) Prior Publication Data

US 2017/0019281 A1 Jan. 19, 2017

Related U.S. Application Data

(63) Continuation of application No. 14/737,316, filed on Jun. 11, 2015, now Pat. No. 9,397,873.
(Continued)

(51) Int. Cl.
*H04L 27/00* (2006.01)
*H04L 27/26* (2006.01)
(Continued)

(52) U.S. Cl.
CPC ......... *H04L 27/2602* (2013.01); *H04B 7/066* (2013.01); *H04L 1/0009* (2013.01);
(Continued)

(58) Field of Classification Search
CPC .. H04L 27/2613; H04L 5/0023; H04W 84/12; H04B 7/0452
(Continued)

(56) References Cited

U.S. PATENT DOCUMENTS 6,031,874 A 2/2000 Chennakeshu et al.
6,397,368 B1 5/2002 Yonge, III et al.
(Continued)

FOREIGN PATENT DOCUMENTS

EP 1432166 A2 6/2004
EP 1601117 A2 11/2005
(Continued)

OTHER PUBLICATIONS

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).
(Continued)

*Primary Examiner* — David S Huang

(57) ABSTRACT

One or more first padding bits are added to information bits to be included in a data portion of a data unit such that the information bits, after being encoded, fill one or more OFDM symbols up to a boundary within a last OFDM symbol. The information bits and the first padding bits are encoded to generate coded bits. After encoding, coded bits corresponding to the last OFDM symbol are padded, or constellation points generated based on the coded bits corresponding to the last OFDM symbol are padded, such that the padded coded bits or the padded constellation points occupy a remaining portion of the last OFDM symbol after
(Continued)

the boundary. The last OFDM symbol of the data portion is generated to include the coded information bits corresponding to the last OFDM symbol, the first padding bits and second padding bits or padding constellation points added after encoding.

20 Claims, 19 Drawing Sheets

Related U.S. Application Data

(60) Provisional application No. 62/168,652, filed on May 29, 2015, provisional application No. 62/148,456, filed on Apr. 16, 2015, provisional application No. 62/094,825, filed on Dec. 19, 2014, provisional application No. 62/087,083, filed on Dec. 3, 2014, provisional application No. 62/051,089, filed on Sep. 16, 2014, provisional application No. 62/041,858, filed on Aug. 26, 2014, provisional application No. 62/034,502, filed on Aug. 7, 2014, provisional application No. 62/027,525, filed on Jul. 22, 2014, provisional application No. 62/010,787, filed on Jun. 11, 2014.

(51) Int. Cl.
  H04L 1/00 (2006.01)
  H04L 5/00 (2006.01)
  H04B 7/06 (2006.01)

(52) U.S. Cl.
  CPC .......... *H04L 1/0057* (2013.01); *H04L 5/0007* (2013.01); *H04L 5/0046* (2013.01); *H04L 27/2605* (2013.01); *H04L 27/2627* (2013.01); *H04L 27/2628* (2013.01); *H04L 27/2634* (2013.01)

(58) Field of Classification Search
  USPC .......................................................... 375/295
  See application file for complete search history.

(56) References Cited

U.S. PATENT DOCUMENTS

| | | | |
|---|---|---|---|
| 6,553,534 B2 | 4/2003 | Yonge, III et al. | |
| 6,598,200 B1 | 7/2003 | Greenwood et al. | |
| 6,975,837 B1 | 12/2005 | Santoru | |
| 7,334,181 B2 | 2/2008 | Eroz et al. | |
| 7,346,007 B2 | 3/2008 | Curcio et al. | |
| 7,599,332 B2 | 10/2009 | Zelst et al. | |
| 7,742,390 B2 | 6/2010 | Mujtaba | |
| 7,859,987 B2 | 12/2010 | Ouyang et al. | |
| 8,054,739 B2 | 11/2011 | Nakao et al. | |
| 8,077,669 B2 | 12/2011 | Kim | |
| 8,077,696 B2 | 12/2011 | Izumi et al. | |
| 8,116,290 B2 | 2/2012 | Moorti et al. | |
| 8,144,647 B2 | 3/2012 | Nabar et al. | |
| 8,149,811 B2 | 4/2012 | Nabar et al. | |
| 8,155,138 B2 | 4/2012 | van Nee | |
| 8,175,119 B2 | 5/2012 | Zhang et al. | |
| 8,254,361 B2 | 8/2012 | Nakao et al. | |
| 8,270,909 B2 | 9/2012 | Zhang et al. | |
| 8,289,869 B2 | 10/2012 | Sawai | |
| 8,339,978 B2 | 12/2012 | Sawai et al. | |
| 8,379,757 B1 | 2/2013 | Zhang et al. | |
| 8,400,968 B2 | 3/2013 | Liu et al. | |
| 8,472,383 B1 | 6/2013 | Banerjea et al. | |
| 8,514,976 B2 | 8/2013 | Kim et al. | |
| 8,526,351 B2 | 9/2013 | Fischer et al. | |
| 8,571,010 B1 | 10/2013 | Zhang et al. | |
| 8,599,803 B1 | 12/2013 | Zhang et al. | |
| 8,599,804 B2 | 12/2013 | Erceg et al. | |
| 8,619,907 B2 | 12/2013 | Mujtaba et al. | |
| 8,644,128 B2 | 2/2014 | Zhang et al. | |
| 8,660,497 B1 | 2/2014 | Zhang et al. | |
| 8,665,908 B1 | 3/2014 | Zhang et al. | |
| 8,665,974 B2 | 3/2014 | Zhang et al. | |
| 8,724,546 B2 | 5/2014 | Zhang et al. | |
| 8,724,720 B2 | 5/2014 | Srinivasa et al. | |
| 8,773,969 B1 | 7/2014 | Zhang et al. | |
| 8,867,653 B2 | 10/2014 | Zhang et al. | |
| 8,873,525 B2 | 10/2014 | Liu et al. | |
| 8,873,652 B2 | 10/2014 | Srinivasa et al. | |
| 8,885,620 B2 | 11/2014 | Liu et al. | |
| 8,886,755 B1 | 11/2014 | Liu et al. | |
| 8,891,435 B2 | 11/2014 | Zhang et al. | |
| 8,923,217 B2 | 12/2014 | Liu et al. | |
| 8,948,283 B2 | 2/2015 | Zhang | |
| 8,971,167 B1 | 3/2015 | Srinivasa et al. | |
| 9,118,530 B2 | 8/2015 | Srinivasa et al. | |
| 9,131,528 B2 | 9/2015 | Zhang et al. | |
| 9,397,873 B2 * | 7/2016 | Zhang | H04L 1/0057 |
| 2003/0193889 A1 | 10/2003 | Jacobsen | |
| 2004/0081073 A1 | 4/2004 | Walton et al. | |
| 2005/0034053 A1 | 2/2005 | Jacobsen et al. | |
| 2005/0195733 A1 | 9/2005 | Walton et al. | |
| 2005/0204258 A1 | 9/2005 | Hansen et al. | |
| 2007/0140100 A1 | 6/2007 | Ouyang et al. | |
| 2007/0140364 A1 | 6/2007 | Ouyang et al. | |
| 2008/0002649 A1 | 1/2008 | Xia et al. | |
| 2008/0205648 A1 | 8/2008 | Hanov et al. | |
| 2008/0225819 A1 | 9/2008 | Niu et al. | |
| 2009/0022093 A1 | 1/2009 | Nabar et al. | |
| 2009/0022128 A1 | 1/2009 | Nabar et al. | |
| 2009/0059877 A1 | 3/2009 | Utsunomiya et al. | |
| 2009/0196163 A1 | 8/2009 | Du | |
| 2009/0323850 A1 | 12/2009 | van Nee | |
| 2010/0014603 A1 | 1/2010 | Palanki et al. | |
| 2010/0046656 A1 | 2/2010 | van Nee et al. | |
| 2010/0054371 A1 | 3/2010 | Namgoong et al. | |
| 2010/0111220 A1 | 5/2010 | Rouquette-Leveil et al. | |
| 2010/0260159 A1 | 10/2010 | Zhang et al. | |
| 2010/0322334 A1 | 12/2010 | Wang et al. | |
| 2011/0002219 A1 | 1/2011 | Kim et al. | |
| 2011/0026623 A1 | 2/2011 | Srinivasa et al. | |
| 2011/0026639 A1 | 2/2011 | Rouquette-Leveil et al. | |
| 2011/0051845 A1 | 3/2011 | Schmidl et al. | |
| 2011/0096796 A1 | 4/2011 | Zhang et al. | |
| 2011/0096797 A1 | 4/2011 | Zhang et al. | |
| 2011/0261708 A1 | 10/2011 | Grandhi | |
| 2011/0310827 A1 | 12/2011 | Srinivasa et al. | |
| 2012/0039196 A1 | 2/2012 | Zhang | |
| 2012/0039292 A1 | 2/2012 | Lee et al. | |
| 2012/0054587 A1 | 3/2012 | Van Nee et al. | |
| 2012/0201316 A1 | 8/2012 | Zhang et al. | |
| 2012/0294294 A1 | 11/2012 | Zhang | |
| 2012/0294392 A1 | 11/2012 | Zhang | |
| 2012/0320889 A1 | 12/2012 | Zhang et al. | |
| 2013/0128807 A1 | 5/2013 | Vermani et al. | |
| 2013/0153298 A1 | 6/2013 | Pietraski et al. | |
| 2013/0202001 A1 | 8/2013 | Zhang | |
| 2013/0229996 A1 | 9/2013 | Wang et al. | |
| 2013/0259017 A1 | 10/2013 | Zhang et al. | |
| 2013/0315264 A1 | 11/2013 | Srinivasa et al. | |
| 2014/0126659 A1 | 5/2014 | Srinivasa et al. | |
| 2014/0205029 A1 | 7/2014 | Srinivasa et al. | |
| 2014/0211775 A1 | 7/2014 | Sampath et al. | |
| 2014/0362935 A1 | 12/2014 | Porat et al. | |
| 2015/0009894 A1 | 1/2015 | Vermani et al. | |
| 2015/0071372 A1 | 3/2015 | Zhang | |
| 2015/0117227 A1 | 4/2015 | Zhang et al. | |
| 2015/0117433 A1 | 4/2015 | Zhang et al. | |
| 2015/0131517 A1 | 5/2015 | Chu et al. | |
| 2015/0207602 A1 | 7/2015 | Yang et al. | |
| 2015/0304077 A1 | 10/2015 | Cao et al. | |
| 2015/0304078 A1 | 10/2015 | Caw et al. | |
| 2015/0327166 A1 | 11/2015 | Kenney et al. | |
| 2015/0349995 A1 | 12/2015 | Zhang et al. | |
| 2015/0365263 A1 | 12/2015 | Zhang et al. | |
| 2015/0365264 A1 | 12/2015 | Srinivasa et al. | |
| 2015/0365266 A1 | 12/2015 | Zhang et al. | |

(56) References Cited

U.S. PATENT DOCUMENTS

| | | |
|---|---|---|
| 2016/0050093 A1 | 2/2016 | Choi et al. |
| 2016/0072654 A1 | 3/2016 | Choi et al. |
| 2016/0156750 A1 | 6/2016 | Zhang et al. |

FOREIGN PATENT DOCUMENTS

| | | |
|---|---|---|
| JP | 2004200923 A | 7/2004 |
| JP | 2005-102201 A | 4/2005 |
| JP | 2005341317 A | 12/2005 |
| JP | 2009055464 A | 3/2009 |
| JP | 2009-520436 A | 5/2009 |
| WO | WO-2006007571 | 1/2006 |
| WO | WO-2008004155 A2 | 1/2008 |
| WO | WO-2008081683 | 7/2008 |
| WO | WO-2009/028886 A2 | 3/2009 |
| WO | WO-2009035418 | 3/2009 |
| WO | WO-2012122119 | 9/2012 |
| WO | WO-2013116237 | 8/2013 |
| WO | WO-2015061729 | 4/2015 |

OTHER PUBLICATIONS

IEEE Std 802.11.™. 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," The Institute of Electrical and Electronics Engineers, Inc., pp. 1-92, (1999) Reaffirmed (Jun. 12, 2003).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," The Institute of Electrical and Electronics Engineers, Inc., pp. 1-83 (Sep. 1999).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-363 (Mar. 2012).

IEEE Std 802.11ac/D3.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-385 (Jun. 2012).

IEEE Std 802.11ac/D4.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-408 (Oct. 2012).

IEEE Std 802.11ac/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-440 (Jan. 2013).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-446 (Jul. 2013).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-456 (Sep. 2013).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," The Institute of Electrical and Electronics Engineers, Inc. (Nov. 2011).

IEEE Std 802.11ah™/D1.0 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," The Institute of Electrical and Electronics Engineers, Inc., pp. 1-394 (Oct. 2013).

IEEE P802.11ah™/D1.3 "Draft Standard for Information Technology—Telecommunications and information exchange between systems Local and metropolitan area networks—Specific requirements, Part 11: Wireless LAN Medium Access Control (MAC) and Physical Layer (PHY) specifications: Amendment 6: Sub 1 GHz License Exempt Operation," The Institute of Electrical and Electronics Engineers, Inc., pp. 1-466 (Apr. 2014).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 Ghz Band," The Institute of Electrical and Electronics Engineers, Inc., pp. 1-89 (Sep. 1999).

IEEE Std 802.11b-1999/Cor Jan. 2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," The Institute of Electrical and Electronics Engineers, Inc., pp. 1-23 (Nov. 7, 2001).

(56) References Cited

OTHER PUBLICATIONS

IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," The Institute of Electrical and Electronics Engineers, Inc., pp. 1-53 (May 2002).

IEEE Std 802.11g/D8.2, Apr. 2003 (Supplement to ANSI/IEEE Std 802.11, 1999 (Reaff. 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," The Institute of Electrical and Electronics Engineers, Inc., pp. 1-69(Apr. 2003).

IEEE Std. 802.11n™. "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," The Institute of Electrical and Electronics Engineers, Inc., pp. 1-535 (Oct. 2009).

IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., pp. 1-544 (Sep. 2007).

IEEE Std 802.11n/D8.0, Feb. 2009 "Draft Standard for Information Technology—Telecommunications and information exchange between systems—Local and metropolitan area networks—Specific requirements, Part 11: Wireless LAN Medium Access Control(MAC)and Physical Layer (PHY) specifications: Amendment 5: Enhancements for Higher Throughput", The Institute for Electrical and Electronics Engineers, pp. i, ii, 258, 260-264, 287, 293, 346-347, 350-351, 354-356 (Feb. 2009).

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma D7.0), pp. 1-1212 (2006).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, The Institute of Electrical and Electronics Engineers, Inc., pp. 1-512 (1999).

IEEE Std 802.16/2009 (Revision of IEEE Std. 802.16/2004), "IEEE Standard for Local and metropolitan area networks: Part 16: Air Interface for Broadband Wireless Access Systems," The Institute of Electrical and Electronics Engineers, Inc., 2082 pages (May 29, 2009).

IEEE 802.20-PD-06; IEEE P802.20™ V14, Draft 802.20 Permanent Document; <System Requirements for IEEE 802.20 Mobile Broadband Wireless Access Systems—Version 14>, 24 pages (Jul. 16, 2004).

Cariou et al., "Multi-channel Transmissions," Doc. No. IEEE 802.11-09/1022r0, The Institute of Electrical and Electronics Engineers, Inc., pp. 1-13 (Sep. 2009).

Chen, "Home Network Basis: Transmission Environments and Wired/Wireless Protocols," Prentice Hall, pp. 1-26 (Jul. 2003).

Chun et al. "Legacy Support on HEW frame structure," doc: IEEE 11-13/1057r0, The Institute of Electrical and Electronics Engineers, Inc., pp. 1-8 (Sep. 2013).

de Vegt, "Potential Compromise for 802.11 ah Use Case Document", Institute of Electrical and Electronics Engineers, doc. No. IEEE 802.11-11/0457r0, pp. 1-27 (Mar. 2011).

Gunnam et al., "Multi-Rate Layered Decoder Architecture for Block LDPC Codes of the IEEE.802.11n Wireless Standard," IEEE International Symposium on Circuits and Systems, 2007 (ISCAS 2007), pp. 1645-1648 (2007).

Hiertz et al., "The IEEE 802.11 Universe," IEEE Communications Magazine, pp. 62-70, (Jan. 2010).

Ho et al., "Final Draft: SDD Text on Downlink MIMO Schemes", IEEE 802.16 Broadband Wireless Access Working Group, pp. 1-12 (Jul. 7, 2008).

Imashioya et al., "RTL Design of 1.2 Gbps MIMO WLAN System and Its Business Aspect," IEEE 9th Int'l Symposium on Communications and Information Technology (ISCIT 2009), The Institute of Electrical and Electronics Engineers, pp. 296-301 (2009).

Lee et al., "TGaf PHY proposal," The Institute of Electrical and Electronics Engineers, doc. No. IEEE 802.11-12/0809r5, pp. 1-43, Jul. 10, 2012.

Mujtaba, S.A. "IEEE P802.11—Wireless LANs, TGn Sync Proposal Technical Specification," The Institute of Electrical and Electronics Engineers, Inc., doc.: IEEE 802.11-04/0889r6, pp. 1-131 (May 2005).

Noh et al., "Channel Selection and Management for 11ac," Doc. No. IEEE 802.11-10/0593r1, *The Institute of Electrical and Electronics Engineers, Inc.*, pp. 1-21 (May 20, 2010).

Park, "Proposed Specification Framework for TGah D9.x", The Institute of Electrical and Electronics Engineers, doc. No. IEEE 802.11-yy/xxxxr0, pp. 1-30 (Jul. 2012).

Park, "Proposed Specification Framework for TGah", The Institute of Electrical and Electronics Engineers, doc. No. IEEE 802.11--yy/xxxxr05, (Jan. 2012).

Park, "Proposed Specification Framework for TGah", The Institute of Electrical and Electronics Engineers, doc. No. IEEE 802.11-11/1137r11, pp. 1-36 (Sep. 2012).

Park, "Proposed Specification Framework for TGah", The Institute of Electrical and Electronics Engineers, doc. No. IEEE 802.11-11/1137r6, pp. 1-13 (Mar. 2012).

Park, "Specification Framework for TGah," The Institute of Electrical and Electronics Engineers, doc. No. IEEE 802.11-11/1137r13, pp. 1-58 (Jan. 14, 2013).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Shao, "Channel Selection for 802.11ah," doc.: IEEE 802.11-12/0816r0, pp. 1-11 (Jul. 2012).

Shi et al., "Phase Tracking During VHT-LTF," Doc. No. IEEE 802.11-10/07711-0, The Institute of Electrical and Electronics Engineers, Inc., pp. 1-19 (Jul. 2010).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, Institute for Electrical and Electronics Engineers, pp. 1-49, (Jan. 18, 2011).

Syafei et al., "A Design of Next Generation Gigabit MIMO Wireless LAN System ," IEEE 12th Int'l Conference on Advanced Communication Technology (ICACT 2010), The Institute of Electrical and Electronics Engineers, pp. 941-946 (2010).

Syafei et al., "A Gigabit MIMO WLAN System with International Standardization Strategy," IEEE Int'l Symposium on Intelligent Signal Processing and Communication Systems (ISPACS 2009), The Institute of Electrical and Electronics Engineers, pp. 228-231 (2009).

(56) References Cited

OTHER PUBLICATIONS

Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), The Institute of Electrical and Electronics Engineers, pp. 207-211(2009).
Taghavi et al., "Introductory Submission for TGah", doc. No. IEEE 802.11-11/0062r0, Institute for Electrical and Electronics Engineers, pp. 1-5 (Jan. 14, 2011).
van Nee et al. "The 802.11n MIMO-OFDM Standard for Wireless LAN and Beyond," Wireless Personal Communications, vol. 37, pp. 445-453 (Jun. 2006).
van Zelst et al., "Pilot Sequence for VHT-DATA," Doc. No. IEEE 802.11-10/0811r1, The Institute of Electrical and Electronics Engineers, Inc., pp. 1-10 (Jul. 2010).
Vermani et al. "Preamble Format for 1 MHz," The Institute of Electrical and Electronics Engineers, doc. No. IEEE 802.11-11/1482r2, pp. 1-30 (Nov. 2011).
Vermani et al. "Spec Framework Text for PHY Numerology," The Institute of Electrical and Electronics Engineers, doc. No. IEEE 802.11-11/1311r0, pp. 1-5 (Sep. 2011).
Yu et al., "Coverage extension for IEEE802.11ah," the Institute of Electrical and Electronics Engineers, doc. No. IEEE 802.11-11/0035r1, pp. 1-10 (Jan. 2011).
Yuan et al., "Carrier Aggregation for LTE-Advanced Mobile Communication Systems," IEEE Communications Magazine, pp. 88-93 (Feb. 2010).
Zhang et al., "1 MHz Waveform in Wider BW", The Institute of Electrical and Electronics Engineers, doc. No. IEEE 802.11-12/0309r1, pp. 1-10 (Mar. 2012).
Zhang et al., "11ah Data Transmission Flow," The Institute of Electrical and Electronics Engineers, doc. No. IEEE 802.11-11/1484r1, pp. 1-15 (Nov. 2011).
Zhang et al., "Beamforming Feedback for Single Stream," The Institute of Electrical and Electronics Engineers, doc. No. IEEE 802.11-12/1312r0, pp. 1-22 (Nov. 12, 2012).
Zhang et al., "HE PHY Padding and Packet Extension," IEEE 802.11-15/0810, https://mentor.ieee.org/802.11/dcn/15/11-15-0810-00-00ax-he-phy-padding-a- nd-packet-extension.pptx, 38 pages (Jul. 10, 2015).
U.S. Appl. No. 12/730,651, Zhang et al., "OFDMA with Block Tone Assignment for WLAN," filed Mar. 24, 2010.
U.S. Appl. No. 14/701,208, Sun et al., "Adaptive Orthogonal Frequency Division Multiplexing (OFDM) Numerology in a Wireless Communication Network," filed Apr. 30, 2015.
International Search Report and Written Opinion in International Application No. PCT/US2015/035401, mailed Sep. 10, 2015 (11 pages).
International Preliminary Report on Patentability in International Patent Application No. PCT/US2015/035401, mailed Dec. 22, 2016 (8 pages).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

\* cited by examiner

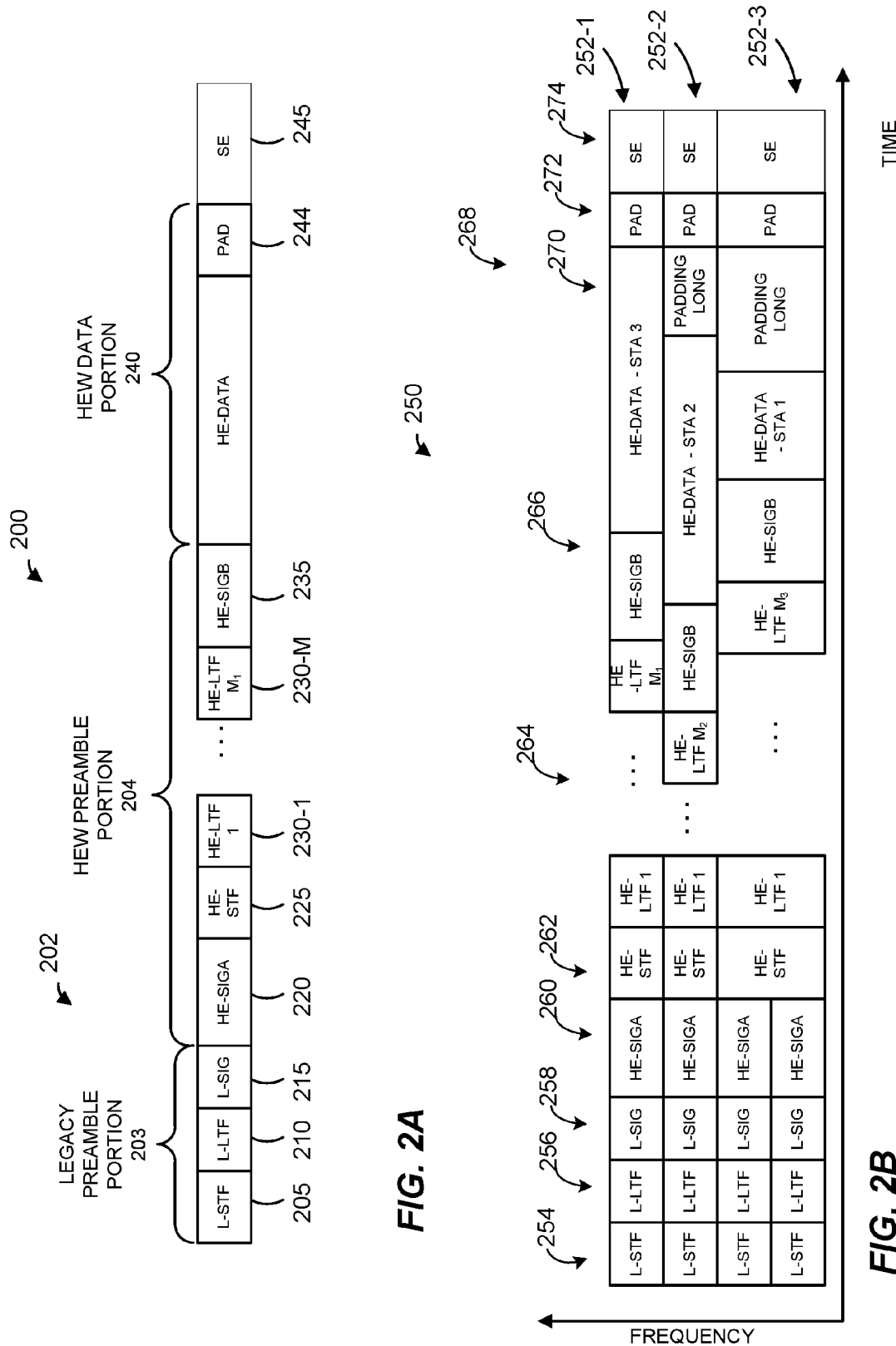

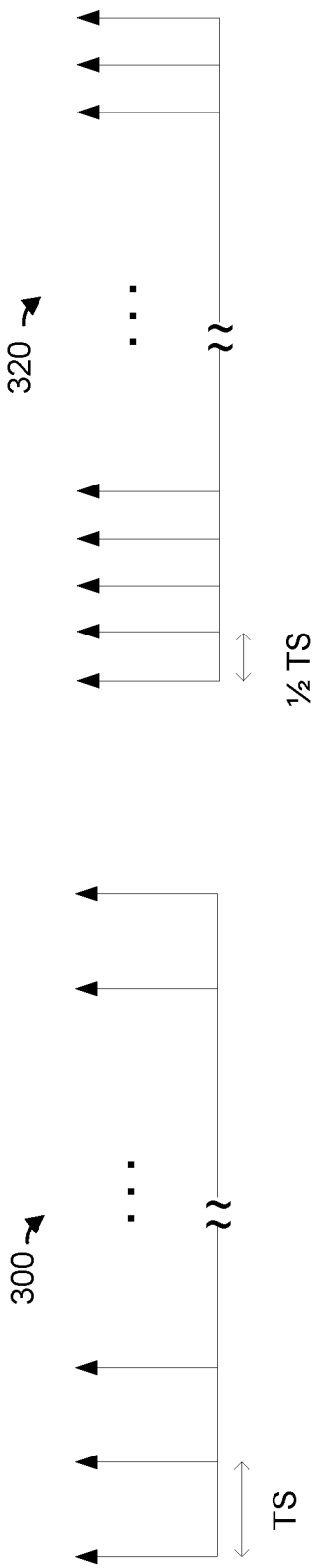
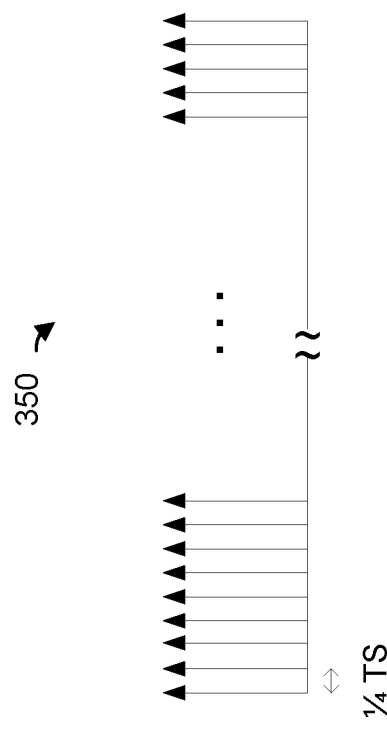
FIG. 3A
FIG. 3B
FIG. 3C

COMPRESSED ORTHOGONAL FREQUENCY DIVISION MULTIPLEXING (OFDM) SYMBOLS IN A WIRELESS COMMUNICATION SYSTEM

CROSS-REFERENCES TO RELATED APPLICATIONS

This disclosure is a continuation of U.S. patent application Ser. No. 14/737,316, entitled "Compressed Orthogonal Frequency Division Multiplexing (OFDM) Symbols in a Wireless Communication System," filed on Jun. 11, 2015, which claims the benefit of the following U.S. Provisional Patent Applications:

U.S. Provisional Patent Application No. 62/010,787, entitled "Compressed OFDM Symbol for Padding," filed on Jun. 11, 2014;

U.S. Provisional Patent Application No. 62/027,525, entitled "Compressed OFDM Symbol for Padding and Preamble," filed on Jul. 22, 2014;

U.S. Provisional Patent Application No. 62/034,502, entitled "Compressed OFDM Symbol for Padding and Preamble," filed on Aug. 7, 2014;

U.S. Provisional Patent Application No. 62/041,858, entitled "HE-LTF Compression," filed on Aug. 26, 2014;

U.S. Provisional Patent Application No. 62/051,089, entitled "Compressed OFDM Symbol for Padding and Preamble," filed on Sep. 16, 2014;

U.S. Provisional Patent Application No. 62/087,083, entitled "Compressed OFDM Symbol for Padding and Preamble," filed on Dec. 3, 2014;

U.S. Provisional Patent Application No. 62/094,825, entitled "Compressed OFDM Symbol for Padding and Preamble," filed on Dec. 19, 2014;

U.S. Provisional Patent Application No. 62/148,456, entitled "Compressed OFDM Symbol for Padding and Preamble-v6," filed on Apr. 16, 2015; and U.S. Provisional Patent Application No. 62/168,652, entitled "Compressed OFDM Symbols for Padding and Preamble," filed on May 29, 2015.

The disclosures of all of the patent applications referenced above are hereby incorporated by reference herein in their entireties.

The present application is related to U.S. patent application Ser. No. 14/737,273 entitled "Compressed Preamble for a Wireless Communication System," filed on Jun. 11, 2015, and hereby incorporated by reference herein in its entirety.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for generating a physical layer (PHY) data unit for transmission via a communication channel includes receiving a plurality of information bits to be included in a data portion of the PHY data unit. The method also includes adding one or more first padding bits to the information bits such that the information bits, after being encoded, fill one or more OFDM symbols up to a first portion of a last OFDM symbol, wherein the first portion of the last OFDM symbol is an initial portion of the last OFDM symbol up to a boundary within the last OFDM symbol, and encoding the information bits and the first padding bits to generate coded bits. The method additionally includes performing one of (i) padding coded bits corresponding to the last OFDM symbol or (ii) padding constellation points generated based on the coded bits corresponding to the last OFDM symbol such that the padded coded bits or the padded constellation points occupy a second portion of the last OFDM symbol, wherein the second portion is a remaining portion of the last OFDM symbol after the boundary. The method further includes generating the one or more OFDM symbols, including generating the last OFDM symbol to include (i) the coded information bits corresponding to the last OFDM symbol, (ii) the first padding bits in the first portion of the last OFDM symbol, and (ii) second padding bits or padding constellation points in the second portion of the last OFDM symbol, and generating the PHY data unit to include at least one or more OFDM symbols.

BRIEF DESCRIPTION OF THE DRAWINGS

FIG. 2A is a diagrams of a physical layer (PHY) data unit, according to an embodiment;

FIG. 2B is a diagrams of a physical layer (PHY) data unit, according another embodiment;

FIGS. 3A-3C are diagrams illustrating orthogonal frequency division multiplexing (OFDM) tone spacing used with OFDM symbols of a PHY data unit, according to several embodiments;

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol is sometimes referred herein as "high efficiency WiFi," "HEW" communication protocol, or IEEE 802.11ax communication protocol. In some embodiments, different client stations in the vicinity of the AP are configured to operate according to one or more other communication protocols which define operation in the same frequency band as the HEW communication protocol but with generally lower data throughputs. The lower data throughput communication protocols (e.g., IEEE 802.11a, IEEE 802.11n, and/or IEEE 802.11ac) are collectively referred herein as "legacy" communication protocols.

Figure 1:
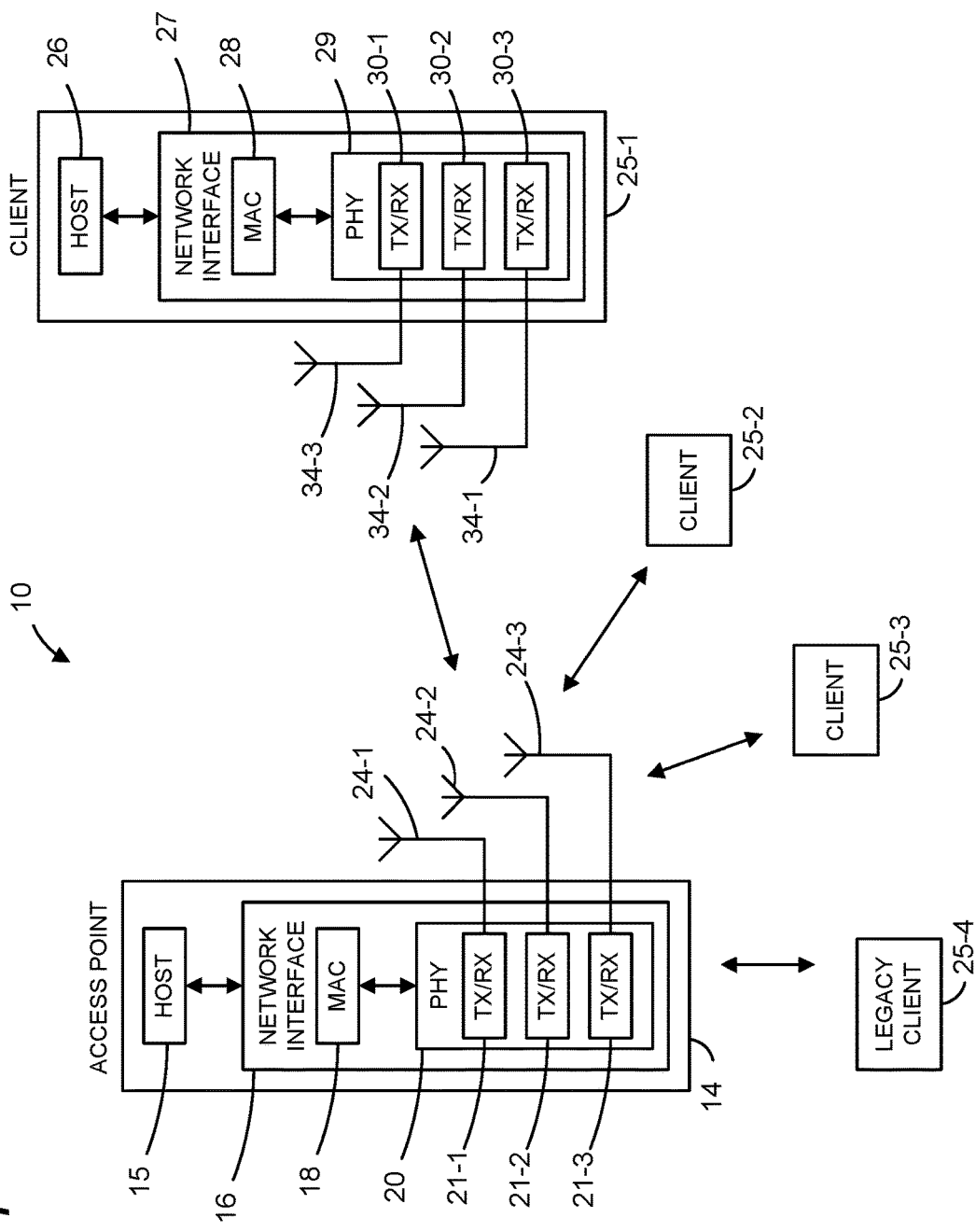
FIG. 1 is a block diagram of an example wireless local area network (WLAN) 10, according to an embodiment.

FIG. 1 is a block diagram of an example wireless local area network (WLAN) 10, according to an embodiment. An AP 14 includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., HEW communication protocol). In another embodiment, the MAC processing unit 18 and the PHY processing unit 20 are also configured to operate according to a second communication protocol (e.g., IEEE 802.11ac Standard). In yet another embodiment, the MAC processing unit 18 and the PHY processing unit 20 are additionally configured to operate according to the second communication protocol, a third communication protocol and/or a fourth communication protocol (e.g., the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol and/or the fourth communication protocol (referred to herein as a "legacy client station").

The client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol and/or the fourth communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol and having formats described herein and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

FIG. 2A is a diagram of a physical layer (PHY) data unit 200 that the AP 14 is configured to transmit to a client station (e.g., the client stations 25-1) via orthogonal frequency domain multiplexing (OFDM) modulation, according to an embodiment. In an embodiment, the client station 25-1 is also configured to transmit the data unit 200 to the AP 14. The data unit 200 conforms to the HEW communication protocol and occupies a 20 MHz bandwidth. Data units similar to the data unit 200 occupy other suitable bandwidth such as 40 MHz, 80 MHz, 160 MHz, 320 MHz, 640 MHz, for example, or other suitable bandwidths, in other embodiments. The data unit 200 is suitable for "mixed mode" situations, i.e. when the WLAN 10 includes a client station (e.g., the legacy client station 24-4) that conforms to a legacy communication protocol, but not the first communication protocol. The data unit 200 is utilized in other situations as well, in some embodiments.

The data unit 200 includes a preamble 202, which, in turn, includes a legacy preamble portion 203 and a high efficiency (HE) preamble portion 204. The legacy preamble portion 202 includes an L-STF 205, an L-LTF 210, and an L-SIG 215. The HE preamble portion 204 includes one or more HE signal field(s) (HE-SIGA(s)) 220, an HE short training field (HE-STF) 225, M HE long training fields (HE-LTFs) 230, where M is an integer, and an HE signal field B (HE-SIGB) 235. Each of the L-STF 205, the L-LTF 210, the L-SIG 215, the HE-SIGAs 220, the HE-STF 225, the M HE-LTFs 230, and the HE-SIGB 235 comprises an integer number of one or more OFDM symbols. For example, in an embodiment, the HE-SIGAs 220 comprise two OFDM symbols, and the HE-SIGB field comprises one OFDM symbol, in an embodiment. The L-SIG 215, the HE-SIGAs 220 and the HE-SIGB 235 generally carry formatting information for the data unit 200, in an embodiment. In some embodiments, the data unit 200 also includes a data portion 240. The data portion 240 includes a padding portion 244, in an embodiment. In an embodiment, the padding portion 244 includes only the last OFDM symbol of the data portion 240. In another embodiment, the padding portion 244 includes more than one OFDM symbol at the end of the of the data portion 240. In some embodiments and/or scenarios, the data portion 240 omits the padding portion 244.

In an embodiment, the data unit 200 further includes a signal extension (SE) field 245. In an embodiment, the SE field 245 provides buffer time for a receiving device (e.g., a client station 25 or the AP 14) to process the last OFDM symbol of the data portion 240 prior to providing an acknowledgement (ACK) or a block acknowledgement (BlkAck) signal to the transmitting device, as will be explained in more detail below. In some embodiments and/or scenarios, the data unit 200 omits the SE field 245. Generally speaking, as used herein, the term "receiving device" refers to a client station (e.g., one of the client stations 25 in FIG. 1) or to an access point (e.g., the AP 14 in FIG. 1) in various embodiments. Similarly, as used herein, the term "transmitting device" refers to a client station (e.g., one of the client stations 25 in FIG. 1) or to an access point (e.g., the AP 14 in FIG. 1) in various embodiments.

In the embodiment of FIG. 2A, the data unit 200 includes one of each of the L-STF 205, the L-LTF 210, the L-SIG 215, and the HE-SIGA(s) 220. In other embodiments in which an OFDM data unit similar to the data unit 200 occupies a cumulative bandwidth other than 20 MHz, each of the L-STF 205, the L-LTF 210, the L-SIG 215, the HE-SIGA(s) 220 is repeated over a corresponding number of 20 MHz sub-bands of the whole bandwidth of the data unit, in an embodiment. For example, in an embodiment, the OFDM data unit occupies an 80 MHz bandwidth and, accordingly, includes four of each of the L-STF 205, the L-LTF 210, the L-SIG 215, the HE-SIGA(s) 220. In some embodiments, the modulation of different 20 MHz subbands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIGB and the HE data portion occupy the corresponding whole bandwidth of the data unit.

The data unit 200 is a single user (SU) data unit transmitted to (or by) a single client station 25, in an embodiment. In another embodiment, the data unit 200 is a multi-user (MU) data unit in independent data streams are simultaneously transmitted to (or by) multiple client stations 25, where each of the data streams is transmitted using one or more spatial streams within the data unit 200. In an embodiment in which the data unit 200 is an MU data unit, the HE-SIGB fields 235 in the data unit 200 are spatially mapped by a vector $QP_1$, where Q is an antenna map or spatial mapping matrix that maps spatial streams, or space-time streams if space-time encoding is utilized, to transmit antennas, and $P_1$ is a first column in a spatial stream mapping matrix P, which is a Hadamard matrix in which each element of P is +1 or −1, in an embodiment. In another embodiment, each element of P is a complex number (e.g., a Discrete Fourier Transform matrix is used as P). In another embodiment, some elements of P are integers other than +1 or −1. In an embodiment, $P_1$ corresponds to a first spatial stream.

In an embodiment, as each HE-LTF 230 is generated, a separate column of the matrix P is used to map the values to spatial streams. For example, the first column of the matrix P, i.e., $P_1$, is applied to the signal HE-LTF1 230-1, the second column of the matrix P, i.e., $P_2$, is applied to the signal HE-LTF2, etc., in an embodiment. Thus, a client station 25 may use the channel estimation from the HE-LTF1 to decode the HE-SIGB field 235, in an embodiment. According to another embodiment, the HE-SIGB is spatially mapped by a vector $QP_N$ so that a client station 25 may use the channel estimation from the HE-LTFN 230-M to decode the HE-SIGB 235, in another embodiment.

FIG. 2B is a diagram of an example orthogonal frequency division multiple access (OFDMA) data unit 250, according to an embodiment. The OFDMA data unit 250 includes a plurality of OFDM data unit 252-1, 252-2 and 252-3. In an embodiment, each data unit 252-1, 252-2 and 252-3 is the same as or similar to the data unit 200 of FIG. 2A. In an embodiment, the AP 14 transmits the OFDM data units 252-1, 252-2, 252-3 to different client stations 25 via respective OFDM sub-channels within the OFDMA data unit 250. In another embodiment, different client stations 25 transmit respective OFDM data units 252-1, 252-2, 252-3 to the AP 14 in respective OFDM sub-channels within the OFDMA data unit 250. In this embodiment, The AP 14 receives the OFDM data units 252-1, 252-2, 252-3 from the client stations 25 via respective OFDM sub-channels of within the OFDMA data unit 250, in this embodiment.

Each of the OFDM data units 252-1, 252-2, 252-3 conforms to a communication protocol that supports OFDMA transmission, such as the HEW communication protocol, in an embodiment. In an embodiment in which the OFDMA data unit 250 corresponds to a downlink OFDMA data unit, the OFDMA data unit 250 is generated by the AP 14 such that each OFDM data unit 252 is transmitted to a respective client station 25 via a respective sub-channel of the WLAN 10 allocated for downlink transmission of the OFDMA data unit 250 to the client station. Similarly, an embodiment in which the OFDMA data unit 250 corresponds to an uplink OFDMA data unit, the AP 14 receives the OFDM data units 252 via respective sub-channels of the WLAN 10 allocated for uplink transmission of the OFDM data units 252 from the client stations, in an embodiment. For example, the OFDM data unit 252-1 is transmitted via a first 20 MHZ sub-channel of the WLAN 10, the OFDM data unit 252-2 is transmitted via a second 20 MHz sub-channel of the WLAN 10, and the OFDM data unit 252-3 is transmitted via a 40 MHz sub-channel of the WLAN 10, in the illustrated embodiment.

In an embodiment, each of the OFDM data units 252 is formatted the same as or similar to the data unit 200 of FIG. 2A. In the embodiment of FIG. 2B, each of the OFDM data units 252-i includes a preamble including one or more legacy short training fields (L-STF) 254, one or more legacy long training fields (L-LTF) 256, one or more legacy signal fields (L-SIG) 258, one or more first high efficiency WLAN signal field (HE-SIGA) 260, N, HE long training fields (HE-LTF) fields 264 and a second HE signal field (HE-SIGB) 266. Although in the embodiment illustrated in FIG. 2B, the data units 252-i include different numbers M, of HE-LTF fields 264, each of the data units 252-i includes the same number M of HE-LTF fields 264 to align the HE-SIGB fields 266 and the beginnings of the data portions 270 of the data unit 250, in some embodiments. For example, each of the data units 252-i includes a number M of HE-LTF fields 264 corresponding to a client station 25, of the multiple client stations 25, that utilizes the greatest number of spatial streams in the data unit 250, in an embodiment. In this embodiment, data units 252-i directed to client stations 25 that use fewer spatial streams include one or more "padding" HE-LTF fields 264 to align the HE-LTF fields 264 with the data unit 252-i with the greatest number of spatial streams. For example, in an embodiment, padding HE-LTF fields 264 include repetitions of non-padding HE-LTF field(s) of the corresponding user, in an embodiment.

Additionally, each OFDM data unit 252 includes a high efficiency data portion (HE-DATA) portion 268. In an embodiment, padding is used in one or more of the OFDM data units 252 to equalize lengths of the OFDM data units 252. Accordingly, the length of each of the OFDM data units 252 correspond to the length of the OFDMA data unit 252, in this embodiment. Ensuring that the OFDM data units 252 are of equal lengths synchronizes transmission of acknowledgment frames by client stations 25 that receive the data units 252, in an embodiment. In an embodiment, each of one or more of the OFDM data units 252 is an aggregate MAC service data units (A-MPDU), which is in turn included in a PHY protocol data unit (PPDU). In an embodiment, padding (e.g., zero-padding) within one or more of the A-MPDUs 252 is used to equalize the lengths of the data units 252, and to synchronize transmission of acknowledgement frames corresponding to the OFDMA data unit 250. For example, each of the data units 252-2 and 252-3 includes padding portions 270 that equalize the respective lengths of the data units 252-2 and 252-3 with the length of the data unit 252-1, in the illustrated embodiment.

In an embodiment, the data portion 268 of each OFDM data unit 252 includes a padding portion 272. In an embodiment, the padding portion 272 includes the last OFDM symbol of the data portion 268 of the corresponding OFDM data unit 252. In another embodiment, the padding portion 272 includes more than one OFDM symbol at the end of the of the data portion 268 of the corresponding OFDM data unit 252. In some embodiments and/or scenarios, the data portions 268 of the data units 252 omit the padding portions 272.

In an embodiment, each data units 252 further includes a signal extension (SE) field 274. In an embodiment, the SE field 274 provides buffer time for a receiving device (e.g., a client station 25 or the AP 14) to process the last OFDM symbol of the data portion 240 prior to providing an acknowledgement (ACK) or a block acknowledgement (BlkAck) signal to the transmitting device, as will be explained in more detail below. In some embodiments and/or scenarios, the data units 252 omit the SE fields 274.

In an embodiment, each L-LSF field 254, each L-LTF field 256, each L-SIG field 258 and each HE-SIGA field 260 occupies a smallest bandwidth supported by the WLAN 10 (e.g., 20 MHz). In an embodiment, if an OFDM data unit 252 occupies a bandwidth that is greater than the smallest bandwidth of the WLAN 10, then each L-LSF field 254, each L-LTF field 256, each L-SIG field 258 and each HE-SIGA field 260 is duplicated in each smallest bandwidth portion of the OFDM data unit 252 (e.g., in each 20 MHz portion of the data unit 252). On the other hand, each HE-STF field 262, each HE-LTF field 264, each HE-SIGB field 266, each HE data portion 268, and each SE field 274 occupies an entire bandwidth of the corresponding OFDM data unit 252, in an embodiment. For example, the OFDM data unit 252-3 occupies 40 MHz, wherein L-STF field 254, the L-LTF field 256, L-SIG field 258 and HE-SIGA field 260 is duplicated in the upper and the lower 20 MHz bands of the OFDM data unit 252-3, while each of the HE-STF field 262, the HE-LTF fields 264, the HE-SIGB field 266, the HE data portion 268 and the SE field 274 occupies the entire 40 MHz bandwidth of the data unit 252-3, in the illustrated embodiment.

In some embodiments, data for different client stations 25 is transmitted using respective sets of OFDM tones, within the data unit 250, wherein a set OFDM tones assigned to a client station 25 may correspond to a bandwidth that is smaller than the smallest channel of the WLAN 10. For example, a set of OFDM tones assigned to a client station 25 corresponds to a bandwidth that is smaller than 20 MHz (e.g., 5 MHz, 10 MHz, 15 MHz, or any other suitable bandwidth less than 20 MHz), in an embodiment. In an embodiment, if an OFDM data unit 252 occupies a bandwidth that is smaller than the smallest bandwidth of the WLAN 10, then each of the L-STF field 254, the L-LTF field 256, the L-SIG field 258 and the HE-SIGA field 260 nonetheless occupies the entire smallest bandwidth portion of the OFDM data unit 252 (e.g., in 20 MHz portion of the data unit 252). On the other hand, the HE-STF field 262, the HE-LTF field 264, the HE-SIGB field 266, the HE data portion 268 and the SE field 274 occupies the smaller bandwidth of the corresponding OFDM data unit 252, in an embodiment. Generally, a data unit 252 corresponds to any suitable number of OFDM tones within the data unit 250, in an embodiment.

A set of OFDM tones corresponding to a client station 25 is sometimes referred to herein as a "resource unit (RU)". In an embodiment, each OFDM data unit 252 corresponds to a client station 25 and to a resource unit assigned to the client station 25. In various embodiments, an RU corresponding to a client station 25 includes a suitable number of OFDM tones within the data unit 250. For example, an RU includes 26, 52, 106, 242, 484 or 996 OFDM tones, in some embodiments and/or scenarios. In other embodiments, an RU includes other suitable numbers of OFDM tones.

In an embodiment, the first communication protocol utilizes the same channelization scheme as defined by a legacy communication protocol. For example, the first communication protocol utilizes the same channelization scheme as defined in the IEEE 802.11ac Standard. In this embodiment, the first communication protocol operates with 20 MHz, 40 MHz, 80 MHz and 160 MHz communication channels. The 20 MHz, 40 MHz, 80 MHz and 160 MHz communication channels coincide, e.g., in center frequencies, with the channels utilized by a legacy communication protocol (e.g., the IEEE 802.11ac Standard). In an embodiment, however, the first communication protocol defines a tone spacing that is different that the tone spacing defined by the legacy communication protocol (e.g., the IEEE 802.11ac Standard). For example, the first communication protocol defines a tone spacing that is a fraction 1/N of the tone spacing defined by the legacy communication protocol, where N is a positive integer greater than one, in an embodiment. The integer N is an even integer (e.g., 2, 4, 6, 8, 10, etc.), in an embodiment. The integer N is an integer that corresponds to a power of two (e.g., 2, 4, 8, 16, etc.), in an embodiment. The reduced tone spacing is used in the first communication protocol to improve communication range compared to communication range supported or achieved by a legacy communication protocol, in an embodiment. Additionally or alternatively, the reduced tone spacing is used is the first communication protocol to increase throughput compared to throughput achieved in a same bandwidth channel by a legacy communication protocol.

FIGS. 3A-3C are diagrams illustrating OFDM tone spacing used with OFDM symbols of a data unit, such as the data unit 200 of FIG. 2A or the data unit 250 of FIG. 2B, in some embodiments. Turning first to FIG. 3A, a tone spacing 300 corresponds to tone spacing defined in a legacy communication protocol. For example, the tone spacing 300 corresponds to the tone spacing defined in the IEEE 802.11ac Standard, in an embodiment. In an embodiment, an OFDM symbol generated with the tone spacing 300 for a particular bandwidth is generated using an Inverse Digital Fourier Transform (IDFT) size that results in a tone spacing (TS) of 312.5 kHz in the particular bandwidth. For example, an OFDM symbol generated with the tone spacing 300 for a 20 MHz bandwidth is generated using a 64 point IDFT, resulting in the tone spacing (TS) of 312.5 kHz, in an embodiment. Similarly, an OFDM symbol generated with the tone spacing 300 for a 40 MHz bandwidth is generated using a 128 point IDFT, an OFDM symbol generated with the tone spacing 300 for an 80 MHz bandwidth is generated using a 256 point IDFT, an OFDM symbol generated with the tone spacing 300 for a 160 MHz bandwidth is generated using a 512 point IDFT, etc., in an embodiment. Alternatively, in some embodiments, an OFDM symbol generated for at least some of the channel bandwidths is generated using an IDFT size that results in a tone spacing (TS) of 312.5 kHz in a sub-band of the entire bandwidth. In such embodiments, multiple sub-bands of the OFDM symbol are individually generated using the IDFT size that results in the tone spacing (TS) of 312.5 kHz in the individual sub-bands. For example, an OFDM symbol for a 160 MHz-wide channel is generated using a 256 point IDFT in each one of the two 80 MHz sub-bands of the 160 MHz-wide channel, in an embodiment.

Turning now to FIG. 3B, a tone spacing 320 is reduced by a factor 2 (½) with respect to the tone spacing 300 of FIG. 3A. For example, continuing with the example above, whereas on OFDM symbol generated with the tone spacing 300 for a 20 MHz bandwidth is generated using a 64 point IDFT, an OFDM symbol generated with the tone spacing 320 for a 20 MHz bandwidth is generated using a 128 point IDFT, resulting in the ½ of the tone spacing 300 of FIG. 3A (i.e., 156.25 kHz). Similarly, an OFDM symbol generated with the tone spacing 320 for a 40 MHz-wide channel is generated using a 256 point IDFT, an OFDM symbol generated with the tone spacing 320 for an 80 MHz bandwidth channel is generated using a 512 point IDFT, an OFDM symbol generated with the tone spacing 320 for a 160 MHz bandwidth channel is generated using a 1024 point IDFT, etc., in an embodiment. Alternatively, in some embodiments, an OFDM symbol generated for at least some of the channel bandwidths is generated using an IDFT size that results in a tone spacing (TS) of 156.25 kHz in a sub-band of the entire bandwidth. In such embodiments, multiple sub-bands of the OFDM symbol are individually generated with the IDFT size that results in the tone spacing (TS) of 312.5 kHz in the individual sub-bands. For example, an OFDM symbol for a 160 MHz bandwidth channel is generated using a 512 point IDFT in each one of the two 80 MHz sub-bands of the 160 MHz bandwidth channel, in an embodiment.

Turning now to FIG. 3C, a tone spacing 350 is reduced by a factor 4 (¼) with respect to the tone spacing 300 of FIG. 3A. For example, continuing again with the example above, whereas an OFDM symbol generated with the tone spacing 300 for a 20 MHz bandwidth is generated using a 64 point IDFT, an OFDM symbol generated with the tone spacing 350 for a 20 MHz bandwidth is generated using a 256 point IDFT, resulting in the ¼ of the tone spacing 300 of FIG. 3A (i.e., 78.125 kHz), in an embodiment. Similarly, an OFDM symbol generated with the tone spacing 350 for a 40 MHz bandwidth channel is generated using a 512 point IDFT, an OFDM symbol generated with the tone spacing 350 for an 80 MHz bandwidth channel is generated using a 1024 point IDFT, an OFDM symbol generated with the tone spacing 350 for a 160 MHz bandwidth channel is generated using a 2048 point IDFT, etc., in an embodiment. Alternatively, in some embodiments, an OFDM symbol generated for at least some of the channel bandwidths is generated using an IDFT size that results in a tone spacing (TS) of 78.125 kHz in a sub-band of the entire bandwidth. In such embodiments, multiple sub-bands of the OFDM symbol are individually generated with the IDFT size that results in the tone spacing (TS) of 312.5 kHz in the individual sub-bands. For example, an OFDM symbol for a 160 MHz bandwidth channel is generated using a 512 point IDFT each one of the 80 MHz sub-bands of the 160 MHz bandwidth channel, in an embodiment. As just another example, an OFDM symbol for a 40 MHz bandwidth channel is generated using a 256 point IDFT in each one of the 20 MHz sub-bands of the 40 MHz bandwidth channel, in an embodiment. As yet another example, in yet another embodiment, an OFDM symbol for an 80 MHz bandwidth channel is generated using a 256 point IDFT in each one of the four 20 MHz sub-bands of the 80 MHz bandwidth channel, in an embodiment.

A tone spacing defined in a legacy communication protocol, such as the tone spacing 300 of FIG. 3A, is sometimes referred to herein as "normal tone spacing" and a tone spacing that is smaller than the tone spacing defined by the legacy communication protocol, such as the tone spacing 320 of FIG. 3B and the tone spacing 350 of FIG. 3C is sometimes referred to herein as "reduced tone spacing."

Generally speaking symbol duration of an OFDM symbols, in time, is inversely proportional to the tone spacing used with the OFDM symbol. That is, if $\Delta f$ corresponds to the tone spacing used with an OFDM symbol, then the time symbol duration of the OFDM symbol is $T=1/\Delta f$. Accordingly, a relatively smaller tone spacing used with an OFDM symbol results in a relatively larger symbol duration of the OFDM symbol, and vice versa, in an embodiment. For example, a tone spacing of $\Delta f=312.5$ kHz as in FIG. 3A results in an OFDM symbol duration of 3.2 µs, while a tone spacing of $\Delta f=156.25$ kHz as in FIG. 3B results in an OFDM symbol duration of 6.4 µs, in an embodiment. Further, a sampling rate at which a receiving device (e.g., a client station 25 or the AP 14) needs to sample the OFDM symbol is inversely proportional to the IDFT size (number of points) used to generate the OFDM symbol. In particular, in an embodiment, if $N_{fft}$ is the IDFT size used to generate the OFDM symbol, then the sampling rate at which the receiving device needs to sample the OFDM symbol is $T/N_{fft}$, where T is the OFDM symbol duration ($T=1/\Delta f$).

In an embodiment, the first communication protocol defines a set of guard intervals of different lengths that may be used with OFDM symbols to prevent or minimize inter-symbol interference at the receiving device caused by multipath propagation in the communication channel. Generally speaking, a sufficiently long guard interval is needed to mitigate interference based on the delay spread of the particular channel being utilized, in an embodiment. On the other hand, a relatively shorter guard interval, particularly in terms of a ratio of the guard interval relative to a length of the OFDM symbol and, accordingly, amount of "useful" data that can be transmitted in the OFDM symbol, generally results in a smaller overhead associated with the guard interval and improves overall throughput, in an embodiment.

Figure 4:
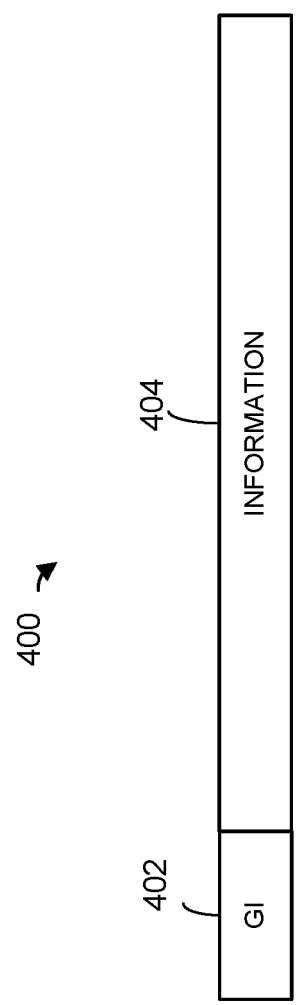
FIG. 4 is a diagram illustrating a guard interval used with an OFDM symbol of a data unit, according to an embodiment.

FIG. 4 is a diagram illustrating a guard interval used with an OFDM symbol of a data unit, such as the data unit 200 of FIG. 2A or the data unit 25 of FIG. 2B, according to an embodiment. In an embodiment, a guard interval portion 402 is pre-pended to an information portion of the OFDM symbol 404. In an embodiment, the guard interval comprises a cyclic prefix repeating an end portion of the information portion 504. In an embodiment, the guard interval portion 402 is used to ensure orthogonality of OFDM tones at a receiving device (e.g., a client station 25 or the AP 14) and to minimize or eliminate inter-symbol interference due to multipath propagation in the communication channel via which the OFDM symbol is transmitted.

According to an embodiment, the length of the guard interval portion 402 to be used with particular OFDM symbols of the data unit 200 is selected from a set of guard intervals supported by the HEW communication protocol. For example, the set of guard intervals supported by the HEW communication protocol includes 0.4 µs, 0.8 µs, 1.6 µs, and 3.2 µs guard intervals. In other embodiments, the set of guard intervals supported by the HEW communication protocol exclude one or more of 0.4 µs, 0.8 µs, 1.6 µs, and 3.2 µs and/or include one or more suitable guard intervals other than 0.4 µs, 0.8 µs, 1.6 µs, and 3.2 µs instead of or in addition to the guard intervals 0.4 µs, 0.8 µs, 1.6 µs, and 3.2 µs. In an embodiment, in accordance with terminology used in a legacy communication protocol (e.g., the IEEE 802.11n Standard or the IEEE 802.11ac Standard), a guard interval of 19.8 µs is sometimes referred to herein as a "normal guard interval" and a guard interval of 0.4 µs is sometimes referred to herein as "short guard interval."

In an embodiment, the first communication protocol defines at least a first transmission mode (e.g. normal mode) the utilizes the normal tone spacing and supports guard intervals defined by a legacy communication protocol (e.g., the IEEE 802.11ac Standard) and a second transmission mode (e.g., a high efficiency mode) that utilizes a reduced tone spacing and/or a larger guard interval compared to the tone spacing and guard intervals of the legacy communication protocol. For example, the normal mode utilizes the normal tone spacing 300 of FIG. 3A and supports 0.4 µs and 0.8 µs guard intervals, in an embodiment. The high efficiency mode, on the other hand, utilizes the ¼ tone spacing 350 of FIG. 3C and supports two or more of (e.g., two of, three of, four of, etc.) 0.4 µs, 0.8 µs, 1.6 µs, 2.4 µs and 3.2 µs guard interval options or other suitable guard interval options, in an example embodiment. Alternatively, in another embodiment, the first communication protocol defines a normal mode that utilizes a reduced tone spacing (e.g., ½ tone spacing or ¼ tone spacing) and supports two or more of (e.g., two of, three of, four of, etc.) 0.4 µs, 0.8 µs, 1.6 µs, 2.4 µs and 3.2 µs guard interval options or other suitable guard interval options.

In an embodiment, the particular transmission mode being used with a data unit such as the data unit 200 is signaled to a receiving device via a mode indication included in the preamble of the data unit. For example, referring to the data unit 200 of FIG. 2A, the HE-SIGA field 220 or the HE-SIGB field 235 includes an indication of the transmission mode used with the data unit 200, in an embodiment. In another embodiment, the preamble of the data unit 200 is formatted such that a receiving device can auto-detect transmission mode used with the data unit 200 based on modulation (e.g., binary phase shift keying (BPSK) verses binary phase shift keying shifted by 90 degrees (Q-BPSK)) of one or more fields of the preamble of the data unit 200.

In some embodiments, some of the OFDM symbols of the data unit 200 of FIG. 2A are generated with the normal tone spacing and the regular guard interval (e.g., 0.8 µs) of a legacy communication protocol (e.g., the IEEE 802.11ac Standard), while other OFDM symbols of the data unit 200 are generated with a reduced tone spacing (e.g., the ½ tone spacing 320 of FIG. 3B or the tone spacing 350 of FIG. 3C) and/or with a longer guard interval compared to guard intervals supported by the legacy communication protocol. For example, the L-STF 205, the L-LTF 210, the L-SIG 215, the HE-SIGA 220 and the HE-STF field 225 are generated with the normal tone spacing and the regular guard interval (e.g., 0.8 µs) of the IEEE 802.11ac Standard, while the HE-LTFs 230, the HE-SIGB 235 and the data portion 240 are generated with a reduced tone spacing (e.g., the ½ tone spacing 320 of FIG. 3B or the tone spacing 350 of FIG. 3C) and/or with a longer guard interval compared to guard intervals supported by the IEEE 802.11ac Standard, in an embodiment. As another example, in another embodiment, the L-STF 205, the L-LTF 210, the L-SIG 215 and the HE-SIGA 220 are generated with the normal tone spacing and the regular guard interval (e.g., 0.8 µs) of the IEEE 802.11ac Standard, the HE-STF field is generated with the normal tone spacing and a longer guard interval compared to the guard intervals supported by the IEEE 802.11ac Standard, and the HE-LTFs 230, the HE-SIGB 235 and the data portion 240 are generated with a reduced tone spacing (e.g., the ½ tone spacing 320 of FIG. 3B or the tone spacing 350 of FIG. 3C) and/or using a longer guard interval compared to guard intervals supported by the IEEE 802.11ac Standard.

Figure 5:
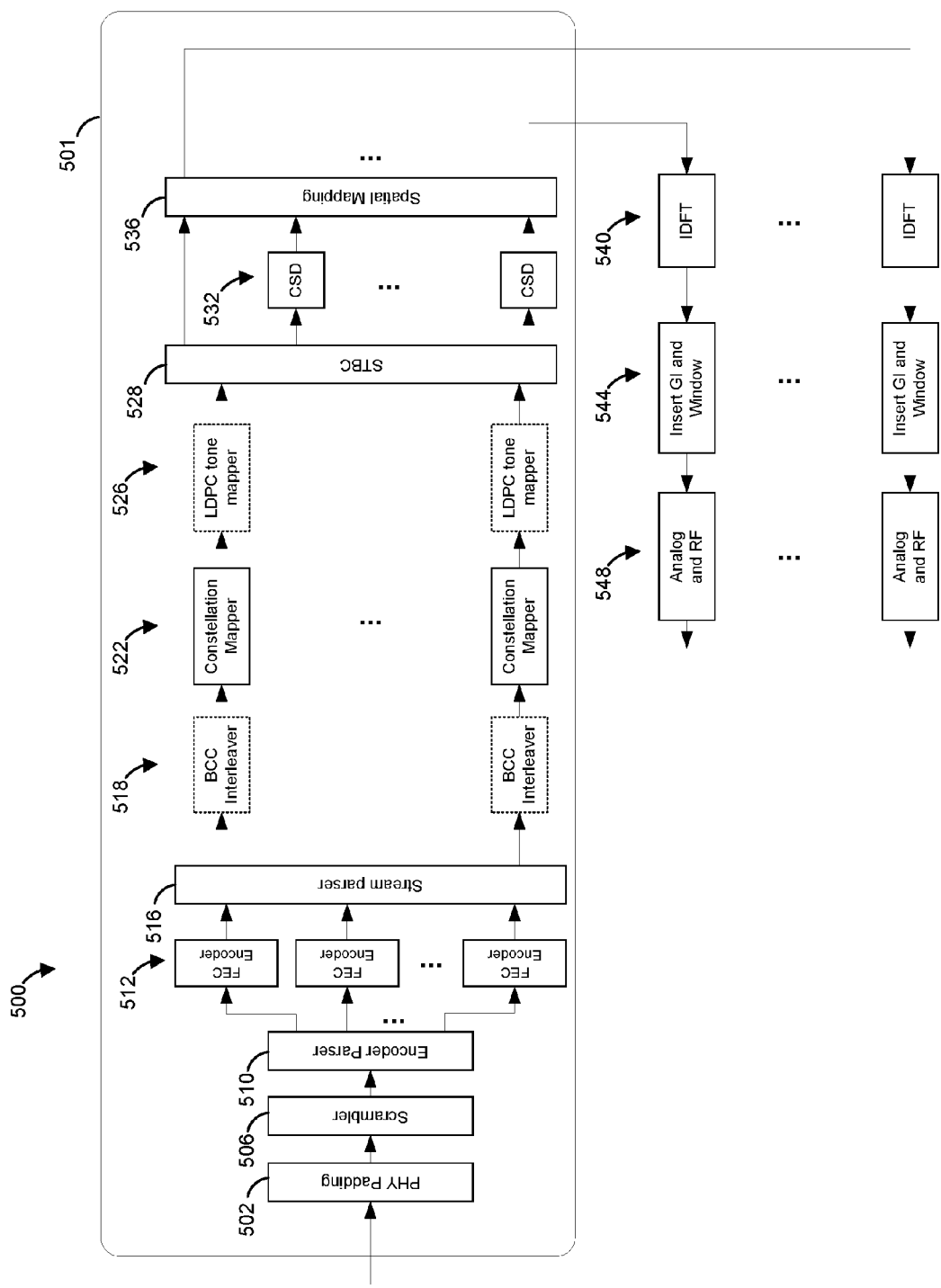
FIG. 5 is a block diagram of a PHY processing unit, according to an embodiment.

FIG. 5 is a block diagram of a transmit portion of an example PHY processing unit 500 configured to generate data units that conform to the first communication protocol, according to an embodiment. Referring to FIG. 1, the PHY processing unit 20 of AP 14 and the PHY processing unit 29 of client station 25-1 are each similar to or the same as PHY processing unit 500, in one embodiment. The PHY processing unit 500 is configured to generate data units such as the data unit 200 of FIG. 2A or the data unit 250 of FIG. 2B, in an embodiment. In other embodiments, however, the PHY processing unit 500 is configured to generate suitable data units different from the data unit 200 of FIG. 2A or the data unit 250 of FIG. 2B. Similarly, suitable PHY processing units different from the PHY processing unit 500 is configured to generate data unit such as the data unit 200 of FIG. 2A or the data unit 250 of FIG. 2B, in some embodiments.

In an embodiment, the PHY processing unit 500 includes a processing path 501, which in turn includes a PHY padding unit 502, a scrambler 506, an encoder parser 510, one or more forward error correction (FEC) encoders 512, a stream parser 516, BCC interleavers 518, constellation mappers 522, LDPC tone mappers 526, a space-time block coding (STBC) unit 528, cyclic shift diversity (CSD) units 532 and a spatial mapping unit 536. The various components of the processing path 501, according to some embodiments, are described in more detail below. Some of the components of the processing path 501 are bypassed or omitted, as described in more detail below, in some embodiments. Further, in an embodiment in which the processing unit 500 is configured to generate multi-user data units such as the OFDMA data unit 250 of FIG. 2B, the PHY processing unit 500 includes multiple processing paths 501, each processing path 501 corresponding to a particular client station to which the multi-user data unit is to be transmitted, in an embodiment. In an embodiment, each processing path 501 of the PHY processing unit 500 corresponds to a subset of OFDM tones, or a resource unit, assigned to a client station 25 to which the data unit is to be transmitted.

In an embodiment, the padding unit 502 of the processing path 501 adds one or more padding bits to an information bit stream prior to providing the information bit stream to the scrambler 506, according to an embodiment. The scrambler 506 generally scrambles the information bit stream to reduce occurrences of long sequences of ones or zeros, in an embodiment. The encoder parser 510 is coupled to the scrambler 506. The encoder parser 510 demultiplexes the information bit stream into one or more encoder input streams corresponding to one or more FEC encoders 512.

While three FEC encoders 512 are shown in FIG. 5, different numbers of FEC encoders are included, and/or different numbers of FEC encoders operate in parallel, in various embodiments and/or scenarios. For example, according to one embodiment, the PHY processing unit 500 includes four FEC encoders 512, and one, two, three, or four of the FEC encoders 512 operate simultaneously depending on the particular modulation and coding scheme (MCS), bandwidth, and number of spatial streams. Each FEC encoder 512 encodes the corresponding input stream to generate a corresponding encoded stream. In one embodiment, each FEC encoder 512 includes a binary convolutional coder (BCC). In another embodiment, each FEC 512 encoder includes a BCC followed by a puncturing block. In another embodiment, each FEC encoder 512 includes a low density parity check (LDPC) encoder. In some embodiments in which LDPC encoding is utilized, only one encoder 512 is utilized to encode the bit information stream, and the encoder parser 510 is bypassed or omitted.

A stream parser 516 parses the one or more encoded streams into one or more spatial streams for separate interleaving and mapping into constellation points/symbols. In one embodiment, the stream parser 516 operates according to the IEEE 802.11ac Standard, such that the following equation is satisfied:

$$s = \max\left\{1, \frac{N_{BPSCS}}{2}\right\} \quad \text{Equation 1}$$

where s is the number of coded bits assigned to a single axis in a constellation point for each of $N_{ss}$ spatial streams, and where $N_{BPSCS}$ is the number of bits per subcarrier. For each FEC encoder 512 (whether BCC or LDPC), consecutive blocks of s coded bits are assigned to different spatial streams in a round robin fashion, in an embodiment. In some embodiments where the set of FEC encoders 512 includes two or more BCC encoders, the outputs of the individual FEC encoders 512 are used in an alternating fashion for each round-robin cycle, i.e., initially S bits from the first FEC encoder 512 are fed into $N_{ss}$ spatial streams, then S bits from the second FEC encoder 106 are fed into the $N_{ss}$ spatial streams, and so on, where:

$$S = N_{ss} \times s \quad \text{Equation 2}$$

Corresponding to each of the $N_{ss}$ spatial streams, an interleaver 518 interleaves bits (i.e., changes the order of the bits) to prevent long sequences of adjacent noisy bits from entering a decoder at the receiving device. More specifically, the interleaver 518 maps adjacent coded bits onto non-adjacent locations in the frequency domain or in the time domain. The interleaver 518 performs two frequency permutations in each data stream, and a third permutation to cyclically shift bits differently on different streams, in an embodiment. The parameters $N_{col}$, $N_{row}$, and $N_{rot}$ (i.e., number of columns, number of rows, and frequency rotation parameter, respectively) used by the interleaver 518 are suitable values based on the bandwidth of the data unit being generated and the FFT size to be utilized for generating the data unit, in various embodiments. In an embodiment, the first permutation by the interleaver 518 ensures that adjacent coded bits are mapped onto non-adjacent sub-carriers of the signal. The second permutation performed by the interleaver 518 ensures that adjacent coded bits are mapped alternatively onto less and more significant bits of the constellation to avid long sequences of low reliability bits, in an embodiment. Further the third permutation is performed by the interleaver 518 in embodiments with multiple spatial streams, and the third permutation, in an embodiment, performs a different frequency rotation on respective different spatial streams.

In some embodiments, for example when LDPC encoding is utilized (e.g., when the FEC encoders 512 are LDPC encoders), the BCC interleavers 518 are bypassed or omitted.

In an embodiment, outputs of the BCC interleavers 518 (or outputs of the segment parsers 516 if the BCC interleavers 518 are bypassed or omitted) are provided to constellation mappers 522. In an embodiment, each constellation mapper 522 maps a sequence of bits to constellation points corresponding to different subcarriers/tones of an OFDM symbol. More specifically, for each spatial stream, a constellation mapper 522 translates every bit sequence of length $\log_2(M)$ into one of M constellation points, in an embodiment. The constellation mapper 522 handles different numbers of constellation points depending on the MCS being utilized. In an embodiment, the constellation mapper 522 is a quadrature amplitude modulation (QAM) mapper that handles M=2, 4, 16, 64, 256, and 1024. In other embodiments, the constellation mapper 522 handles different modulation schemes corresponding to M equaling different subsets of at least two values from the set {2, 4, 16, 64, 256, 1024}.

In an embodiment, when LDPC encoding is utilized, the outputs of the constellation mappers 522 are operated on by LDPC tone mappers 526. In some embodiments, when BCC encoding is utilized (e.g., when the FEC encoders 512 are BCC encoders), the LDPC tone mappers 526 are bypassed or omitted.

Each LDPC tone mapper 526 reorders constellation points corresponding to a spatial stream and a segment according to a tone remapping function. The tone remapping function is generally defined such that consecutive coded bits or blocks of information bits are mapped onto nonconsecutive tones in the OFDM symbol to facilitate data recovery at the receiving device in cases in which consecutive OFDM tones are adversely affected during transmission. LDPC tone mapper parameters (e.g., "tone mapping distance" or the distance between two OFDM tones onto which adjacent constellation points are mapped) may be different in different embodiments.

A space-time block coding (STBC) unit 528 receives the constellation points corresponding to the one or more spatial streams and spreads the spatial streams to a number ($N_{STS}$) of space-time streams. In some embodiments, the STBC unit 528 is omitted. Cyclic shift diversity (CSD) units 532 are coupled to the STBC unit 528. The CSD units 532 insert cyclic shifts into all but one of the space-time streams (if more than one space-time stream) to prevent unintentional beamforming. For ease of explanation, the inputs to the CSD units 532 are referred to as space-time streams even in embodiments in which the STBC unit 528 is omitted.

A spatial mapping unit 536 maps the $N_{STS}$ space-time streams to $N_{TX}$ transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation points from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains. Each output of the spatial mapping unit 536 corresponds to a transmit chain, and each output of the spatial mapping unit 536 is operated on by an IDFT processor 540 (e.g., an inverse fast Fourier transform (IFFT) calculation unit) that converts a block of constellation points to a time-domain signal.

Outputs of the IDFT processors 540 are provided to GI insertion and windowing units 544 that prepend to OFDM symbols, a guard interval (GI) portion, which is a circular extension of an OFDM symbol in an embodiment, and smooth the edges of OFDM symbols to increase spectral delay. Outputs of the GI insertion and windowing units 544 are provided to analog and radio frequency (RF) units 548 that convert the signals to analog signals and upconvert the signals to RF frequencies for transmission. The signals are transmitted in a 20 MHz, a 40 MHz, an 80 MHz, or a 160 MHz bandwidth channel (e.g., corresponding to a 256-, 512-, 1024-, or 2048-point IDFT at processor 540, respectively, in an embodiment, and utilizing a clock rate that is constant regardless of IDFT size), in various embodiments and/or scenarios. In other embodiments, other suitable channel bandwidths (and/or IDFT sizes) are utilized.

In various embodiments, the PHY processing unit 500 includes various suitable numbers of transmit chains (e.g., 1, 2, 3, 4, 5, 6, 7, etc.). Further, in some scenarios, the PHY processing unit 500 does not utilize all transmit chains. As merely an illustrative example, in an embodiment in which the PHY processing unit 500 includes four transmit chains, the PHY processing unit 500 may utilize only two transmit chains or only three transmit chains, for example, if only two spatial streams are being utilized.

In an embodiment, a PHY processing unit (e.g., the PHY processing unit 500) is configured to generate OFDM symbols of different sizes for different portions of a data unit (e.g., the data unit 200). For example, the PHY processing unit is configured to generate "long OFDM symbols" (e.g., generated with a reduced tone spacing, such as ¼ tone spacing) for a first set of OFDM symbols of a data unit, and to generate "short OFDM symbols" or "compressed OFDM symbols" (e.g., generated with normal tone spacing or a reduced tone spacing that is greater than the reduced tone spacing of the first set of OFDM symbols, such as ½ tone spacing) for a second set of OFDM of the data unit. In an embodiment, the second set of OFDM symbols includes the one or more padding OFDM symbols of the data portion of the data unit (e.g., the padding OFDM symbols 244 in FIG. 2). In some embodiments, the second set of OFDM symbols further includes subsets of OFDM symbols of different sizes. For example, in an embodiment in which long OFDM symbols of a data unit are generated with tone spacing corresponding to a 1024-point IDFT for an 80 MHz-wide communication channel, a first subset of short OFDM symbols of the data unit are generated with a tone spacing corresponding to a first size IDFT that is smaller than a 1024-point IDFT (e.g., 512-point IDFT), and a second subset of short OFDM symbols of the data unit are generated with a tone spacing corresponding to a second size IDFT that is smaller than a 1024-point IDFT (e.g., 256-point IDFT).

Generally speaking, transmitting the one or more padding OFDM symbols of the data portion of the data unit using short OFDM symbols reduces overhead associated with padding, in at least some embodiments. Transmitting the one or more padding OFDM symbols of the data portion of the data unit using short OFDM symbols reduces the number of coded bits in the last OFDM symbol allowing a receiving device to process the last OFDM symbol more quickly thereby providing a sufficient time for the receiving device to transmit an acknowledgement frame (Ack or BlkAck) at a predetermined time (e.g., at the expiration of a short inter-frame space (SIFS) period), in at least some embodiments.

In another embodiment, a PHY processing unit (e.g., the PHY processing unit 500) is configured to use a flexible two-stage padding scheme based on a number of excess information bits that "spill over" into a last long OFDM symbol, and to utilize variable length signal extension fields to provide sufficient buffer time for a receiving device to process the last long OFDM symbol. In an embodiment, a first stage of padding is applied to information bits prior to encoding the information bits. The first stage padding adds one or more padding bits to the information bits as needed to ensure that the padded information bits correspond to OFDM tones up to a boundary a within the long OFDM symbol, and second stage pads coded information bits (or constellation points generated based on the coded information bits) to fill the remaining portion of the long OFDM symbol after the boundary a. In an embodiment, a receiving device need not decode the second stage padding bits (or constellation points). Accordingly, the receiving device stops decoding the last OFDM symbol at the boundary a within the last OFDM symbol, in an embodiment. Further, in an embodiment, a duration of a signal extension field that follows the data portion of the data unit (e.g., the SE field 245 in FIG. 2A or the SE field 274 in FIG. 2B) is variable and is selected based on the value of the boundary a selected for the data unit. For example, a relatively longer duration of the signal extension field is selected for a relatively higher value of the variable a, in an embodiment.

In some embodiments, the short OFDM symbol scheme or the two-stage padding scheme is used when a data unit is generated using some modulation and coding schemes and/or is generated for some channel bandwidths associated with relatively higher data rates. For example, the short OFDM symbol scheme or the two-stage padding scheme is used only for an 80 MHz bandwidth channel or for a 160 MHz bandwidth channel, in an embodiment. Further, in some embodiments, a variable duration signal extension field is used only with some modulation and coding schemes associated with relatively higher data rates, such as modulation and coding schemes corresponding to MCS 5-9 defined in the IEEE 802.11ac Standard. A data unit generated using a relatively lower MCS omits the signal extension field, in this embodiment. As an example, the two-stage padding scheme is used with all data units generated for an 80 MHz BW or a 160 MHz BW, but a variable duration extension signal field is used only with data units generated using a relatively high MCS, in an example embodiment.

The particular of the boundary a is determined based on the number of excess information bits in the OFDM symbol, in an embodiment. In an embodiment, the value of the boundary a is selected from a set {¼, ½, ¾, 1} of tones of the OFDM symbol. In another embodiment, the value of the boundary a is selected from a set of integer multiples {1, 2, 3, 4} of a number of data bits per symbol in a virtual short OFDM symbol within the long OFDM symbol. In an embodiment, the selected value of the selected boundary a for a data unit is signaled to a receiving device. For example, in an embodiment, an indication of the value of the boundary a selected for a data unit is included a preamble (e.g., in a signal field) of the data unit. As just an example, referring to FIG. 2A, the HE-SIGA field 220 or the HE_SIGB field 235 of the data unit 200 includes an indication of the selected value of the boundary a used in the last OFDM symbol corresponding to the padding portion 224 of the data unit 200, in an embodiment. Similarly, as just another example, referring to FIG. 2B, the HE-SIGA field 260 or the HE-SIGB field 266 of the data unit 250 includes an indication of the selected value of the boundary a used in the last OFDM symbol corresponding to the padding portion 272 of the data unit 250, in an embodiment. In an embodiment, the receiving device only needs to decode and process the padding OFDM symbol up to the indicated boundary a. Accordingly, as discussed above, the remaining portion of the padding OFDM symbol after the boundary a need not be decoded or processed at the receiving device and provides buffer time in the last OFDM symbol for processing the first portion up to the boundary a of the last OFDM symbol, in an embodiment.

In an embodiment, the duration of a signal extension field that follows the data portion of a data unit (e.g., SE field 245 in FIG. 2A or the SE field 274 in FIG. 2B) is selected based on the value of the boundary a selected for the last OFDM symbol of the data unit. Accordingly, the duration of the SE field is selected based on the amount of buffer time provided by the second stage padding in the last OFDM symbol of the data portion of the data unit, in this embodiment. For example, a relatively shorter SE field (or no SE field) is used when a smaller boundary value a is selected because in this case the last OFDM symbol provides a greater buffer time for the receiving device to process the last OFDM symbol, in an embodiment. On the other hand, a longer SE field is used when a larger boundary value a is selected because in this case the last OFDM symbol provides less buffer time for the receiving device to process the last OFDM symbol, in an embodiment. Example boundaries and corresponding example signal extension fields according to some embodiments are described in more detail below with respect to FIGS. 10 and 11.

Figure 6:
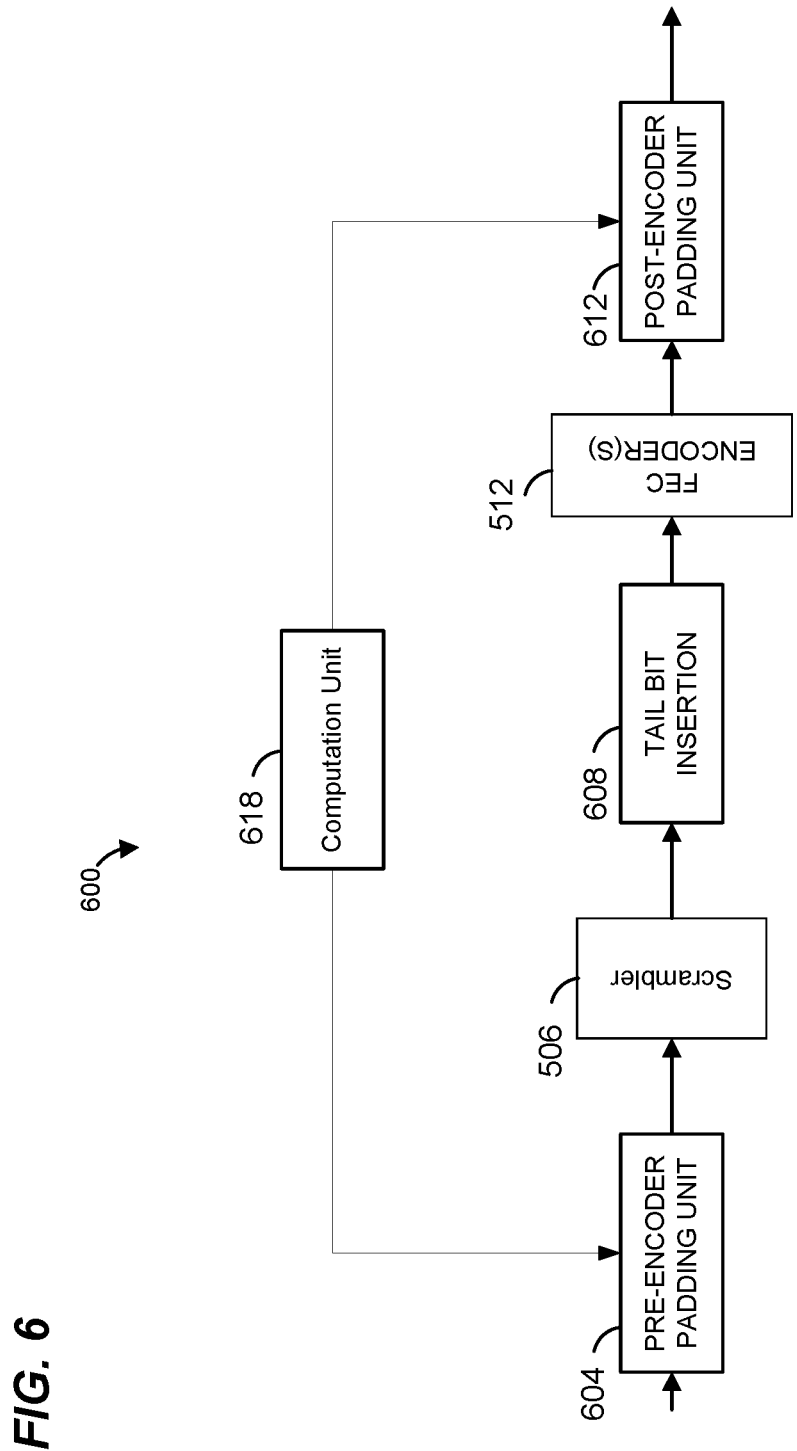
FIG. 6 is a block diagram of an example padding system, according to an embodiment.

FIG. 6 is a block diagram of an example padding system 600, according to an embodiment. The padding system 600 is utilized in conjunction with the PHY processing unit 500 of FIG. 5, according to an embodiment. In another embodiment, another suitable padding system different than the padding system 600 is utilized in conjunction with the PHY processing unit 500. Similarly, the PHY processing 500 implements a suitable padding system different from the padding system 600, in some embodiments. In an embodiment, the padding system 600 is used in an embodiment in which the FEC encoders 512 are BCC encoders. The padding system 600 includes a pre-encoder padding unit 604, a post-encoder padding unit 612, and a computation unit 618 coupled to the pre-encoder padding unit 604 and the post-encoder padding unit 612. The pre-encoder padding unit 604 and the post-encoder padding unit 612 is each included in the PHY unit 500 of FIG. 5, according to one embodiment. The pre-encoder padding unit 604 is at least partially included in the MAC unit 18, 28 of FIG. 1, according to another embodiment.

In an embodiment, the computation unit 618 determines the number of pre-encoding padding bits based on the number of excess information bits that do not fit into a minimum integer number of OFDM symbols. For example, in an embodiment, OFDM symbols of the data portion 204 are virtually divided into long OFDM symbols and short OFDM symbols, where a short OFDM symbol corresponds to a portion (e.g., ¼, ½, etc.) of a long OFDM symbol. In particular, in an embodiment, the last long OFDM symbol is virtually sub-divided into an integer number of short OFDM symbols (e.g., 2 short OFDM symbols, 4 short OFDM symbols, etc.), with each short OFDM symbol being a corresponding portion (e.g., ½, ¼, etc.) of the last long OFDM symbol. The padding unit 604 adds a number $N_{PAD1}$ of padding bits to the information bits such that, after being encoded by the encoders 518, the coded bits will fill the last OFDM symbol up to a first portion of the last OFDM symbol. The padding unit 612 adds a number $N_{PAD2}$ of padding bits to the coded information bits such that the coded information bits completely fill the entire last OFDM symbol, in an embodiment.

In an embodiment, the computation unit 618 computes a value of the variable a based on a number of excess information bits that do not fit into a minimum integer number of OFDM symbols fully filled with information bits. To this end, in an embodiment, the computation unit 618 computes a number of long OFDM symbols needed to include all information bits is computed according to $$N_{SYM\_LONG} = m_{STBC} \left\lceil \frac{8 \cdot L + N_{service} - N_{init} \cdot N_{ES}}{m_{STBC} \cdot N_{DBPS\_LONG}} \right\rceil \quad \text{Equation 3}$$

and computes an excess number of bits $N_{Excess}$ according to $$N_{Excess} = \text{mod}(8 \cdot L + N_{service} + k_{tail} \cdot N_{ES}, N_{DBPS\_LONG}) \quad \text{Equation 4}$$

Then, based on the excess number of bits $N_{Excess}$ the computation unit 618 determines a value of the variable a by comparing $N_{Excess}$ to a threshold, and assigning a value to the variable a based on the comparison of $N_{Excess}$ to the threshold. In an embodiment, a number of data bits in a virtual short OFDM symbol, determined by (i) the channel bandwidth, (ii) the number of spatial streams and (iii) MCS being utilized is used as the threshold. In this embodiment, the value of the variable a is determined according to if $N_{Excess} \leq N_{DBPS.SHORT}$ then $a=1$ if $N_{DBPS.SHORT} < N_{Excess} \leq 2 \cdot N_{DBPS.SHORT}$ then $a=2$ if $2 \cdot N_{DBPS.SHORT} < N_{Excess} \leq 3 \cdot N_{DBPS.SHORT}$ then $a=3$ if $3 \cdot N_{DBPS.SHORT} < N_{Excess} \leq N_{DBPS.LONG}$ then $a=4$  Equation 5

The number of data bits in the last OFDM symbol is then determined, in an embodiment, based on the value of the variable a, according to $$N_{DBPS.LAST} = \begin{cases} a \cdot N_{DBPS.SHORT} & \text{if } a < 4 \\ N_{DBPS.LONG} & \text{if } a = 4 \end{cases} \quad \text{Equation 6}$$

And the number of coded bits in the last OFDM symbol is determined, in an embodiment, according to $$N_{CBPS.LAST} = \begin{cases} a \cdot N_{CBPS.SHORT} & \text{if } a < 4 \\ N_{CBPS.LONG} & \text{if } a = 4 \end{cases} \quad \text{Equation 7}$$

In another embodiment a suitable threshold different from $N_{DBPS.SHORT}$ is used. For example, a threshold that corresponds at least approximately to ¼ $N_{DBPS.LONG}$ is used, in one example embodiment.

In an embodiment, the number of pre-encoder padding bits $N_{PAD1}$ to be added to information bits, prior to encoding the information bits, by the padding unit 604 is determined according to $N_{PAD1} = \max<(N_{SYM.LONG} - m_{STBS}), 0> \cdot N_{DBPS.LONG} + N_{SYM.LAST.init} \cdot m_{STBS} - 8 \cdot L - N_{service}$  Equation 8

The number of post-encoder padding bits $N_{PAD2}$ to be added to the coded information bits by the padding unit 612 is determined according to $N_{PAD2} = N_{DBPS.LONG} - N_{SYM.LAST}$  Equation 9

In an embodiment, the padding unit 604 adds the number of padding bits $N_{PAD1}$ (e.g., determined according to Equation 8) to the information bits and provides the padded information bits to the scrambler 316. The padding unit 604 is included in the PHY unit 500 of FIG. 5, according to one embodiment. The padding unit 604 is at least partially included in the MAC unit 18, 28 of FIG. 1, according to another embodiment. A tail bit insertion unit 508 inserts a number of tail bits to padded and scrambled information bits, and the padded and scrambled information bits are then encoded using one or more encoders 512. In an embodiment, the tail insertion unit 608 inserts $6 \cdot N_{ss}$ tail bits, where $N_{ss}$ is the number of FEC encoders to be used to encode the information bits. In another embodiment, the tail insertion unit 608 inserts another suitable number of tail bits.

After being encoded by the FEC encoder(s) 512, the coded information bits are provided to the post-encoder padding unit 612. The post-encoder padding unit 612 pads the coded bits such that the coded bits completely fill the entire last OFDM symbol. In an embodiment, the post-encoding padding unit 612 adds the number of padding bits $N_{PAD2}$ (e.g., determined according to Equation 9).

Figure 7:
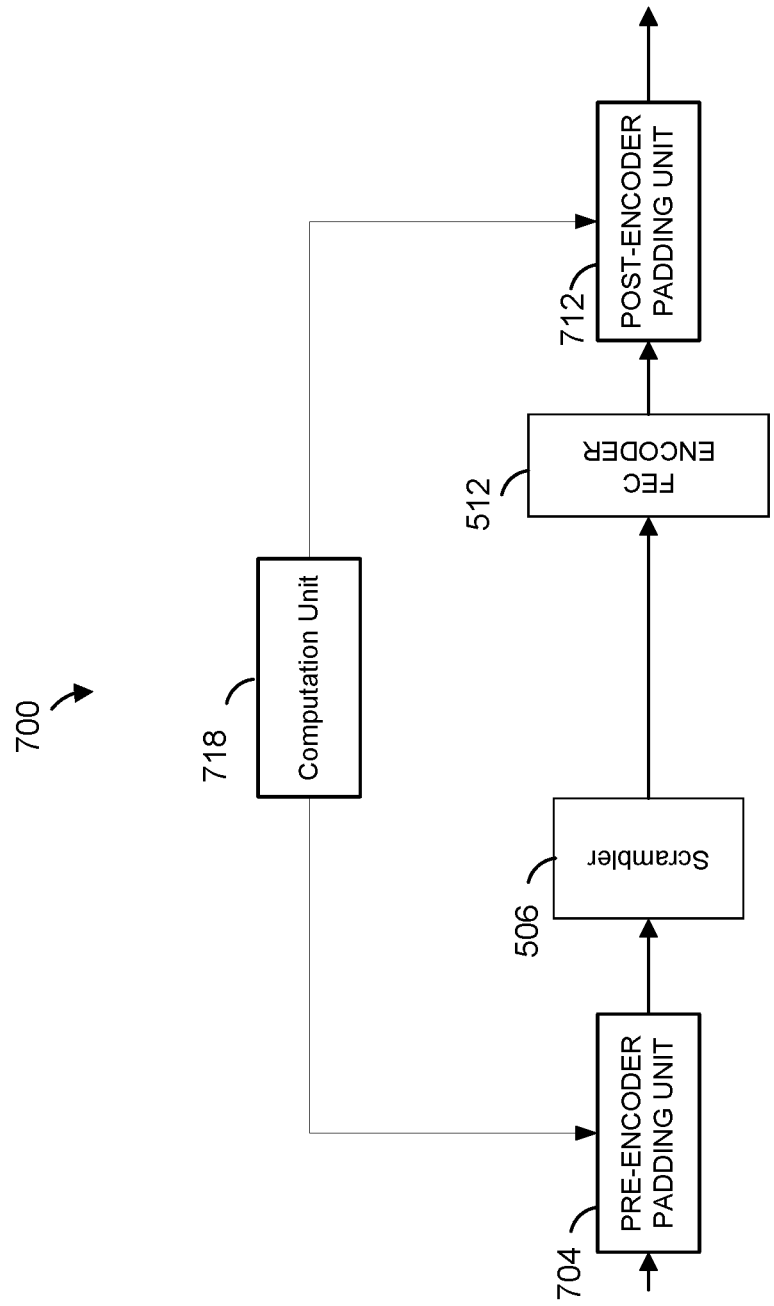
FIG. 7 is a block diagram of another example padding system, according to another embodiment.

FIG. 7 is a block diagram of an example padding system 700, according to an embodiment. The padding system 700 is utilized in conjunction with the PHY processing unit 500 of FIG. 5, according to an embodiment. In another embodiment, another suitable padding system different than the padding system 700 is utilized in conjunction with the PHY processing unit 500. Similarly, the PHY processing 500 implements a suitable padding system different from the padding system 700, in some embodiments. In an embodiment, the padding system 700 is used in an embodiment in which the FEC encoders 512 are LDPC encoders. The padding system 700 includes a pre-encoder padding unit 704, a post-encoder padding unit 712, and a computation unit 718 coupled to the pre-encoder padding unit 704 and the post-encoder padding unit 712. The pre-encoder padding unit 704 and the post-encoder padding unit 712 is each included in the PHY unit 500 of FIG. 5, according to one embodiment. The pre-encoder padding unit 704 is at least partially included in the MAC unit 18, 28 of FIG. 1, according to another embodiment.

In an embodiment, the variable a computation unit 718 computes a value of the variable a based on a number of excess information bits that do not fit into a minimum integer number of OFDM symbols fully filled with information bits. To this end, in an embodiment, the computation unit 718 computes an initial number of long OFDM symbols needed to include all information bits is computed according to $$N_{SYM.LONG.init} = m_{STBC} \left\lceil \frac{8 \cdot L + N_{service}}{m_{STBC} \cdot N_{DBPS.LONG}} \right\rceil \quad \text{Equation 10}$$

and computes an initial excess number of bits $N_{Excess}$ according to $N_{Excess.init} = \mod(8 \cdot L + N_{service}, N_{DBPS.LONG})$  Equation 11

Then, based on the initial excess number of bits $N_{Excess.init}$, the computation unit 718 determines an initial a value of the variable a ($a_{init}$) by comparing $N_{Excess}$ to a threshold, and assigning a value to the variable a based on the comparison of $N_{Excess}$ to the threshold. In an embodiment, a number of data bits in a virtual short OFDM symbol, determined by (i) the channel bandwidth, (ii) the number of spatial streams and (iii) MCS being utilized is used as the threshold. In this embodiment, the value of the variable a is determined according to $N_{Excess.init} \leq N_{DBPS.SHORT}$ then $a_{init}=1$ if $N_{DBPS.SHORT} < N_{Excess.init} \leq 2 \cdot N_{DBPS.SHORT}$ then $a_{init}=2$ if $2 \cdot N_{DBPS.SHORT} < N_{Excess.init} \leq 3 \cdot N_{DBPS.SHORT}$, then $a_{init}=3$ if $3 \cdot N_{DBPS.SHORT} < N_{Excess.init} \leq N_{DBPS.LONG}$ then $a_{init}=4$  Equation 12

An initial number of data bits in the last OFDM symbol is then determined, in an embodiment, based on the value of the variable $a_{init}$, according to $$N_{DBPS.LAST.init} = \begin{cases} a_{init} \cdot N_{DBPS.SHORT} & \text{if } a_{init} < 4 \\ N_{DBPS.LONG} & \text{if } a_{init} = 4 \end{cases} \quad \text{Equation 13}$$

And an initial number of coded bits in the last OFDM symbol is determined, in an embodiment, according to $$N_{CBPS.LAST.init} = \begin{cases} a_{init} \cdot N_{CBPS.SHORT} & \text{if } a_{init} < 4 \\ N_{CBPS.LONG} & \text{if } a_{init} = 4 \end{cases} \quad \text{Equation 14}$$

In another embodiment a suitable threshold different from $N_{DBPS.SHORT}$ is used. For example, a threshold that corresponds at least approximately to ¼ $N_{DBPS.LONG}$ is used, in one example embodiment.

In an embodiment, the number of pre-encoder padding bits $N_{PAD1}$ to be added to information bits, prior to encoding the information bits, by the padding unit 604 is determined according to $$N_{PAD1} = \max\{(N_{SYM.LONG.init} - m_{STBS}), 0\} \cdot N_{DBPS.LONG} + N_{DBPS.LAST.init} \cdot m_{STBS} \quad \text{Equation 15}$$

LDPC encoder parameters $N_{pld}$ and $N_{avbits}$ are then determined, respectively, according to $$N_{pld} = \max\{(N_{SYM.LONG.init} - m_{STBS}), 0\} \cdot N_{DBPS.LONG} + N_{DBPS.LAST.init} \cdot m_{STBS} \quad \text{Equation 16}$$

and $$N_{avbits} = \max\{(N_{SYM.LONG.init} - m_{STBS}), 0\} \cdot N_{CBPS.LONG} + N_{CBPS.LAST.init} \cdot m_{STBS} \quad \text{Equation 17}$$

The number of code words $N_{cw}$, number of shortening bits $N_{shrt}$, number of puncturing bits $N_{punc}$ and number of repetition bits $N_{rep}$ are then determined based on the number of $N_{avbits}$ determined according to Equation 17, in an embodiment. For example, $N_{cw}$, $N_{shrt}$, $N_{punc}$ and $N_{rep}$ are determined as described in the IEEE 802.11n Standard, in an embodiment.

In some situations, as also described, for example, in the IEEE 802.11n Standard, the number of available bits in the minimum number of OFDM symbols is incremented by the number of available bits in one or, if space time block coding is used, two OFDM symbols. For example, in an embodiment, the number of available bits is incremented by the number of available bits in one or, if space time block coding is used, two short OFDM symbols. In an embodiment, if the number of available bits is updated, then the value of the variable a is updated accordingly and, if necessary, the number of long OFDM symbols is updated according to $$N_{avbits.new} = N_{avbits} + N_{CPBS.SHORT} \cdot m_{STBC} \quad \text{Equation 18}$$

Then, the final number of short OFDM symbols is determined, based on the new number of available bits per OFDM symbol, in an embodiment, according to $$N_{SYM.SHORT} = \frac{N_{avbits.new} - N_{CBPS.LONG} \cdot N_{SYM.LONG}}{N_{CBPS.SHORT}} \quad \text{Equation 19}$$

$$a = a_{init} + 1 \quad \text{Equation 20}$$

If $a > 4$, then $a = a - 4$, and $N_{SYM.LONG} = N_{SYM.LONG.init} + m_{STBC}$
Otherwise, $N_{SYM.LONG} = N_{SYM.LONG.init}$ Equation 21

In an embodiment, the number of coded bits in the last OFDM symbol is updated, based on the updated value of the variable a, according to $$N_{CBPS.LAST} = \begin{cases} a \cdot N_{CBPS.SHORT} & \text{if } a < 4 \\ N_{CBPS.LONG} & \text{if } a = 4 \end{cases} \quad \text{Equation 22}$$

The number of post-encoder padding bits $N_{PAD2}$ to be added to the coded information bits by the padding unit 612 is determined according to $$N_{PAD2} = N_{DBPS.LONG} - N_{SYM.LAST}. \quad \text{Equation 23}$$

In an embodiment, for a multi-user data unit, such as the data unit 250 of FIG. 2B, or the data unit 200 of FIG. 2A in an embodiment in which the data unit 200 is an MU data, the computation unit 718 computes the value of the variable a based on the user with the longest packet duration. To this end, the computation unit 718 computes an initial number of long OFDM symbols, and an initial value a, for each user u according to $$N_{SYM.LONG.init.u} = m_{STBC} \left\lceil \frac{8 \cdot L_u + N_{service}}{m_{STBC} \cdot N_{DBPS.LONG}} \right\rceil \quad \text{Equation 24}$$

where $L_u$ is the number of octets of information bits corresponding to the user u. Further, the computation unit 718 computes an initial excess number of bits $N_{Excess.u}$ for each user u according to $$N_{Excess.u} = \text{mod}(8 \cdot L_u + N_{service}, N_{DBPS.LONG.u}) \quad \text{Equation 25}$$

Then, for each user u, based on the initial excess number of bits $N_{Excess.u}$ for the corresponding user u, the computation unit 718 determines an initial value of the variable a ($a_{init.u}$) by comparing the corresponding comparing $N_{Excess.u}$ to a threshold, and assigning a value to the variable a based on the comparison of $N_{Excess.u}$ to the threshold. In an embodiment, a number of data bits in a virtual short OFDM symbol, determined by (i) the channel bandwidth, (ii) the number of spatial streams and (iii) MCS being utilized is used as the threshold. In this embodiment, the value of the variable a is determined according to if $N_{Excess.u} \leq N_{DBPS.SHORT.u}$, then $a_{init.u} = 1$ if $N_{DBPS.SHORT.u} < N_{Excess.u} \leq 2 \cdot N_{DBPS.SHORT.u}$ then $a_{init.u} = 2$ if $2 \cdot N_{DBPS.SHORT.u} < N_{Excess.u} \leq 3 \cdot N_{DBPS.SHORT.u}$ then $a_{init.u} = 3$ if $3 \cdot N_{DBPS.SHORT.u} < N_{Excess.u} \leq N_{DBPS.LONG.u}$ then $a_{init.u} = 4$ Equation 26

Then, in an embodiment, the user with the maximum packet duration is selected according to $$u_{max} = \arg\max_{u=0}^{N_u-1}(N_{SYM.LONG.u} - 1 + \beta \cdot a_{init.u}) \quad \text{Equation 27}$$

where β is the ratio of the number of data tones in a short OFDM symbol corresponding to the user u to the number of data tones in a long OFDM symbol corresponding to the user u. In an example embodiment, β=0.25. In another embodiment, β is a suitable value other than 0.25.

The initial number of long OFDM symbols and the initial value of a are then determined to, respectively, according to $$N_{SYM.LONG.init} = N_{SYM.LONG.init.u_{max}} \quad \text{Equation 28}$$

and $$a_{.init} = a_{init.u_{max}} \quad \text{Equation 29}$$

An initial number of data bits in the last OFDM symbol is then determined, in an embodiment, based on the value of the variable $a_{init}$, according to $$N_{DBPS.LAST.init.u} = \begin{cases} a_{init} \cdot N_{DBPS.SHORT.u} & \text{if } a_{init} < 4 \\ N_{DBPS.LONG.u} & \text{if } a_{init} = 4 \end{cases} \quad \text{Equation 30}$$

And an initial number of coded bits in the last OFDM symbol is determined, in an embodiment, according to $$N_{CBPS.LAST.init.u} = \begin{cases} a_{init} \cdot N_{CBPS.SHORT.u} & \text{if } a_{init} < 4 \\ N_{CBPS.LONG.u} & \text{if } a_{init} = 4 \end{cases} \quad \text{Equation 31}$$

In another embodiment a suitable threshold different from $N_{DBPS.SHORT}$ is used. For example, a threshold that corresponds at least approximately to ¼ $N_{DBPS.LONG}$ is used, in one example embodiment.

In an embodiment, the number of pre-encoder padding bits $N_{PAD1}$ to be added to information bits for each user u, prior to encoding the information bits for the user u, is determined according to $$N_{PAD1.u} = \max\{(N_{SYM.LONG.init} - m_{STBS}), 0\} \cdot N_{DBPS.LONG.u} + N_{DBPS.LAST.init.u} \cdot m_{STBS} - 8L_u - N_{service} \quad \text{Equation 32}$$

LDPC encoder parameters $N_{pld}$ and $N_{avbits}$ for each user are then determined, respectively, according to $$N_{pld.u} = \max\{(N_{SYM.LONG.init} - m_{STBS}), 0\} \cdot N_{DBPS.LONG.u} + N_{DBPS.LAST.init.u} \cdot m_{STBS} \quad \text{Equation 33}$$

and $$N_{avbits.u} = \max\{(N_{SYM.LONG.init.u} - m_{STBS}), 0\} \cdot N_{CBPS.LONG} + N_{CBPS.LAST.init.u} \cdot m_{STBS} \quad \text{Equation 34}$$

The number of code words $N_{cw}$, number of shortening bits $N_{shrt}$, number of puncturing bits $N_{punc}$ and number of repetition bits $N_{rep}$ are then determined for each user based on the number of $N_{avbits.u}$ determined for the corresponding user according to Equation 34, in an embodiment. For example, $N_{cw}$, $N_{shrt}$, $N_{punc}$ and $N_{rep}$ are determined for each user as described in the IEEE 802.11n Standard, in an embodiment.

In some situations, as also described, for example, in the IEEE 802.11n Standard, the number of available bits in the minimum number of OFDM symbols is incremented by the number of available bits in one or, if space time block coding is used, two OFDM symbols. For example, in an embodiment, the number of available bits for a user is incremented by the number of available bits in one or, if space time block coding is used, two short OFDM symbols for the corresponding user according to $$N_{avbits.new.u} = N_{avbits.u} + N_{CPBS.SHORT.u} \cdot m_{STBC} \quad \text{Equation 35}$$

In an embodiment, if the number of available bits is updated for at least one user, then the value of the variable a is updated accordingly and, if necessary, the number of long OFDM symbols is updated according to $$a = a_{init} + 1 \quad \text{Equation 36}$$

If $a > 4$, then $a = a - 4$, and $N_{SYM.LONG} = N_{SYM.LONG.init} + m_{STBC}$

Otherwise, $N_{SYM.LONG} = N_{SYM.LONG.init}$ \quad Equation 37

In an embodiment, the number of coded bits in the last OFDM symbol for each user is updated, based on the updated value of the variable a, according to $$N_{CBPS.LAST.u} = \begin{cases} a \cdot N_{CBPS.SHORT.u} & \text{if } a < 4 \\ N_{CBPS.LONG.u} & \text{if } a = 4 \end{cases} \quad \text{Equation 38}$$

Further, at least some of the LDPC encoder parameters are updated for all LDPC users. For example, the number of puncturing bits Npunct for each LDPC user is updated according to $$N_{punct.u} = \max(0, N_{cw.u} \cdot L_{LDPC.u} - N_{avbits.new.u} - N_{shrt.u}). \quad \text{Equation 39}$$

The number of post-encoder padding bits $N_{PAD2}$ to be added to the coded information bits for each user is determined according to $$N_{PAD2.u} = N_{DBPS.LONG.u} - N_{SYM.LAST.u}. \quad \text{Equation 40}$$

In an embodiment, information bits and first padding bits are encoded to generate $N_{SYM.LONG}$ long OFDM symbols, and then $N_{PAD2.u}$ are added for each user u in each of last $m_{STBS}$ OFDM symbols.

In an embodiment, if the number of long OFDM symbols is updated according to Equation 37, this is indicated in a signal field (e.g., the HE-SIGA field or the HE-SIGB field) of the preamble of the data unit. For example, an "extra padding bit" indication $N_{ldpc\_ext}$ in the signal field is set to a logic one (1) to indicate that the number of long OFDM symbols was updated, in an embodiment. Additionally, the final (updated or non-updated) value of the variable a is signaled in a signal field of the preamble, in an embodiment.

As discussed above, in an embodiment, a signal extension field is included in a data unit following the last OFDM symbol of the data portion of the data unit. In an embodiment, a transmitting device determines whether or not to include a signal extension field, and a duration of the signal extension field if the signal field is to be included in the data unit, based on the value of the variable a. In an embodiment, a signal field (e.g., LSIG field, HE-SIGA or HE-SIGB) of the data unit includes an $E_{TSE}$ indication to indicate presence or absence of a signal extension field in the data unit.

A receiving device that receives the data unit determines an initial number of long OFDM symbols based on the value of the LENGTH field in the L-SIG field in the data unit. Then, the receiving device determines the actual number of long OFDM symbols, based on the extra padding bit indication $N_{ldpc\_ext}$ and the value of the variable a in the HE-SIGA field in the data unit, according to $$N_{SYM.LONG} = \begin{cases} N_{SYM.LONG.init} + m_{STBC} & \text{if } a = 1 \text{ and } N_{ldpc\_ext} = 1 \\ N_{SYM.LONG.init} & \text{otherwise} \end{cases} \quad \text{Equation 41}$$

and

-continued $$a = a_{init} + N_{ldpc\_ext} \quad \text{Equation 42}$$

if $a > 4$, then $a = a - 4$.

In an embodiment, a receiving device determines the duration of the data unit based on a LENGTH indication in the LSIG field of the data unit and further based on an indication of the value of the variable a and the $E_{TSE}$ indication that indicates presence or absence of a signal extension field in the data unit. In an embodiment, the transmitting device determines a value of the LENGTH field according to $$\text{LENGTH} = \left\lceil \frac{TXTIME - 20}{4} \right\rceil \times 3 - 3 + m_{STBS}. \quad \text{Equation 43}$$

where $$TXTIME = \quad \text{Equation 44}$$
$$T_{L\_PREAMBLE} + T_{HE\_PREAMBLE} + T_{HE\_DATA} + T_{SE}$$

where $$T_{HE\_DATA} = \quad \text{Equation 45}$$
$$T_{HE\_SYM} \times N_{SYM.LONG} = (12.8 + T_{GI}) \times N_{SYM.LONG}$$

At a receiving device, in an embodiment, a number of long OFDM symbols in a data unit is determined according to $$N_{SYM.LONG} = \left\lfloor \left( \frac{\text{LENGTH} - m_{STBC} + 3}{3} \times 4 - \right. \right. \quad \text{Equation 46}$$
$$\left. \left. T_{L\_PREAMBLE} + T_{HE\_PREAMBLE} T_{SE} \right) / (12.8 + T_{GI}) \right\rfloor.$$

In the equations above, it is assumed that space time block coding is used with all OFDM symbols of a data portion of a data unit if a signal field of the data unit indicates that space time block coding is utilized for the data unit. In some embodiments, however, space time block coding is not applied to the last OFDM symbol of a data portion of a data unit even if the signal field of the data unit indicates that space time block coding is used in the data unit. In such embodiments, the equations above are modified accordingly to account for absence of space time block coding in the last OFDM symbol of the data unit.

Figure 8:
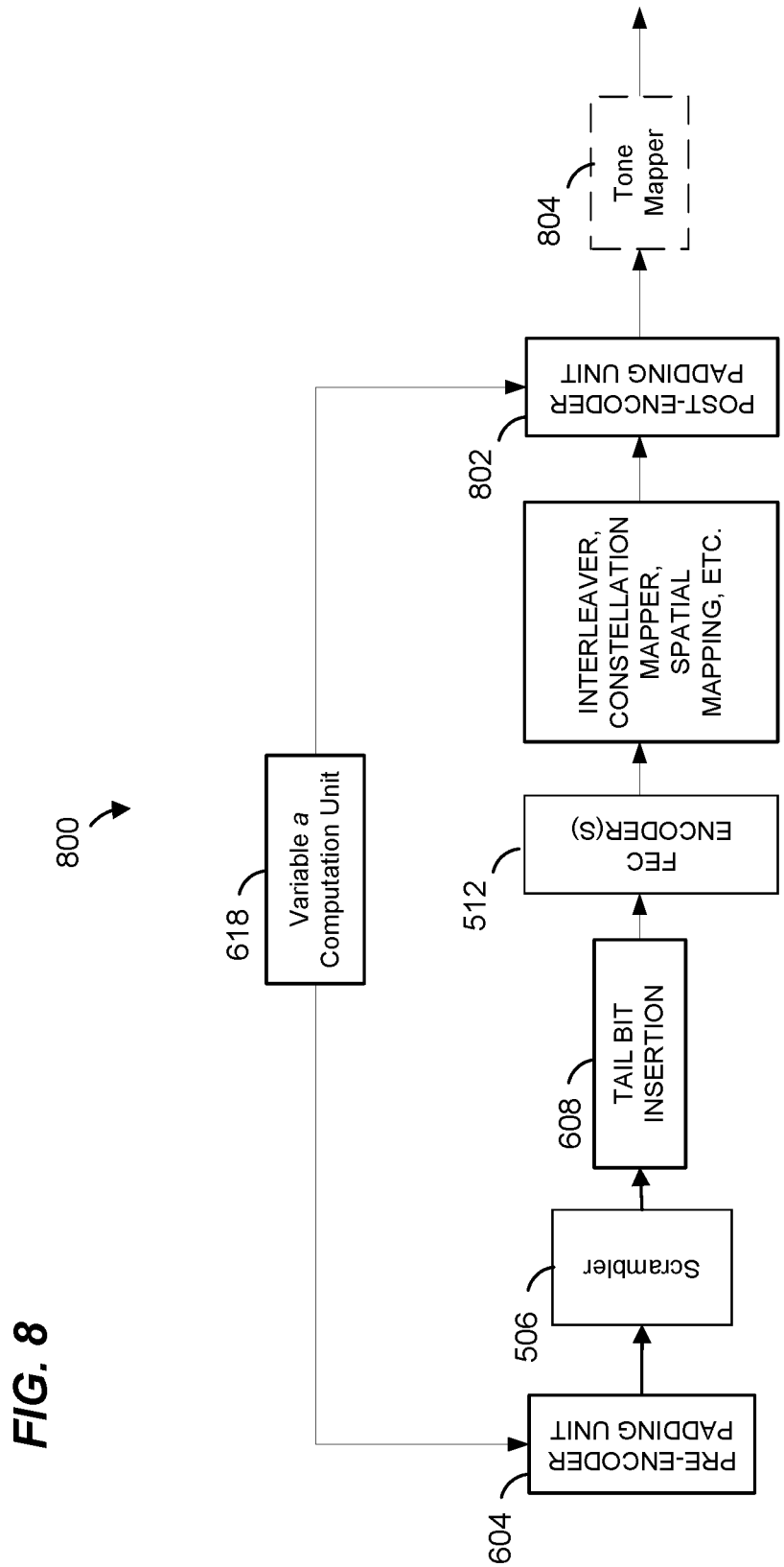
FIG. 8 is a block diagram of another example padding system, according to another embodiment.

FIG. 8 is a block diagram of an example padding system 800, according to an embodiment. The padding system 800 is utilized in conjunction with the PHY processing unit 500 of FIG. 5, according to an embodiment. In another embodiment, another suitable padding system different than the padding system 800 is utilized in conjunction with the PHY processing unit 500. Similarly, the PHY processing 500 implements a suitable padding system different from the padding system 600, in some embodiments. The padding system 800 is used in an embodiment in which the FEC encoders 512 are FEC encoders.

The padding system 800 is generally similar to the passing system 600 of FIG. 6, except that in the padding system 800 post-encoder padding is performed on constellation points rather than coded information bits, in an embodiment. Referring to FIG. 5, in an embodiment, post encoder constellation point padding is performed immediately before the IDFT units 540. The padding system 800 includes a post-encoder padding unit 802 that operates on constellation points at the output of the spatial mapping unit 536, in an embodiment. In an embodiment, the PHY padding system 800 additionally includes a tone mapping unit 804. The tone mapping unit 804 is similar to the LDPC tone mappers 526, in an embodiment. In another embodiment, the tone mapping unit 804 is different from the LDPC tone mappers 526. In yet another embodiment, the padding system 800 omits the tone mapping unit 804.

Figure 9:
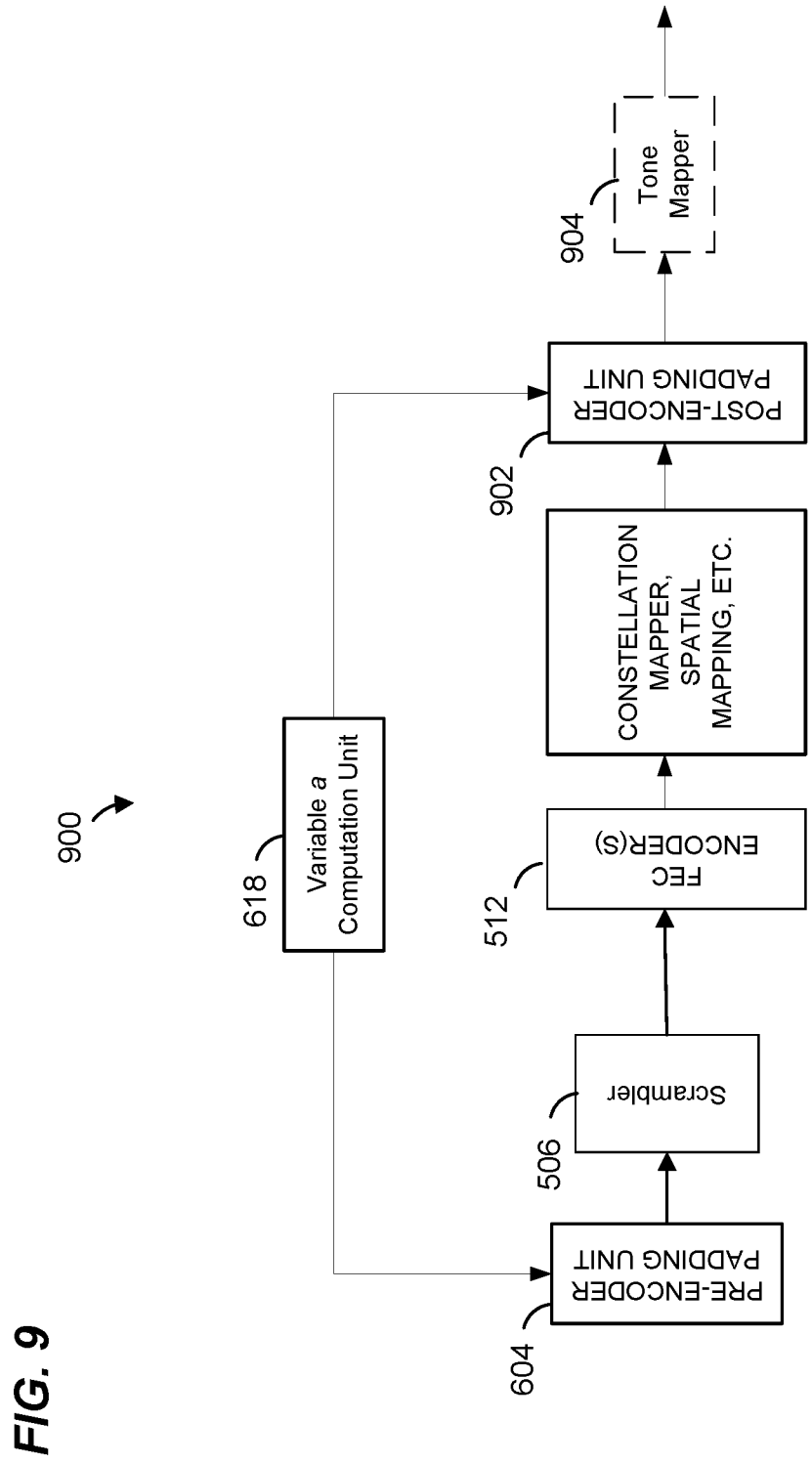
FIG. 9 is a block diagram of another example padding system, according to another embodiment.

FIG. 9 is a block diagram of an example padding system 900, according to an embodiment. The padding system 900 is utilized in conjunction with the PHY processing unit 500 of FIG. 5, according to an embodiment. In another embodiment, another suitable padding system different than the padding system 900 is utilized in conjunction with the PHY processing unit 500. Similarly, the PHY processing 500 implements a suitable padding system different from the padding system 900, in some embodiments. The padding system 900 is used in an embodiment in which the FEC encoders 512 are LDPC encoders.

The padding system 900 is generally similar to the passing system 700 of FIG. 7, except that in the padding system 900 post-encoder padding is performed on constellation points rather than coded information bits, in an embodiment. Referring to FIG. 5, in an embodiment, post encoder constellation point padding is performed immediately before the IDFT units 540. The padding system 900 includes a post-encoder padding unit 902 that operates on constellation points at the output of the spatial mapping unit 536, in an embodiment. In an embodiment, the PHY padding system 900 additionally includes a tone mapping unit 904. The tone mapping unit 904 is similar to the LDPC tone mappers 526, in an embodiment. In another embodiment, the tone mapping unit 904 is different from the LDPC tone mappers 526. In yet another embodiment, the padding system 800 omits the tone mapping unit 904.

In an embodiment, the number of constellation points to be added by the post-encoder padding unit 902 is determined in a manner similar to the number of post-encoder padding bits as described above except that the equations for determining the number of coded bits in the last OFDM symbol are replaced by $$N_{TONE.LAST} = \begin{cases} a \cdot N_{TONE.SHORT} & \text{if } a < 4 \\ N_{TONE.LONG} & \text{if } a = 4 \end{cases} \quad \text{Equation 47}$$

and the equations for determining the number of second padding bits are replaced by $$N_{TONE.PAD2} = N_{TONE.LONG} - N_{TONE.LAST}. \quad \text{Equation 48}$$

where $N_{TONE.SHORT}$ is the number of data tones in a short OFDM symbol, and $N_{TONE.LONG}$ is the number of data tones in a long OFDM symbol. The post-encoder padding unit 902 adds $N_{TONE.PAD2}$ constellation points in each of $m_{STBC}$ last OFDM symbols of the data portion of a data unit, in an embodiment.

In an embodiment, the length or duration of the signal extension field 245 or the signal extension field 270 is variable, with a length or duration used with a particular data unit determined based on the number of post-encoder padding bits or the number of post-encoder constellation points included in the particular data unit. For example, in an embodiment, the length or duration of the signal extension field 245 or the signal extension field 270 is determined based on the value a calculated as described above based on the number of excess information bits in the last OFDM symbol of the data unit.

FIGS. 10A-10D are block diagrams illustrating padding scenarios and signal extension field durations used with data units having different values of a and, accordingly, different numbers of post-encoder padding bits in an OFDM symbol 1000, according to an embodiment. Referring to FIG. 2A, the OFDM symbol 1000 is the last OFDM symbol of the data portion 240 of the data unit 200, in an embodiment. Similarly, referring to FIG. 2B, the OFDM symbol 1000 is the last OFDM symbol of the data portion 268 of a data unit 252, in another embodiment. In an embodiment, the OFDM symbol 1000 is generated using one of the padding systems 600-900 of FIGS. 6-9. In another embodiment, the OFDM symbol 1000 is generated using a suitable padding system different from the padding systems 600-900 of FIGS. 6-9.

Figure 10A:
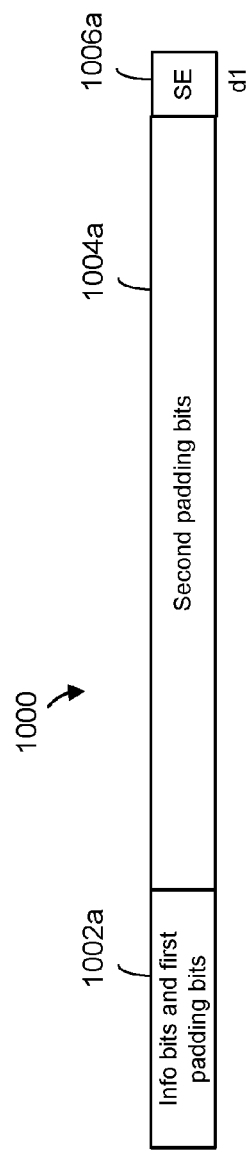
FIGS. 10A-10D are block diagrams illustrating signal extension field durations used with data units, according to an embodiment.
Figure 10B:
Figure 10C:
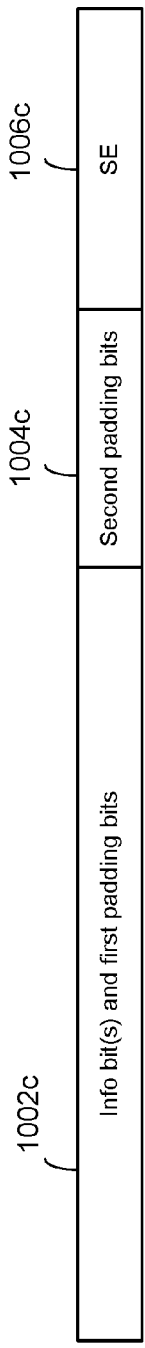
Figure 10D:
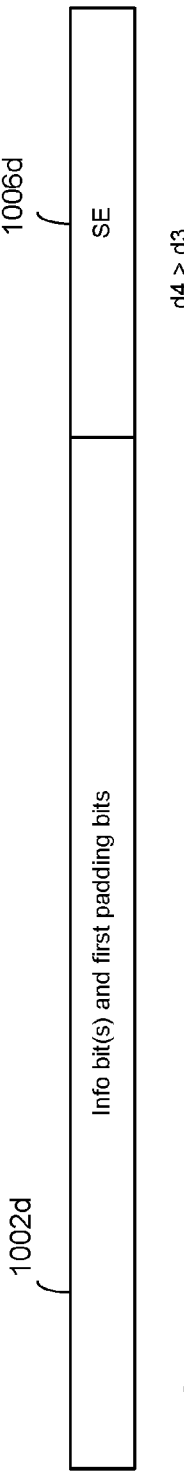

Generally speaking, the OFDM symbol 1000 includes a portion 1002 that includes coded information bits and first, or pre-encoder, padding bits and a portion 1004 that includes second, or post-encoder, padding bits. FIG. 10A illustrates a scenario in which a=1. In this case, the OFDM symbol 1000 includes the excess information bits and first pre-encoding padding bits 1002a corresponding to OFDM tones of the first virtual short OFDM symbol, and post-encoding padding bits 1004a corresponding to the remaining three virtual short OFDM symbols. In this case, includes an extension field of a duration d1. In an embodiment, the duration d1 is equal to zero (i.e., the data unit does not include a signal extension field). In another embodiment, the duration d1 is a suitable duration greater than 0. FIG. 10B illustrates a scenario in which a=2. In this case, the OFDM symbol 1000 includes the excess information bits and first pre-encoding padding bits 1002b corresponding to OFDM tones of the first two virtual short OFDM symbol, and post-encoding bits 1004b corresponding to the remaining two virtual short OFDM symbols. In this case, the data unit includes a signal extension field 1006b having a duration d2 that is greater than the duration d1 (d2>d1), in an embodiment. FIG. 10C illustrates a scenario in which a=3. In this case, the OFDM symbol 1000 includes the excess information bits and first pre-encoding padding bits 1002c corresponding to OFDM tones of the first three virtual short OFDM symbol, and post-encoding bits 1004c corresponding to the remaining one virtual short OFDM symbol. In this case, the data unit includes a signal extension field 1006c of duration d3 that is greater than the duration d2 (d3>d2), in an embodiment. FIG. 10C illustrates a scenario in which a=4. In this case, the OFDM symbol 1000 includes the excess information bits and first pre-encoding padding bits 1002d corresponding to OFDM tones of the entire OFDM symbol 1000. In this case, the data unit includes a signal extension field 1006d of duration d4 that is greater than the duration d3 (d3>d3), in an embodiment. As just an example, in an embodiment, d1=4 µs, d2=8 µs, d3=12 µs, d4=16 µs. In other embodiments, d1, d2, d3, and/or d4 are other suitable durations.

The content of the portion 1004 of the OFDM symbol 1000 is different in different embodiments. For example, the portion 1004 includes arbitrary or random post-encoder bits, in an embodiment. In this embodiment, a receiving device discards the second padding bits when processing the OFDM symbol 1000. In another embodiment, the portion 1004 includes a repetition of a corresponding number Y of last coded bits in the data portion of the data unit of which the OFDM symbol 1000 is a part. For example, in an embodiment, the portion 1004 includes one or more repetitions of coded bits corresponding to the last LDPC codeword (CW) in data portion of the data unit of which the OFDM symbol 1000 is a part. In another embodiment, the portion 1004 includes a repetition of a portion of the coded bits in the portion 1002, or, alternatively, one or more repetitions of all coded bits in the portion 1002, depending on the number of second padding bits in the portion 1004. In some embodiments in which the portion 1004 includes repetitions of coded bits, repeated coded bits are multiplied by a predetermined spreading sequence C to avoid direct repletion of the coded bits and to reduce PAPR. For example, in the embodiment in which the portion 1004 includes one or more repetitions of coded bits corresponding the last CW, as described above, each of the one or more repetitions i is multiplied by a different predetermined spreading sequence $C_i$, in an embodiment.

In some embodiments in which the portion 1004 includes repetitions of coded bits, a receiving device discards the repeated coded bits when processing the OFDM symbol 1000. In other embodiments in which the portion 1004 includes repetitions of coded bits, a receiving device combines reparations of the coded bits in the OFDM symbol 1000 to improve demodulation. For example, the receiving device combines log-likelihood (LLR) decisions obtained based on repetitions of coded bits to improve demodulator performance, in an embodiment.

Figure 11A:
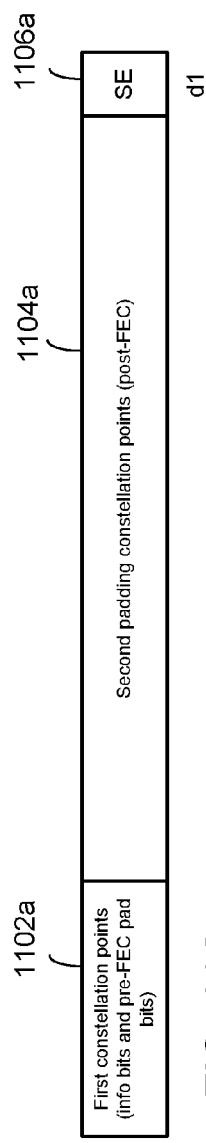
FIGS. 11A-11D are block diagrams illustrating signal extension field durations used with data unit having different values of a, according to another embodiment.
Figure 11B:
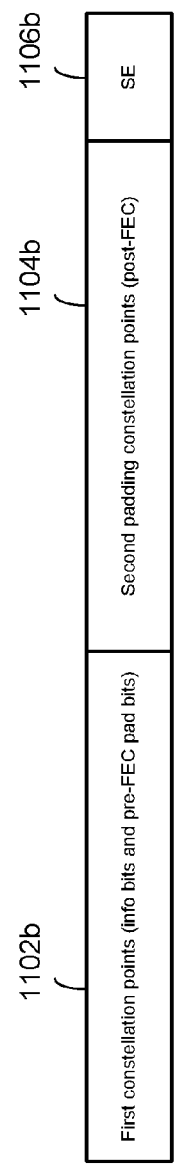
Figure 11C:
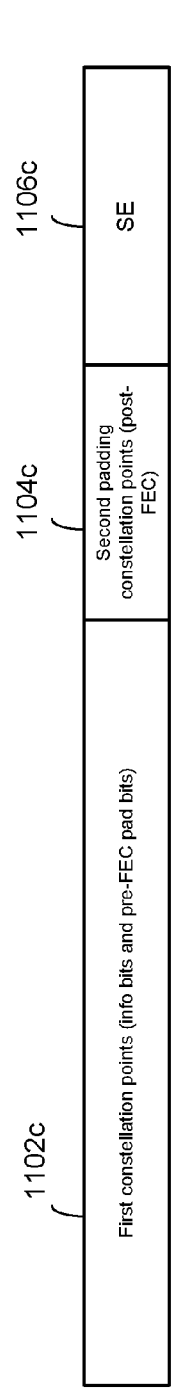
Figure 11D:

FIGS. 11A-11D are block diagrams illustrating signal extension field durations used with data units having different values of a, according to an embodiment. FIGS. 11A-11D are generally similar to FIGS. 10A-10D except that FIGS. 11A-11C illustrate an embodiment in which post-encoder padding is performed on constellation points rather than coded bits.

Figure 12A:
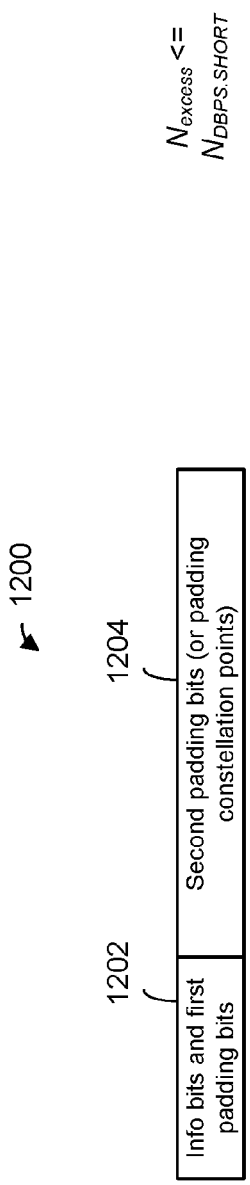
FIGS. 12A-12B are diagrams illustrating a padding scheme, according to an embodiment.
Figure 12B:
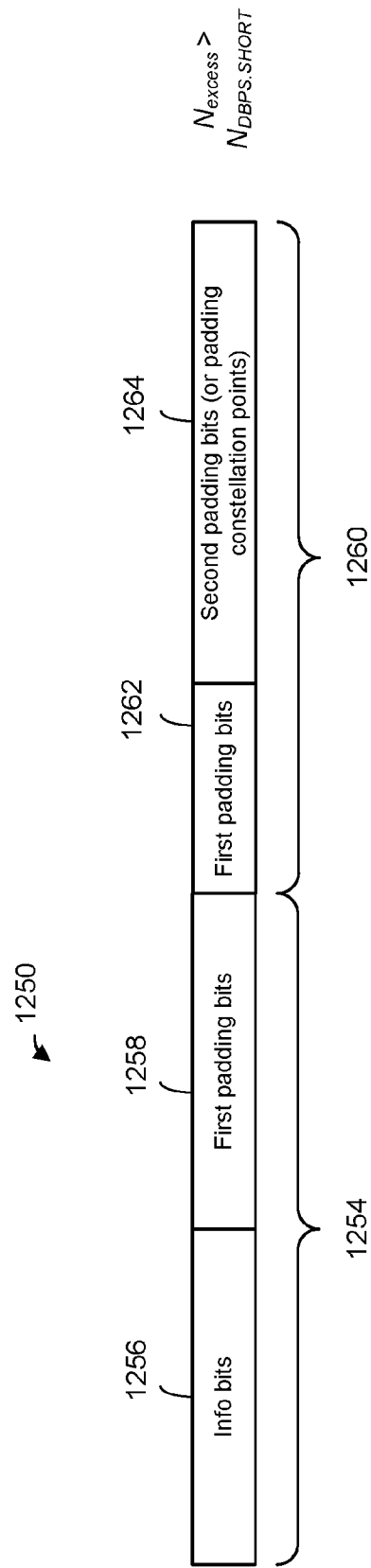

FIGS. 12A-12B are diagrams illustrating a padding scheme that ensures that information bits and first padding bits only up to a boundary al within the last OFDM padding symbol of the data portion, according to an embodiment. In this case, a receiving device generally has enough buffer time when receiving and decoding the last OFDM symbol of the data portion, in an embodiment. Accordingly, a signal extension field (e.g., the signal extension field 245 in FIG. 2A or the signal extension field 274 in FIG. 2B) is not needed and is omitted, in an embodiment.

Referring first to FIG. 12A, in a scenario in which the number of excess bits is less than or equal to the number of data bits in a short OFDM symbol (i.e., $N_{excess} \leq N_{DBPS,SHORT}$), an OFDM symbol 1200 includes the excess information bits and, if necessary, first pre-encoder padding bits, in a first portion 1202 of the OFDM symbol 1200 and includes second post-encoder bits (or constellation points) in a second portion 1204 of the OFDM symbol 1200. Referring now to FIG. 12B, in a scenario in which the number of excess bits is greater than the number of data bits in a short OFDM symbol (i.e., $N_{excess} > N_{DBPS,SHORT}$), then two padding OFDM symbols are included at the end of the data portion, in an embodiment. A first padding OFDM symbol 1254 includes the excess information bits in a first portion 1256 of the OFDM symbol 1254, and includes first pre-encoder padding bits in a second portion 1258 of the OFDM symbol 1256. A second padding OFDM symbol 1260 includes first pre-encoder padding bits in a first portion 1262 of the OFDM symbol 1260 and includes second post-encoder padding bits (or constellation points) in a second portion 1264 of the OFDM symbol 1260. In an embodiment, the first portion 1262 includes the initial portion of the OFDM symbol up to the boundary al (e.g., up to one virtual short OFDM symbol), and the second portion 1264 includes the remaining portion of the OFDM symbol (e.g., the remaining three virtual OFDM symbols).

In some embodiments, instead of using a two stage padding process as described above, the PHY processing unit is configured transmit one or more last OFDM symbols (e.g., padding symbols) of a data portion of a data unit as short OFDM symbols (e.g., generated using the normal tone spacing). In at least some such embodiments, a receiving device has sufficient time to process the last OFDM symbol due to the smaller size of the last OFDM symbol. Additionally, transmitting padding bits in a short (rather than long) OFDM symbol reduces overhead associated with transmission of padding bits, in at least some embodiments and/or scenarios. In an embodiment, the PHY processing unit 500 determines a number of long OFDM symbols to be generated and a number of short OFDM symbols to be generated, and determines a number of padding bits to be added to the information bits based on the determined number of long OFDM symbols and short OFDM symbols. For example, in an embodiment in which BCC encoding is to be utilized to encode the information bits, the number of long OFDM symbols is determined according to $$N_{SYM\_LONG} = m_{STBC} \left\lfloor \frac{8 \cdot L + N_{service} - N_{init} \cdot N_{ES}}{m_{STBC} \cdot N_{DBPS\_LONG}} \right\rfloor \quad \text{Equation 49}$$

and the number of short OFDM symbols is determined according to $$N_{SYM\_SHORT} = m_{STBC} \left\lceil \frac{8 \cdot L + N_{service} + N_{tail} \cdot N_{ES} - \frac{N_{SYM\_LONG} \cdot N_{DBPS\_LONG}}{m_{STBC} \cdot N_{DBPS\_SHORT}}}{m_{STBC} \cdot N_{DBPS\_SHORT}} \right\rceil \quad \text{Equation 50}$$

where L is the number of bytes of information bits, Nservice is the number of service bits (e.g., 16) to be added to the information bits, Ntail is the number of tail bits (e.g., 6) to be added to the information bits per BCC encoder, Nes is the number of encoders to be used to encode the information bits, and $m_{STBS}$ is equal to 2 if space time block encoding is to be utilized and is equal to 1 if space time block encoding is not used, in an embodiment.

The number of PHY padding bits is then determined, based on the number of long OFDM symbols and the number of short OFDM symbols, according to $$N_{PAD} = N_{SYM\_LONG} \cdot N_{DBPS\_LONG} + N_{SYM\_SHORT} \cdot N_{DBPS\_SHORT} - 8 \cdot L - N_{service} - N_{tail} \cdot N_{ES} \quad \text{Equation 51}$$

In an embodiment in which LDPC encoding is utilized, a number of long OFDM symbols is determined according to Equation 10 and an initial number of short OFDM symbols is determined according to $$N_{SYM\_SHORT\_init} = \quad \text{Equation 52}$$
$$m_{STBC} \left\lceil \frac{8 \cdot L + N_{service} - N_{SYM\_LONG} \cdot N_{DBPS\_LONG}}{m_{STBC} \cdot N_{DBPS}} \right\rceil$$

The number of padding bits is then determined, based on the determined number of long OFDM symbols and the determined initial number of short OFDM symbols, according to $$N_{PAD} = N_{SYM\_LONG} \cdot N_{DPBS\_LONG} + N_{SYM\_SHORT\_init} \cdot N_{DPBS\_SHORT} - 8 \cdot L - N_{service} \quad \text{Equation 53}$$

LDPC encoder parameters $N_{pld}$ and $N_{avbits}$ are then determined, respectively, according to $$N_{pld} = N_{SYM\_LONG} \cdot N_{DPBS\_LONG} + N_{SYM\_SHORT\_init} \cdot N_{DPBS\_SHORT} \quad \text{Equation 54}$$

and $$N_{avbits} = N_{SYM\_LONG} \cdot N_{CPBS\_LONG000} + N_{SYM\_SHORT\_init} \cdot N_{CPBS\_SHORT} \quad \text{Equation 55}$$

where $N_{CPBS\_LONG}$ is the number of coded bits per long OFDM symbol and $N_{CPBS\_SHORT}$ is the number of coded bits per short OFDM symbol. The number of code words Ncw, number of shortening bits $N_{shrt}$, number of puncturing bits $N_{punc}$ and number of repetition bits Nrep are then determined based on the number of $N_{avbits}$ determined according to Equation 55, in an embodiment. For example, $N_{cw}$, $N_{shrt}$, $N_{punc}$ and $N_{rep}$ are determined as described in the IEEE 802.11n Standard or the IEEE 802.11ac Standard, in an embodiment.

In some situations, as also described, for example, in the IEEE 802.11n Standard, the number of available bits in the minimum number of OFDM symbols is incremented by the number of available bits in one or, if space time block coding is used, two OFDM symbols. For example, in an embodiment, the number of available bits is incremented by the number of available bits in one or, if space time block coding is used, two short OFDM symbols. In this embodiment, a new number of available bits is determined according to $$N_{avbits\_new} = N_{avbits} + N_{CPBS\_SHORT} \cdot m_{STBC} \quad \text{Equation 56}$$

Then, the final number of short OFDM symbols is determined, based on the new number of available bits per OFDM symbol, in an embodiment, according to $$N_{SYM\_SHORT} = \frac{N_{avbits\_new} - N_{CBPS\_LONG} \cdot N_{SYM\_LONG}}{N_{CBPS\_SHORT}} \quad \text{Equation 57}$$

In an embodiment, if $N_{SYM\_SHORT\_init} > N_{SYM\_SHORT}$ an extra short OFDM symbol is needed in the data portion of the data unit. Accordingly, in an embodiment, if $N_{SYM\_SHORT\_init} > N_{SYM\_SHORT}$, an extra LDPC OFDM symbol indicator $N_{ldpc\_ext}$ included in the preamble of the data unit (e.g., included in the HE-SIGA field 220 or the HE-SIGB field 235) is set to a logic one (1) to indicate that an extra OFDM symbol is used, and if $N_{SYM\_SHORT\_init} \leq N_{SYM\_SHORT}$, the extra LDPC OFDM symbol indicator $N_{ldpc\_ext}$ is set to a logic zero (0).

Referring to FIG. 5, in an embodiment, the PHY processing unit 500 receives information bits to be included in data unit, and generates the determined number of long OFDM symbols and the determined number of short OFDM symbols for the data unit based on the received information bits. In an embodiment, each long OFDM symbol is generated based on a block of information bits having the number of data bits per long OFDM symbol ($N_{DPBS\_LONG}$) determined by the channel bandwidth, the number of spatial streams ($N_{SS}$) and the MCS being utilized. More specifically, the number of data bits per long OFDM symbol $N_{DPBS\_LONG}$ is determined by the number of data tones in the tone plan corresponding to the channel bandwidth for which the OFDM symbol is being generated, the number of spatial streams $N_{SS}$ over which the OFDM symbol is to be transmitted, the number of coded bits per subcarrier ($N_{CBPSC}$) according to the modulation of the MCS being used, and the coding rate R of the MCS being used. As just an example, in an embodiment in which ¼ tone spacing is used with long OFDM symbols, the corresponding tone plan includes 990 data tones, in an example embodiment. In this embodiment, the number of data bits per long OFDM symbol is $N_{DPBBS.LONG}=990 \cdot N_{ss} \cdot N_{CBPSC} \cdot R$. In an embodiment, blocks of coded bits, and corresponding blocks of constellation points, corresponding to long OFDM symbols are processed using parameters corresponding to the number of OFDM tones in a long OFDM symbol. For example, for a data unit to be transmitted in an 80 MHz-wide channel, blocks of coded bits, and corresponding blocks of constellation points, corresponding to long OFDM symbols are processed using parameters (e.g., BCC interleaver parameters used by the BCC interleavers 520, LDPC tone mapper parameters used by the LDPC tone mappers 526, etc.) corresponding to 1024 OFDM tones per OFDM symbol.

Similarly, in an embodiment, each short OFDM symbol is generated based on a block of information bits having the number of data bits per short OFDM symbol ($N_{DPBS.SHORT}$) determined by the channel bandwidth, the number of spatial streams ($N_{SS}$) and the MCS being utilized. More specifically, the number of data bits per long OFDM symbol $N_{DPBS.SHORT}$ is determined by the number of data tones in the tone plan corresponding to the channel bandwidth for which the OFDM symbol is being generated, the number of spatial streams $N_{SS}$ over which the OFDM symbol is to be transmitted, the number of coded bits per subcarrier ($N_{CBPSC}$) according to the modulation of the MCS being used, and the coding rate R of the MCS being used. In an embodiment, the MCS used for short OFDM symbols of a data unit is the same as the MCS used for long OFDM symbols of the data unit. Continuing with the example 80 MHz channel bandwidth above, in an embodiment in which normal tone spacing is used with short OFDM symbols, the corresponding tone plan for 80 MHz-wide channel includes 234 data tones, in an example embodiment. In this embodiment, the number of data bits per short OFDM symbol is $N_{DPBS.SHORT}=234 \cdot N_{ss} \cdot N_{CBPSC} \cdot R$, where $N_{ss}$, $N_{CBPSC}$, and R are the same as used with long OFDM symbols of the data unit. In another embodiment, however, the MCS used for short OFDM symbols of a data unit is different from the MCS used for long OFDM symbols of the data unit. In an embodiment, blocks of coded bits, and corresponding blocks of constellation points, corresponding to short OFDM symbols are processed using parameters corresponding to the number of OFDM tones in a short OFDM symbol. For example, for a data unit to be transmitted in an 80 MHz-wide channel, blocks of coded bits, and corresponding blocks of constellation points, corresponding to short OFDM symbols are processed using parameters (e.g., BCC interleaver parameters used by the BCC interleavers 520, LDPC tone mapper parameters used by the LDPC tone mappers 526, etc.) corresponding to 256 OFDM tones per OFDM symbol.

In some embodiments, the PHY processing unit 500 applies a power boost to non-zero OFDM tones of short OFDM symbols to maintain a same transmit power, in time domain, across long OFDM symbols and short OFDM of the data unit. For example, a power boost is applied to each non-zero OFDM tone in a short OFDM symbol, where power is scaled by a scaling factor that corresponds to the square root of a ratio of non-zero tones in a long OFDM symbol to non-zero tones in a short OFDM symbol, in an embodiment. As just an example, a number of non-zero OFDM tones in a long OFDM symbol generated according to a tone map defined for the IDFT size used with long OFDM symbols (e.g., 1024-point) is greater than the number of non-zero OFDM tones in corresponding N short OFDM symbols generated according to a tone map defined for IDFT size used with long OFDM symbols (e.g., 256-point). For example, whereas a tone map defined for a 1024-point OFDM symbol for an 80 MHz channel includes 998 non-zero OFDM tones (990 data tones and 8 pilot tones), a tone map defined for a 256-point OFDM symbol for an 80 MHz channel (i.e., ¼ tone spacing) includes 242 non-zero tones (234 data tones and 8 pilot tones) resulting in 242*4=968 non-zero tones in 4 short OFDM symbols, in an example embodiment. In this example embodiment, power boost is applied to each non-zero tone in a short OFDM symbol, wherein the power is scaled by a scaling factor of $\text{sqrt}(r_{comp})$, where $r_{comp}=998/968=1.031$, to provide a power compensation for the relatively smaller number of non-zero tones in the short OFDM symbol, in an example embodiment. Accordingly, the power of each non-zero tones in a short OFDM symbol is scaled by sqrt (1.031)=1.0154, in this example embodiment.

Figure 13:
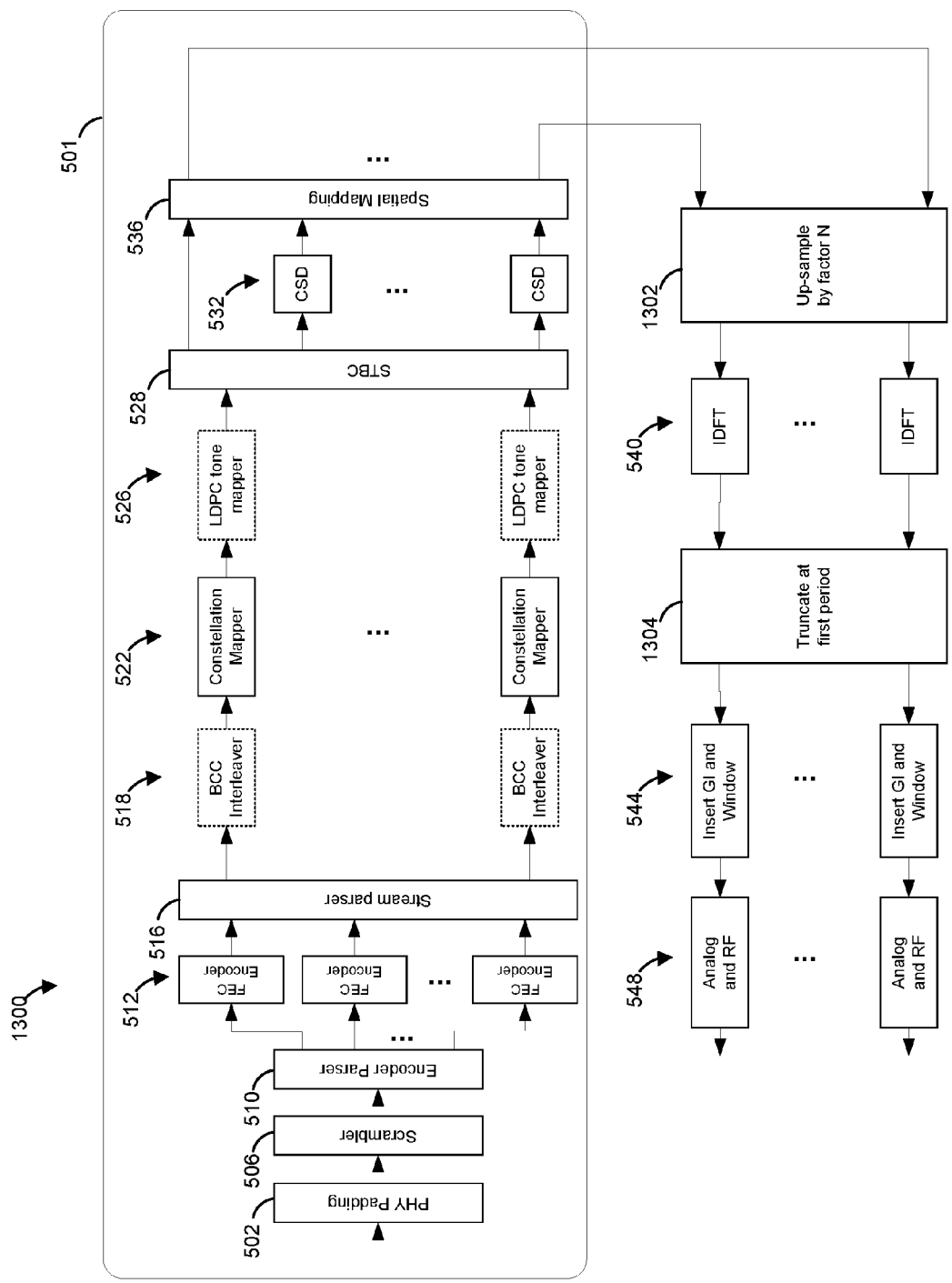
FIG. 13 is a block diagram of a transmit portion of an example PHY processing unit, according to an embodiment.

FIG. 13 is a block diagram of a transmit portion of an example PHY processing unit 1300 configured to generate data units, according to an embodiment. Referring to FIG. 1, the PHY processing unit 20 of AP 14 and the PHY processing unit 29 of client station 25-1 each includes a PHY processing unit similar to or the same as PHY processing unit 1300, in one embodiment. The PHY processing unit 1300 is configured to generate data units such as the data unit 200 of FIG. 2A or the data unit 250 of FIG. 2B, in an embodiment. In other embodiments, however, the PHY processing unit 1300 is configured to generate suitable data units different from the data unit 200 of FIG. 2A or the data unit 250 of FIG. 2B. Similarly, suitable PHY processing units different from the PHY processing unit 1300 is configured to generate of data unit such as the data unit 200 of FIG. 2A or the data unit 250 of FIG. 2B, in some embodiments.

The PHY processing unit 1300 is similar to the PHY processing unit 500 of FIG. 5 and includes many like-numbered elements with the PHY processing unit 500 of FIG. 5, in an embodiment. Additionally, the PHY processing unit 1300 includes an up-sample unit 1302 and a truncate processor 1304. The up-sample unit 1302 and the truncate processor 1304 are used when the PHY processing unit 1300 is generating short OFDM symbols of a data unit, in an embodiment. The up-sample unit 1302 and the truncate processor 1304 are bypassed when the PHY processing unit 1300 is generating long OFDM symbols of the data unit, in an embodiment. When generating a short OFDM symbol, the PHY processing unit 1300 begins with $N_{DBPS.SHORT}$ bits, where $N_{DBPS.SHORT}$ is determined based on a number of OFDM tones in a short OFDM symbol (e.g., $N_{DBPS.SHORT}=K/N$, where K is the number of OFDM tones in a long OFDM symbol and N is the tone spacing ratio between a long OFDM symbol and a short OFDM symbol) and the MCS being utilized. As just an example, in an embodiment in which K=1024 (e.g., in an 80 MHz bandwidth) and with ¼ tone spacing in a long OFDM symbol as compared to a short OFDM symbol, $N_{DBPS.SHORT}$ for a short OFDM symbol of a data unit is determined using 256 OFDM tones and the same MCS as used for a long OFDM symbol of the data unit, in an embodiment. Continuing with the same example embodiment, if a tone map for a 256-point IDFT OFDM symbol includes 234 data tones and if an MCS that defines 64-QAM modulation and coding rate of 5/6 (e.g., the MCS7 of the IEEE 802.11ac Standard) is being used with 2 spatial streams, then $N_{DBPS.SHORT}=234*2*6*5/6=2340$, in an embodiment.

The encoding flow for a short OFDM symbol is generally the same as the encoding flow for a long OFDM symbol (e.g., as described above with respect to FIG. 5), except that outputs of the spatial mapping unit 536 are provided to the up-sample unit 1302, in an embodiment. The up-sample unit 1302 up-samples constellation points corresponding to a short OFDM symbol by inserting (N−1) zero constellation points between each pair of constellation points, where 1/N (e.g., ¼) is tone ratio between a number of tones in a short OFDM symbol and number of tones in a long OFDM symbol. Accordingly, a tone index k in a long OFDM symbol corresponds to the tone index k*N in a short OFDM symbol, except that DC tone indices in a short OFDM symbol correspond to the DC tones indices in a long OFDM symbol, in an embodiment.

In some embodiments, the up-sample unit 1302 additionally adds a power boost to the non-zero OFDM tones to maintain a same average transmit power, in time domain, in transmission of a short OFDM symbol and transmission of a long OFDM symbol. For example, the up-sample unit 1302 boosts power in each non-zero OFDM tone by a scaling factor that corresponds to the square root of a ratio of non-zero tones in a long OFDM symbol to non-zero tones in a short OFDM symbol, in an embodiment. As just an example, in an example embodiment, whereas a long OFDM symbol generated using a 1024-point IDFT for an 80 MHz-wide channel includes 998 non-zero OFDM tones (990 data tones and 8 pilot tones), a short OFDM symbol for an 80 MHz channel generated with ¼ tone spacing includes 242 non-zero tones (234 data tones and 8 pilot tones), in an example embodiment. In this example embodiment, power boost is applied to each non-zero tone in a short OFDM symbol, wherein the power is scaled by a scaling factor of sqrt ($r_{comp}$), where $r_{comp}$=998/242=4.124, to provide a power compensation for the relatively smaller number of non-zero tones in the short OFDM symbol, in an example embodiment. Accordingly, the power of each non-zero tones in a short OFDM symbol is scaled by sqrt (4.124)=2.031, in this example embodiment. Alternatively, in some embodiments, power boost with a scaling factor of sqrt (N) rather than sqrt ($r_{comp}$) is applied to each non-zero tone of a short OFDM symbol, for example for ease of implementation. Accordingly, continuing with the above example, power boost with scaling factor of sqrt (4)=2 rather than 2.031 is applied to non-zero OFDM tones of a short OFDM symbol, in an embodiment. In this embodiment, transmit power in a short OFDM symbol is reduced by approximately 0.2 decibels (dB) relative to transmit power in a long OFDM symbol.

The up-sampled constellation points corresponding to each spatial stream are converted to a time-domain signal using by the corresponding IDFT unit 540 using the IDFT size used for long OFDM symbols of the data unit, in an embodiment. As a result of up-sampling performed by the up-sample unit 1302, the output of each IDFT processor 540 includes N periods of a signal corresponding to a short OFDM symbol. The truncate processor 1304 truncates the output of each IDFT processor 540 at the first period of the signal. In an embodiment, the truncate processor 1304 truncates the output of each IDFT processor 340 at K/N samples. Accordingly, each truncated output of the truncate processor 1304 corresponds to a duration of a short OFDM symbol, in an embodiment. A guard interval is then added to the truncated signal corresponding to each spatial stream, in an embodiment.

In an embodiment, a receiving device processes short OFDM symbols of a data unit using a K/N-point FFT and a corresponding tone map defined for K/N-size FFT. For example, upon receiving a short OFDM symbol and removing the guard interval portion of the OFDM symbol, the receiving device processes the OFDM symbol using a K/N size FFT to obtain K/N samples of the transmitted signal. In an embodiment, the receiving device utilizes channel estimate obtained based on long training field(s) of the data unit. Accordingly, if channel estimation was performed based on k OFDM tones of a long training field which was transmitted using a long OFDM symbol, the receiving device utilizes channel estimates $h_k$ corresponding tone k*N, in an embodiment. Further, in an embodiment, if a power boost was applied to the short OFDM symbol at the transmitting device, then power is scaled down, by a same scaling factor, or alternatively a corresponding power boost is applied to the channel estimate $h_k$ to properly demodulate the tone k at the receiving device, in an embodiment.

In an embodiment, if a data unit includes one or more short OFDM padding symbols at the end of a data portion of the data unit, then a signal extension field (e.g., the SE field 245 of FIG. 2A or the SE field 274 of FIG. 2B) is omitted from the data unit. On the other hand, if the data unit does not include any short OFDM symbols at the end of the data portion (e.g., when padding is not needed at the end of the data portion), the data unit includes an SE field after the data portion, in an embodiment.

Alternatively, in some embodiments, the number of long OFDM symbols and the number of short OFDM symbols to be included in the data portion 240 of data unit 200 is determined such that the number of short OFDM symbols at the end of the data portion exceeds a predetermined threshold X, where X is a positive integer greater than 0. Further, in some such embodiments, because the data unit 200 includes at least X short OFDM symbols at the end of the data portion 240, the data unit 200 omits the SE field 245. In an example embodiment, to ensure that the data unit 200 includes at least N (e.g., at least 4) short OFDM symbols generated with a tone spacing of 1/N (e.g., ¼ tone spacing), above equations for determining a number of long OFDM symbols are altered by subtracting one long OFDM symbol. For example, in an embodiment, when BCC encoding is to be utilized to encode information bits for a data unit, Equation 45 above is altered such that the number of long OFDM symbols is determined according to $$N_{SYM\_LONG} = \max\left\{ m_{STBC}\left(\left\lfloor \frac{8 \cdot L + N_{service} - N_{tail} \cdot N_{ES}}{m_{STBC} \cdot N_{DBPS\_LONG}} \right\rfloor - 1\right), 0 \right\}$$

Equation 58

Similarly, in an embodiment in which LDPC encoding is to be utilized to encode information bits for a data unit, Equation 45 above is altered such that the initial number of long OFDM symbols is determined according to $$N_{SYM\_LONG\_init} = \max\left\{ m_{STBC}\left(\left\lfloor \frac{8 \cdot L + N_{service}}{m_{STBC} \cdot N_{DBPS\_LONG}} \right\rfloor - 1\right), 0 \right\}$$

Equation 59

In an embodiment, short OFDM symbol of the data unit 200 include pilot tones at the same tone indices as long OFDM symbols of the data unit 200. Accordingly, a receiving device performs phase and frequency tracking using channel estimates obtained based on training signals corresponding to tone indices of the pilot tones across the long OFDM symbols and the long OFDM symbols, in an embodiment. Alternatively, in some embodiments, traveling pilots are applied to at least the long OFDM symbols of the data unit 200, in which case pilot tone indices may be different in different long OFDM symbols. In such embodiments, a receiving device may update channel estimates, initially obtained based on one or more training fields (e.g., LTF fields 230, 264), based on the traveling pilot tones included in at least the long OFDM symbols. In an embodiment in which traveling pilot tones are used in long OFDM symbols of the data unit 200, fixed pilot tones indices are used in the short OFDM symbols of the data unit 200. In another embodiment in which traveling pilot tones are used in long OFDM symbols of the data unit 200, traveling pilots are also used in short OFDM symbols of the data unit 200, with pilot indices scaled by a factor of 1/N with respect to pilot tone indices a pilot tone table that defined indices of traveling pilot tones for long OFDM symbols, where 1/N (e.g., ¼) is tone ratio between a number of tones in a short OFDM symbol and number of tones in a long OFDM symbol.

In an embodiment, a receiving device that receives the data unit 200 determines the number of long OFDM symbols and the number of short OFDM symbols in the data unit 200 based on one or more indications included in a preamble of the data unit 200. For example, a receiving device determines the number of long OFDM symbols and the number of short OFDM symbols in the data unit 200 based on a length field included in the L-SIG field 215, in an embodiment. The length field 215 includes an indication of length of the data unit 200 after the legacy preamble portion 203 of the data unit 200, in an embodiment. A receiving device determines a duration $T_D$ of the data portion 240 of the data unit 200 based on the length field in the L-SIG field 215 of the data unit 200, in an embodiment. For example, in an embodiment, the receiving device determines $T_D$ according to $$T_D = \frac{L\_LENGTH + 3}{3} \times 4 - T_{HEW\_PREAMBLE} \qquad \text{Equation 60}$$

where L_LENGTH is the value of the length field in the L-SIG field 215 and $T_{HEW\_PREAMBLE}$ is the duration of the HEW preamble portion 204.

In an embodiment, the receiving device then determines the number of long OFDM symbols in the data portion 240 according to $$N_{SYM.LONG} = \left\lfloor \frac{T_D}{T_{LONG}} \right\rfloor \qquad \text{Equation 61}$$

In another embodiment in which the number of long OFDM symbols was determined at the transmitting device to ensure that the data unit 200 includes at least X short OFDM symbols, the receiving device determines the number of long OFDM symbols in the in the data portion 240 of the data unit 200 according to $$N_{SYM.LONG} = \max\left\{ m_{STBC}\left(\left\lfloor \frac{T_D}{T_{LONG}} \right\rfloor - 1\right), 0 \right\} \qquad \text{Equation 62}$$

The receiving device then determines the number of short OFDM symbols in the data portion 240 according to $$N_{SYM.SHORT} = \frac{T_D - N_{SYM.LONG} \cdot T_{LONG}}{T_{SHORT}} \qquad \text{Equation 63}$$

where $T_{LONG}$ is the duration of a long OFDM symbol determined by the tone spacing and guard interval duration used with long OFDM symbols in the data unit 200, and $T_{SHORT}$ is the duration of a short OFDM symbol determined by the tone spacing and guard interval duration used with short OFDM symbols in the data unit 200.

In an embodiment in which LDPC encoding is utilized, the receiving device determines a number of long OFDM symbols $N_{SYM.LONG}$ according to Equation 58, and determines an initial number of short OFDM symbols $N_{SYM.SHORT.init}$ according to Equation 59. The receiving device then updates the number of short OFDM symbols, if necessary, based on the extra LDPC OFDM symbol indicator $N_{ldpc\_ext}$ included in the preamble of the data unit (e.g., included in the HE-SIGA field 220 or the HE-SIGB field 235), in an embodiment. In particular, in an embodiment, the receiving device updates the number of short OFDM symbols, if necessary, according to $$N_{SYM.SHORT} = N_{SYM.SHORT.init} + m_{STBC} \cdot N_{ldpc\_ext} \qquad \text{Equation 64}$$

In some embodiments, the HEW preamble portion 204 (e.g., the HE-SIGA field 220 or the HE-SIGB field 235) of the data unit 200 includes an indication of the number of long OFDM symbols in the data portion 240 of the data unit 200 and an indication of the number of short OFDM symbols in the data portion 240 of the data unit 200. In such embodiments, a receiving device determines the number of long OFDM symbols and the number of short OFDM symbols in the data portion 240 of the data unit 200 based on the indication of the number of long OFDM symbols and the indication of the number of short OFDM symbols, respectively, included in the HEW preamble portion 204 of the data unit 200.

In some embodiments, OFDM symbol compression is used with at least some OFDM symbols of a preamble of a data unit in addition to or instead of padding OFDM symbol(s) of a data portion of the data unit. For example, referring to FIG. 2A, OFDM symbols corresponding to one or more of HE-SIGA field 220, the HE-STF field 225, the HE-LTF fields 230 and the HE-SIGB field 235 are compressed OFDM symbols, in an embodiment. Similarly, as another example, referring to FIG. 2B, OFDM symbols corresponding to one or more of HE-SIGA fields 260, the HE-STF fields 225, the HE-LTF fields 230 and the HE-SIGB fields 235 are compressed OFDM symbols, in an embodiment.

Figure 14A:
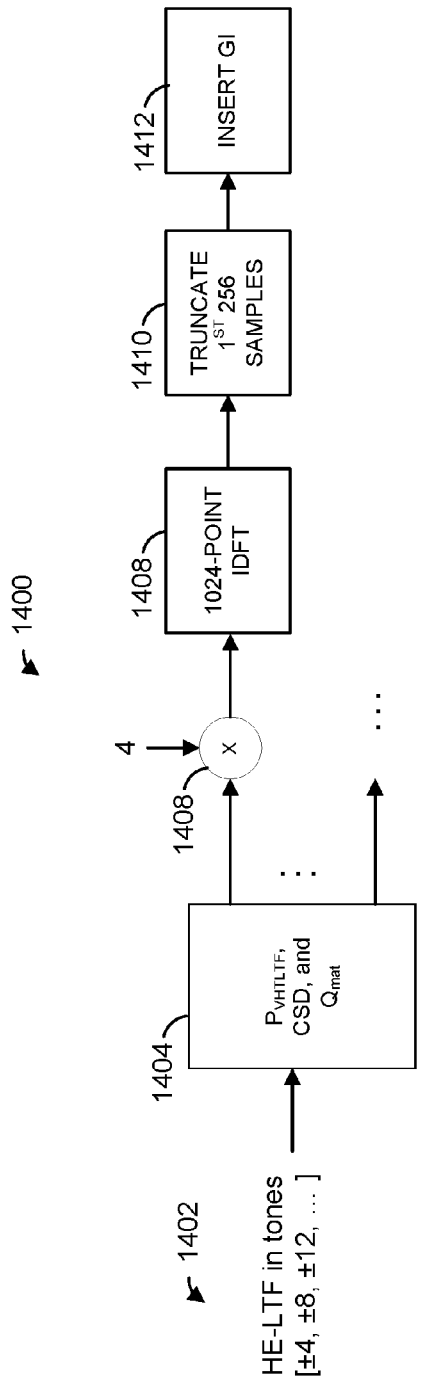
FIG. 14A is a block diagram of a training field processing unit, according to an embodiment.

FIG. 14A is a block diagram of a training field processing unit 1400 configured to generate compressed OFDM symbols of a long training field, according to an embodiment. In an embodiment, the processing unit 1400 is configured to generate the HE-LTF fields 230 of the data unit 200 of FIG. 2A or the HE-LTF fields 264 of the data unit 250 of FIG. 2B. In other embodiments, other suitable processing units are configured to generate HE-LTF fields 230 of the data unit 200 of FIG. 2A or the HE-LTF fields 264 of the data unit 250 of FIG. 2B. Similarly, the processing unit 1400 is configured to generate training fields different from the HE-LTF fields 230 of the data unit 200 of FIG. 2A or the HE-LTF fields 264 of the data unit 250 of FIG. 2B, in some embodiments. The processing unit 1400 corresponds to an 80 MHz bandwidth, in an embodiment. Processing units similar to the processing unit 1400 are used with other bandwidths (e.g., 20 MHz, 40 MHz, 160 MHz, etc.).

In an embodiment, the long training sequence defined in a legacy communication protocol (e.g., the IEEE 802.11ac Standard) is used as the long training sequence for the corresponding bandwidth in the first communication protocol. In an embodiment, the processing unit 1400 receives a training sequence 1402 having values corresponding to the HE-LTF sequence defined for an 80 MHz bandwidth in the IEEE 802.11ac Standard but spread out over tones corresponding to the reduced tone spacing. For example, in an embodiment in which ¼ tone spacing is used, the HE-LTF sequence 1402 includes the values of the VHT-LTF sequence defined for an 80 MHz bandwidth by the IEEE 802.11 ac Standard spread out such that consecutive values in the sequence modulate every fourth tone (e.g., tones [±4, ±8, ±12, . . . ]) of the tone map used for 80 MHz long OFDM symbols (e.g., in the data portion of the data unit). The remaining tones, not used for transmission of the VHT-LTF sequence values (e.g., tones [ . . . , ±5, ±6, ±7, ±9, ±10, . . . ] are zero-tones, in an embodiment. As another example, in an embodiment in which ½ tone spacing is used, the HE-LTF sequence 1402 includes the values of the VHT-LTF sequence defined for an 80 MHz bandwidth by the IEEE 802.11 ac sequence spread out such that consecutive values in the sequence modulate every second tone (e.g., tones [±2, ±4, ±8, . . . ]) of the tone map used for 80 MHz long OFDM symbols (e.g., in the data portion of the data unit). The remaining tones, not used in the HE-LTF sequence 1402 for transmission of the VHT-LTF sequence values (i.e., tones [ . . . , ±3, ±5, ±7, ±9, ±11, . . . ] are zero-tones, in an embodiment.

The HE-LTF sequence 1402 is processed by an input processing unit 1404. In an embodiment, the input processing unit 1404 includes a CSD unit such as the CSD unit 532 of FIG. 5, and a spatial mapping unit such as the spatial mapping unit 526 of FIG. 5. In an embodiment, the input processing unit 1404 additionally includes an LTF mapping unit that applies a column or a row of a spatial stream mapping matrix P to the HE-LTF sequence 1402 prior providing the sequence to the CSD unit. In an embodiment, the column or the row of the matrix P is applied to only non-zero tones of the HE-LTF sequence 1402. In an embodiment, the matrix P corresponds to the $P_{VHTLTF}$ matrix defined in the IEEE 802.11ac Standard.

An up-sample processing unit 1406 corresponding to each spatial stream up-samples the training sequence at the output of the processing unit 1404 by a factor 1/N, wherein N is the tone spacing reduction factor, in an embodiment. For example, in an embodiment in which tone spacing reduction of ¼ is used, the up-sample processing unit 1406 up-samples the training sequence by a factor of 4. In some embodiments, the up-sample processing unit 1406 additionally applies a power boost to the non-zero OFDM tones to maintain a same average transmit power, in time domain, in transmission of a compressed LTF field OFDM symbol and transmission of a long OFDM symbol (e.g., in the data portion of the data unit). For example, the up-sample unit 1406 boosts power in each non-zero OFDM tone by a scaling factor that corresponds to the square root of a ratio of non-zero tones in a long OFDM symbol to non-zero tones in a short OFDM symbol, in an embodiment. As just an example, in an example embodiment, whereas a long OFDM symbol generated using a 1024-point IDFT for an 80 MHz-wide channel includes 998 non-zero OFDM tones (990 data tones and 8 pilot tones), a compressed LTF OFDM symbol for an 80 MHz channel generated with ¼ tone spacing includes 242 non-zero tones (234 data tones and 8 pilot tones), in an example embodiment. In this example embodiment, power boost is applied to each non-zero tone in a compressed LTF field OFDM symbol, wherein the power is scaled by a scaling factor of sqrt ($r_{comp}$), where $r_{comp}$=998/242=4.124, to provide a power compensation for the relatively smaller number of non-zero tones in the compressed OFDM symbol, in an example embodiment. Accordingly, the power of each non-zero tones in a short OFDM symbol is scaled by sqrt (4.124)=2.031, in this example embodiment. Alternatively, in some embodiments, power boost with a scaling factor of sqrt (N) rather than sqrt ($r_{comp}$) is applied to each non-zero tone of a compressed LTF field OFDM symbol, for example for ease of implementation. Accordingly, continuing with the above example, power boost with scaling factor of sqrt (4)=2 rather than 2.031 is applied to non-zero OFDM tones of a compressed LTF field OFDM symbol, in an embodiment. In this embodiment, transmit power in a compressed LTF OFDM symbol is reduced by approximately 0.2 decibels (dB) relative to transmit power in a long OFDM symbol. In an embodiment, the scaling factor is known, a priori, at a receiving device (e.g., the scaling factor is standardized by the first communication protocol) such that if a power boost is applied to the short OFDM symbol at the transmitting device, then the corresponding scaling factor can be used at the receiving at the receiving device to compensate for the power boost introduced by the transmitting device, in an embodiment.

The up-sampled training sequence corresponding to each spatial stream is converted to a time-domain signal by an IDFT processor 1408. In an embodiment, the IDFT processors 1408 are the same as the IDFT processors 540 of FIG. 5. In the example embodiment of FIG. 14A, each IDFT processor 1408 converts the training sequence corresponding to the spatial stream using a 1024-point IDFT. The time-domain output of each IDFT processor 1408 includes 1/N periods (e.g., 4 periods) of the training sequence corresponding to the spatial stream.

Corresponding to each spatial stream, a truncation unit 1412 truncates the output of the corresponding IDFT processor 1408 at a number of samples that corresponds to a single period of the IDFT output signal, in an embodiment. For example, a truncation unit 1412 truncates the output of the corresponding IDFT processor 1408 at 256 samples for an 80 MHz bandwidth, in an embodiment. A corresponding GI insertion unit 1412 adds a guard interval to the truncated signal. For example, the GI insertion unit 1412 adds a 0.4 µs GI interval, a 0.8 µs GI interval, or a GI interval of another suitable duration, in an embodiment. In an embodiment, the duration of the truncated HE-LTF signal and the guard interval generated by the LTF processing unit 1400 for an 80 MHz bandwidth is 3.2 µs+GI duration.

Figure 14B:
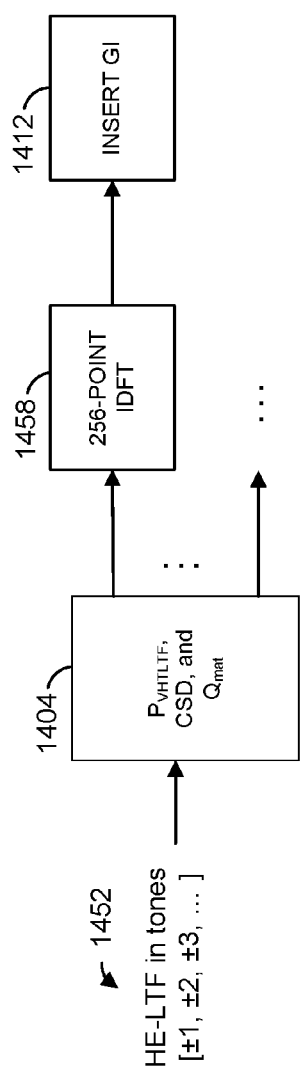
FIG. 14B is a block diagram of a training field processing unit, according to another embodiment.

FIG. 14B is a block diagram of a training field processing unit 1450 configured to generate compressed OFDM symbols of a long training field, according to another embodiment. In an embodiment, the processing unit 1450 is configured to generate the HE-LTF fields 230 of the data unit 200 of FIG. 2A or the HE-LTF fields 264 of the data unit 250 of FIG. 2B. In other embodiments, other suitable processing units are configured to generate HE-LTF fields 230 of the data unit 200 of FIG. 2A or the HE-LTF fields 264 of the data unit 250 of FIG. 2B. Similarly, the processing unit 1450 is configured to generate training fields different from the HE-LTF fields 230 of the data unit 200 of FIG. 2A or the HE-LTF fields 264 of the data unit 250 of FIG. 2B, in some embodiments. The processing unit 1450 corresponds to an 80 MHz bandwidth, in an embodiment. Processing units similar to the processing unit 1400 are used with other bandwidths (e.g., 20 MHz, 40 MHz, 160 MHz, etc.).

The training field processing unit 1450 is similar to the training field processing unit 1400 of FIG. 14A, except that the processing unit 1450 directly generates a compressed long training field OFDM symbol without generating N periods of the training field for the OFDM symbol, in an embodiment. Accordingly, the training field processing unit 1450 omits the up-scaling units 1408 and the truncation units 1410, in an embodiment. The processing unit 1450 operates on a training sequence 1452 that corresponds to the LTF training sequence defined for the corresponding bandwidth (e.g., 80 MHz bandwidth in FIG. 14B) by a legacy communication protocol such as the IEEE 802.11ac Standard. The outputs of the input processing 1404 are converted to time-domain signals by corresponding IDFT units 1458. In an embodiment, the IDFT processors 1458 are the same as the IDFT processors 540 of FIG. 5, but utilize an IDFT of a smaller size (e.g., 1/N size) to generate HE-LTF fields of a data unit as compared to the IDFT size used to generate OFDM symbols of the data portion of the data unit. In the example embodiment of FIG. 14, the IDFT processor 1458 converts the training sequence using a 256-point IDFT for an 80 MHz bandwidth.

In some embodiments, duration of OFDM symbols corresponding to the long training fields of a data unit (e.g., the data unit 200 of FIG. 2A or the data unit 250 of FIG. 2B) depends on a transmission mode in which the data unit is transmitted. For example, in an embodiment, in a first training field mode, OFDM symbols corresponding to the long training fields are long, or uncompressed, with respect to long OFDM symbols of a data portion of the data unit, and in a second mode, the OFDM symbols corresponding to the long training fields are short, e.g., compressed by ½ or ¼ with respect to long OFDM symbols of the data portion, in an embodiment. In another embodiment, in a first training field mode, OFDM symbols corresponding to the long training fields are long, or uncompressed, with respect to long OFDM symbols of a data portion of the data unit, in a second mode, the OFDM symbols corresponding to the long training fields are compressed by ½ with respect to long OFDM symbols of the data portion of the data unit, and in a second mode, the OFDM symbols corresponding to the long training fields are compressed by ¼ with respect to long OFDM symbols of the data portion of the data unit. In an embodiment, the particular mode used is signaled in a signal field of the data unit. For example, the HE-SIGA field of the data unit or the HE-SIGB field of the data unit includes a two-bit training field mode indication, where a first value of the two bits (e.g., 00) indicates that no compression is used in the long training fields, a second value of the two bits (e.g., 01) indicates that ½ compression is used in the long training fields, a third value of the two bits (e.g., 10) indicates that ¼ compression is used in the long training fields, and the fourth value of the two bits (e.g., 11) is reserved, in an embodiment. As another example, a one-bit training field mode indication is used to indicate the training field compression mode, wherein a first value of the one bit (e.g., 0) indicates that either no compression is used in the long training fields or that ½ compression is used in the long training fields, and a second value of the one bit (e.g., 1) indicates that ¼ compression is used in the long training fields.

In yet another embodiment, long training field mode compression indication is combined with a guard interval duration indication. For example, in an embodiment, the preamble (e.g., the HEW-SIGA field of the preamble or the HEW-SIGB field of the preamble) of a data unit (e.g., the data unit 200) includes a guard interval duration indication that also serves as a LTF training field (and/or HE-SIGB field) compression mode indication. As just an example, a guard interval indication that indicates a first guard interval duration (e.g., 0.4 μs or 0.8 μs) also indicates that ½ or ¼ compression mode is used in the LTF training field(s) and/or HE-SIGB field, and a guard interval indication that indicates a second guard interval duration (e.g., greater than 0.8 μs) also indicates that no compression is used in the LTF training field(s) and/or HE-SIGB field. In an embodiment, the compressed or non-compressed long training fields of a data unit (e.g., the data unit 200) include multi-stream pilot tones at pilot tone indices k that correspond to pilot tone locations defined for the corresponding bandwidth by the IEEE 802-11 ac Standard, but mapped to multiple spatial streams according to $$[x_1 \, x_2 \ldots x_{N_{HELTF}}]_{N_{TX} \times N_{HELTF}} = Q_{N_{TX} \times N_{STS}} \cdot D_{N_{STS} \times N_{STS}} P_{N_{STS} \times N_{HELTF}} LTF_k$$

Equation 65 where $Q_{N_{TX} \times N_{STS}}$ is a spatial mapping matrix, $D_{N_{STS} \times N_{STS}}$ is a pre-stream CSD, $P_{N_{STS} \times N_{HELTF}}$ is the P matrix as described above, and $LTF_k$ is the training sequence value (1 or −1) corresponding to the tone k. In an embodiment, multi-stream pilot tones in the long training fields allow a receiving device to accurately demodulate data tones adjacent to the pilot tones in the data portion of the data unit.

In an embodiment, a receiving device that receives a data unit with compressed LTF fields obtains channel estimates corresponding to 1/N OFDM tones of the channel bandwidth. In an embodiment, the receiving device utilizes the channel estimates corresponding to 1/N OFDM tones of the channel bandwidth to demodulate N OFDM tones in the data portion of the data unit. For example, in an embodiment, demodulates an OFDM tone with the index k in a long OFDM symbol (e.g., of the data portion of the data unit) using a channel estimate obtained based on an OFDM tone with the tone index j in a compressed LTF field of the data unit, wherein j multiplied by N is closer, in value, to the index k than any other tone index, in the compressed LTF field, multiplied by N. Thus, for example, the receiving device demodulates OFDM tones with tone indices in the range between 2 and 10 in a long OFDM symbol (e.g., in the data portion of the data unit) using a channel estimate obtained based on the OFDM tone with the tone index 2 in the compressed LTF field, in an embodiment. Further, continuing with the same embodiment, the receiving device demodulates OFDM tones with tone indices in the range between 11 and 12 in a long OFDM symbol using a channel estimate obtained based on the OFDM tone with the index 3 in the compressed LTF field, etc., in this embodiment. Alternatively, in another embodiment, the receiving device utilizes a channel estimate obtained based on an OFDM tone with the tone index k in the compressed LTF field to demodulate tone in the range of k to k+N in a long OFDM symbol (e.g., in the data portion of the data unit).

In yet another embodiment, the receiving device uses interpolation to obtain channel estimates corresponding to the remaining tones for which channel estimate was not available from the compressed LTF field. For example, in an embodiment, the receiving device uses a linear interpolation to obtain channel estimates corresponding to the remaining tones for which channel estimate was not available from the compressed LTF field. In another embodiment, the receiving device uses another suitable type of interpolation to obtain channel estimates corresponding to the remaining tones for which channel estimate was not available from the compressed LTF field.

In an embodiment in which long training field compression is used with MU data unit, such as the data unit 200 of FIG. 2A, in an embodiment in which the data unit 200 is an MU data unit, or the OFDMA data unit 200 of FIG. 2B, one OFDM symbol is used to transmit training signals corresponding to multiple spatial streams with non-overlapping OFDM tones within the single OFDM tone allocated for transmission of training signals corresponding to different ones of the multiple spatial streams. In this case, multiple long training fields, each having a number of OFDM tones corresponding to the number of tones in a compressed OFDM symbol, are transmitted using a single OFDM symbol long training field. For example, in an embodiment in which a compression factor N used for the long training is greater than or equal to the number of spatial streams in the data unit, a single long training field OFDM symbol includes training tones corresponding to each of the spatial streams transmitted on non-overlapping orthogonal OFDM tones of the OFDM symbol. As an example, each modulo(n, N)-th tone of the training field OFDM symbol is allocated to the spatial stream n, in an embodiment. In some embodiments, multiple such LTF training fields (e.g., multiple repeating OFDM symbols of the long training field) are transmitted so that a receiving device can average channel estimates obtained from the multiple training fields, for example. Further, in one such embodiment, different OFDM tones are allocated to a same spatial stream in different ones of the multiple LTF training fields to further enhance channel estimation that can be obtained from the multiple long training field OFDM symbols. For example, OFDM tones at tone indices of modulo((n+i), 4) are allocated to a spatial stream n in a long training OFDM symbol i, in an embodiment.

In an embodiment in which the compression factor N is greater than the number $N_{SS}$ of spatial streams, OFDM tones corresponding to the extra spatial streams are transmitted as zero-tones, or are allocated to some of the $N_{ss}$ spatial streams. For example, in an embodiment in which the compression factor N=4, and the number of spatial streams $N_{ss}$=2, OFDM tones corresponding to each one of the extra two spatial streams are allocated to each one of the $N_{ss}$ spatial streams. In another embodiment in which the compression factor N=4, and the number of spatial streams $N_{ss}$=2, OFDM tones corresponding to the extra two spatial streams are allocated to one of the $N_{ss}$ spatial streams, such as the spatial stream corresponding to a channel with a relatively lower signal to noise ratio (SNR) as compared to the other spatial stream. In another embodiment in which the compression factor N is greater than the number $N_{ss}$ of spatial streams, a mapping matrix P having dimensions of $N_{ss} \times N$ is used to map OFDM tones of the single training field OFDM symbol to each of the $N_{ss}$ spatial streams using a different row of the mapping matrix P.

Figure 15:
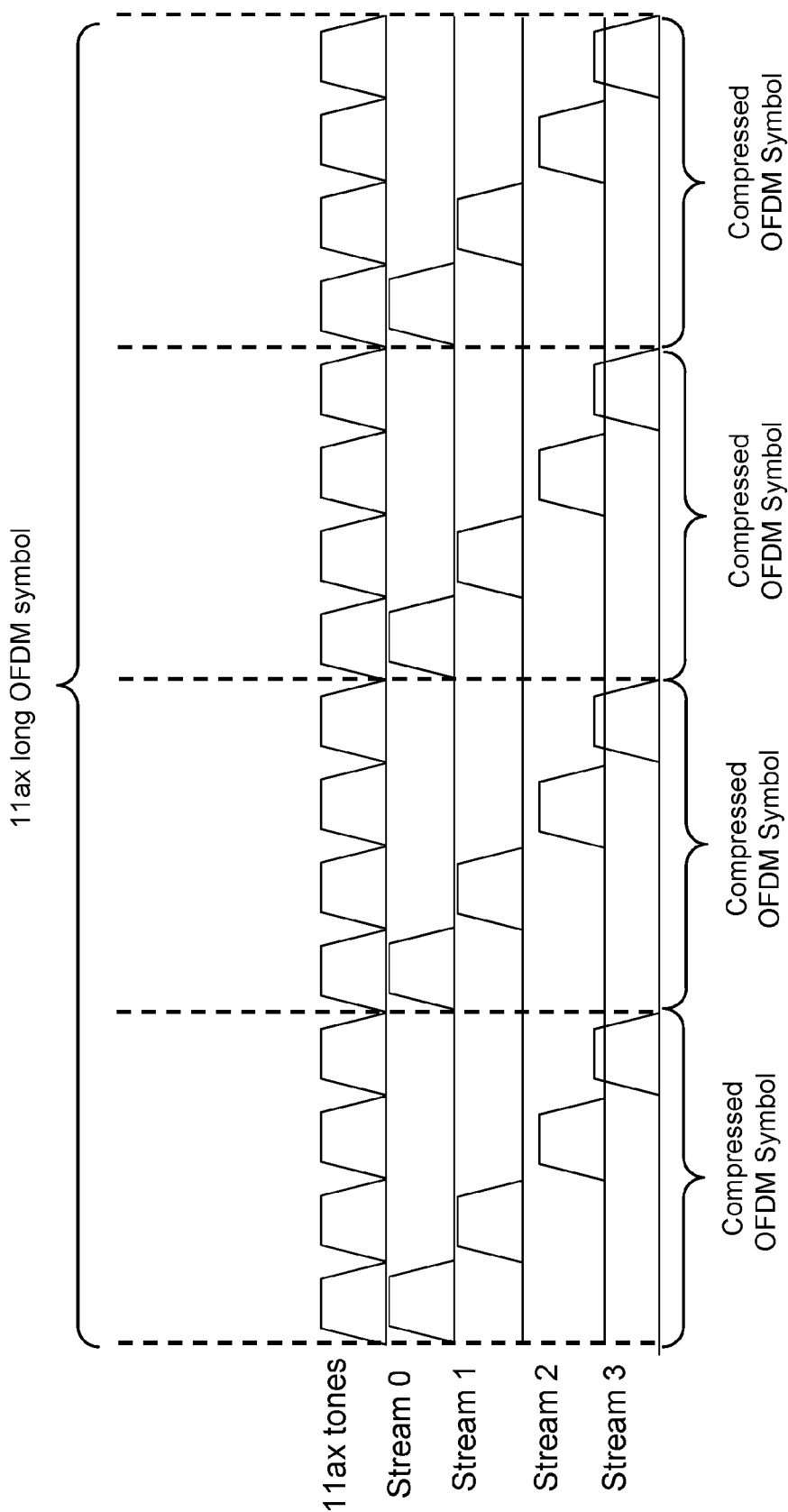
FIG. 15 is a block diagram illustrating multi-stream long training field tone allocation, according to an embodiment.

In an embodiment, a receiving device obtains channel estimates corresponding to each spatial stream based on the OFDM tones allocated to the spatial stream in a single training field OFDM symbol included in a data unit, and utilizes channel estimate replication or interpolation to demodulate OFDM tones (e.g., in a long OFDM symbol of the data portion of the data unit) as described above with respect to FIGS. 14A-14B, in an embodiment. FIG. 15 is a block diagram illustrating a multi-stream LTF tone allocation for an example embodiment with a compression factor of 4 (1/N=¼) and 4 spatial streams.

Figure 16:
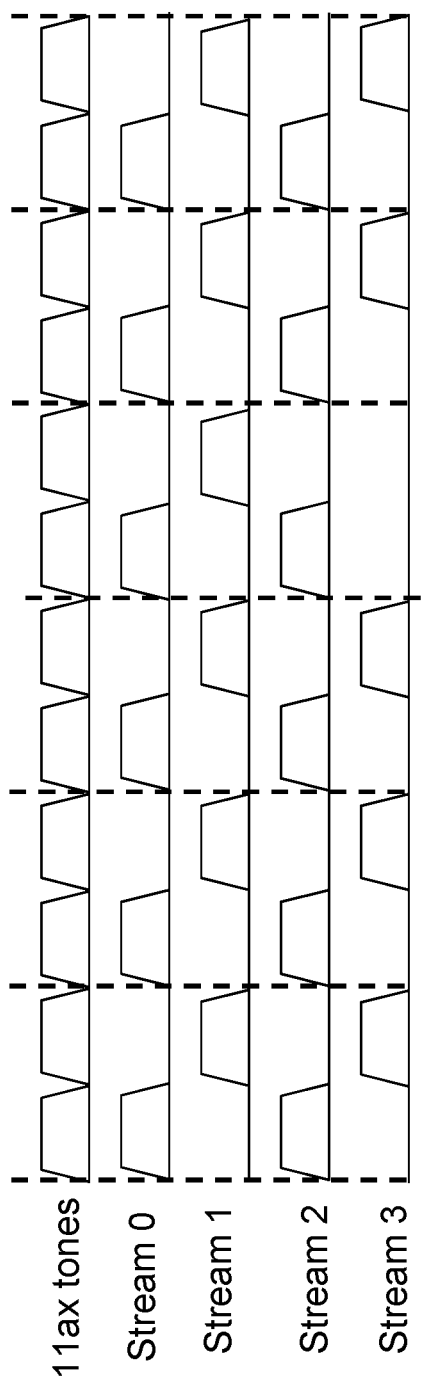
FIG. 16 is a block diagram illustrating multi-stream long training field tone allocation, according to another embodiment.

In an embodiment in which the compression factor N is less than the number $N_{ss}$ of spatial streams, overlapping OFDM tones of a training field OFDM symbol are allocated to some of the spatial streams. For example, in an embodiment, OFDM tones at tone indices of modulo(n, N) are allocated to a spatial stream n, in an embodiment. In an embodiment, different columns of a mapping matrix P are applied to overlapping OFDM tone allocated to different spatial streams. For example, in an embodiment with compression factor N and four spatial streams, and multiple such training field OFDM symbols are included in a data unit, in such embodiments. Generally speaking, if the number of spatial streams $N_{ss}$=M*N+K, then L OFDM symbols are needed, where L=M if K=0 and L=M+1 of K≠0, in an embodiment. FIG. 16 is a block diagram illustrating a multi-stream LTF tone allocation for an example embodiment with a compression factor of 2 (1/N=½) and 4 spatial streams, according to an embodiment.

Generally speaking, in an embodiment in which the compression factor N is less than the number $N_{ss}$ of spatial streams, if the number of spatial streams $N_{ss}$=M*N+K, then L OFDM symbols are needed, where L=M if K=0 and L=M+1 of K≠0, in an embodiment. In an embodiment, respective ones of the spatial streams are grouped into L groups, with M spatial streams in each of the L groups, except that in an embodiment in which K≠0, one of the L groups will include K rather than M spatial streams. Then, non-overlapping OFDM tones of one long training field OFDM symbol are allocated to spatial streams within a same group, in an embodiment. Further, different rows (or different columns) or a spatial mapping matrix P are applied to OFDM tones allocated to corresponding OFDM tones allocated to different spatial streams that are members of different groups, in an embodiment. For example, referring to FIG. 16A, spatial stream 0 and spatial stream 1 are grouped to form a first group, and non-overlapping OFDM tones are allocated to spatial stream 0 and spatial stream 1 of the first group. Further, continuing with the same embodiment, spatial stream 2 and spatial stream 3 are grouped to form a second group, and non-overlapping OFDM tones are allocated to spatial stream 2 and spatial stream 3 of the second group. Further, different rows or columns of a 2×2 spatial mapping matrix P are applied to OFDM tones corresponding to the spatial stream 0 and the spatial stream 2, in an embodiment. Similarly, different rows or columns of the 2×2 spatial mapping matrix P are applied to OFDM tones corresponding to the spatial stream 1 and the spatial stream 3, in an embodiment.

In another embodiment in which the compression factor N is less than the number $N_{ss}$ of spatial streams, a hybrid mode is used in which a combination of one or more training OFDM symbols are shared by a first number of multiple spatial streams and one or more other training OFDM symbols are compressed and are used for fewer spatial streams than the first number of spatial streams. For example, in the embodiment described above in which K≠0, one or more compressed long training field OFDM symbols are used for the one of the L groups that includes K rather than M spatial streams, in an embodiment, wherein each one of the one or more compressed OFDM symbols is used for one of the K spatial streams.

In another embodiment in which the compression factor N is less than the number $N_{ss}$ of spatial streams, the $N_{ss}$ are grouped such that the number of spatial streams $N_{ss\_ltf}$ included in each of the groups is a divisor of N. In an embodiment, a separate OFDM symbol is used for each of the groups, where a compression mode (e.g., no compression, ½ compression, or ¼ compression) is selected for an OFDM symbol depending on the number of spatial streams included in the corresponding group. As an example, in an embodiment in which N=4 and $N_{ss}$=7, three groups of spatial streams are formed, where a first group includes 4 spatial streams, a second group includes 2 spatial streams, and a third group includes 1 spatial stream. In this embodiment, a non-compressed OFDM symbol is used for the first group, a ½ compressed OFDM symbol is used for the second group, and a ¼ compressed OFDM symbol is used for the third group. Within each of the OFDM symbol, OFDM tones with indices modulo(n*N/$N_{ss\_ltf}$, N) are allocated to the spatial stream n within the group, in an embodiment.

Figure 17:
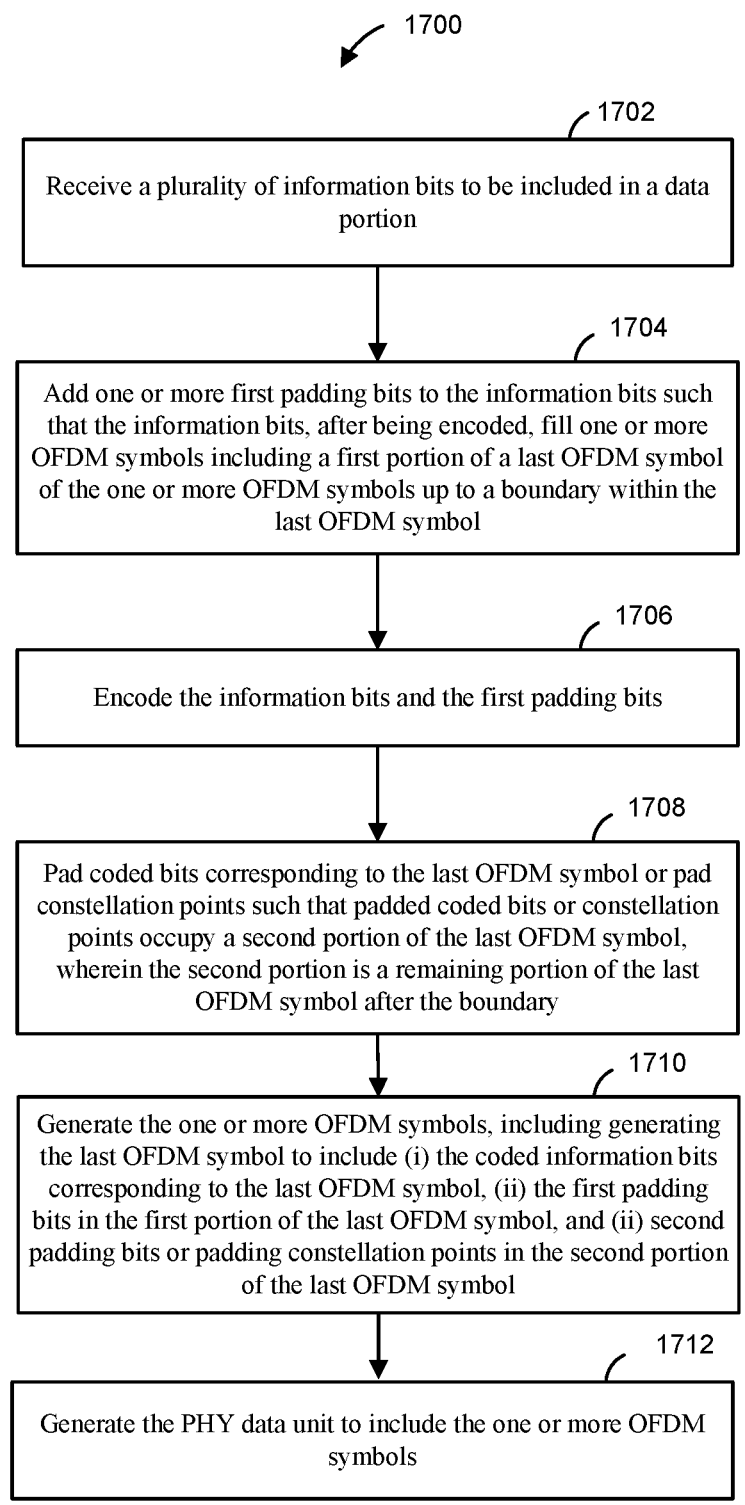
FIG. 17 is a flow diagram of a method for generating a data unit, according to an embodiment.

FIG. 17 is a flow diagram of an example method 1700 for generating a data unit, according to an embodiment. With reference to FIG. 1, the method 1700 is implemented by the network interface device 16, in an embodiment. For example, in one such embodiment, the PHY processing unit 20 is configured to implement the method 1700. According to another embodiment, the MAC processing 18 is also configured to implement at least a part of the method 1700. With continued reference to FIG. 1, in yet another embodiment, the method 1700 is implemented by the network interface device 27 (e.g., the PHY processing unit 29 and/or the MAC processing unit 28). In other embodiments, the method 1700 is implemented by other suitable network interface devices.

At block 1702, a plurality of information bits to be included in a data portion of a data unit are received. At block 1704, one or more pre-encoder padding bits are added to the information bits. In an embodiment, the one or more pre-encoder padding bits are added to the information bits such that the padded information bits, after being encoded, fill one or more OFDM symbols up to a first portion of a last OFDM symbol, of the one or more OFDM symbols. In an embodiment, the first portion corresponds to an initial portion of the last OFDM symbol up to a boundary within the last OFDM symbol.

At block 1706, the information bits and the pre-encoder padding bits are encoded using one or more encoders. At block 1708, coded bits corresponding to the last OFDM symbol are padded, or constellating points generated based on the coded bits corresponding to the last OFDM symbol are padded such that the padded coded bits or the padded constellation points occupy a second portion of the last OFDM symbol. In an embodiment, the second portion of the last OFDM symbol is the remaining portion after the boundary within the last OFDM symbol.

At block 1710, the one or more OFDM symbols are generated. In an embodiment, the one or more OFDM symbol are generated to include (i) the coded information bits corresponding to the last OFDM symbol, (ii) the first padding bits in the first portion of the last OFDM symbol, and (ii) second padding bits or padding constellation points in the second portion of the last OFDM symbol. At block 1712, the data unit is generated to include at least the one or more OFDM symbols generated at block 1712.

Figure 18:
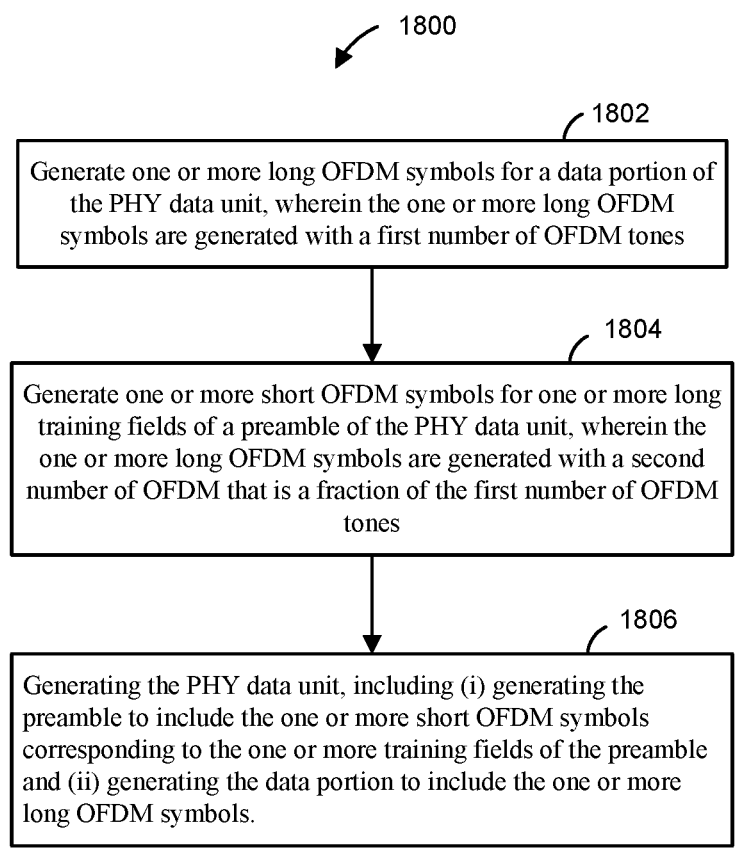
FIG. 18 is a flow diagram of a method for generating a data unit, according to another embodiment.

FIG. 18 is a flow diagram of an example method 1800 for generating a data unit, according to an embodiment. With reference to FIG. 1, the method 1800 is implemented by the network interface device 16, in an embodiment. For example, in one such embodiment, the PHY processing unit 20 is configured to implement the method 1800. According to another embodiment, the MAC processing 18 is also configured to implement at least a part of the method 1800. With continued reference to FIG. 1, in yet another embodiment, the method 1800 is implemented by the network interface device 27 (e.g., the PHY processing unit 29 and/or the MAC processing unit 28). In other embodiments, the method 1800 is implemented by other suitable network interface devices.

At block 1802, one or more long OFDM symbols are generated for a data portion of the data unit. The one or more long OFDM symbols are generated with a first number of OFDM tones, in an embodiment. In an embodiment, the first number of OFDM tones corresponds to a first tone spacing (e.g., reduced tone spacing such as ¼ tone spacing). In an embodiment, the first number of OFDM tones corresponds to an IDFT of a first size.

At block 1804, one or more short OFDM symbols are generate for one or more long training fields of a preamble of the data unit. The one or more short OFDM symbols are generated with a second number of OFDM tones that is a fraction of the first number of OFDM tones, in an embodiment. In an embodiment, the second number of OFDM tones corresponds to a second tone spacing (e.g., normal tone spacing). In an embodiment, the second number of OFDM tones corresponds to an IDFT of a second size that is a fraction of the first size.

At block 1806, the data unit is generated. In an embodiment, generating the data unit at block 1806 includes (i) generating the preamble to include the one or more short OFDM symbols corresponding to the one or more training fields of the preamble and (ii) generating the data portion to include the one or more long OFDM symbols.

Figure 19:
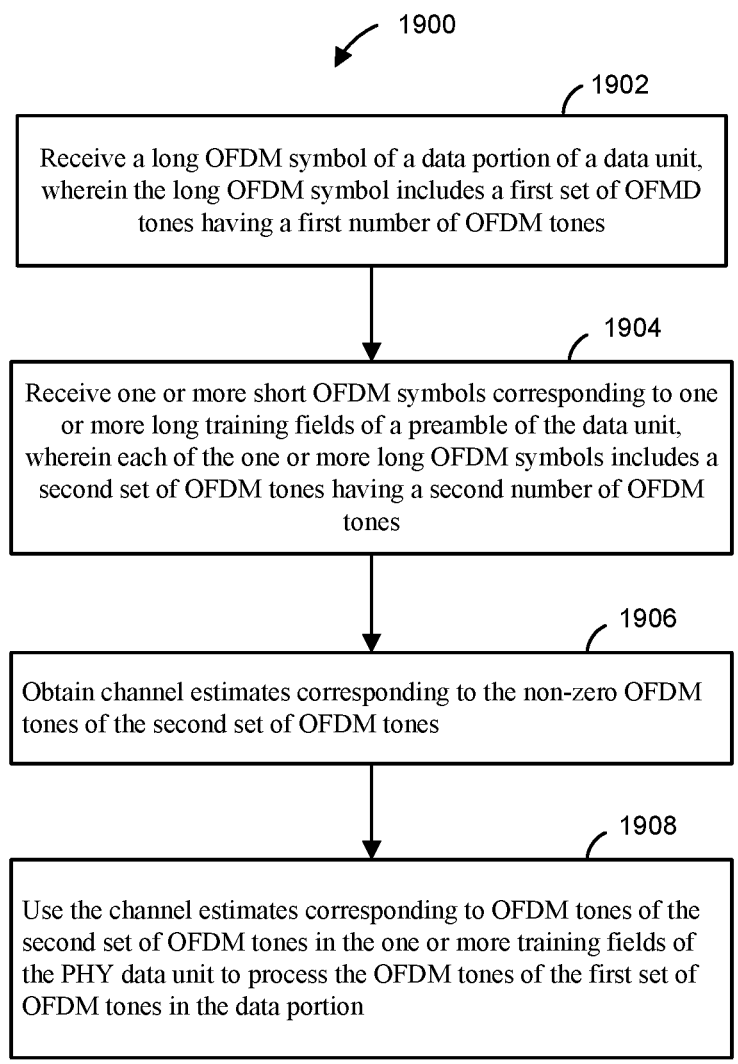
FIG. 19 is a flow diagram of a method for processing a data unit, according to another embodiment.

FIG. 19 is a flow diagram of an example method 1900 for processing a data unit, according to an embodiment. With reference to FIG. 1, the method 1900 is implemented by the network interface device 16, in an embodiment. For example, in one such embodiment, the PHY processing unit 20 is configured to implement the method 1900. According to another embodiment, the MAC processing 18 is also configured to implement at least a part of the method 1900. With continued reference to FIG. 1, in yet another embodiment, the method 1800 is implemented by the network interface device 27 (e.g., the PHY processing unit 29 and/or the MAC processing unit 28). In other embodiments, the method 1900 is implemented by other suitable network interface devices.

At block 1902, a long OFDM symbols is received. In an embodiment, the long OFDM symbol is received at block 1902 in a data portion of a data unit. The long OFDM symbol includes a first set of OFDM tones having a first number of OFDM tones. As just an example, in an example embodiment in which the OFDM symbol has a bandwidth of 80 MHz, the long OFDM symbol includes 1024 OFDM tones.

At block 1904, one or more short OFDM symbols are received. In an embodiment, the short OFDM symbols are received in a preamble portion of the data unit. In an embodiment, the one or more short OFDM symbols correspond to one or more long training fields included in a preamble of the data unit. Each of the one or more short OFDM symbols includes a second set of OFDM tones having a second number of OFDM tones. In an embodiment, the second number of OFDM tones is a fraction 1/N of the first number of OFDM tones. As just an example, in an example embodiment in which the OFDM symbol has a bandwidth of 80 MHz, each of the one or more sort OFDM symbol includes 256 OFDM tones.

At block 1906, channel estimates corresponding to OFDM tones of the second set of OFDM tones are obtained. At block 1908, the channel estimates obtained at block 1096 are used to process OFDM tones of the first set of OFDM tones of the long OFDM symbol received at block 1902.

In an embodiment, a method for generating a physical layer (PHY) data unit for transmission via a communication channel includes receiving a plurality of information bits to be included in a data portion of the PHY data unit. The method also includes adding one or more first padding bits to the information bits such that the information bits, after being encoded, fill one or more OFDM symbols up to a first portion of a last OFDM symbol, wherein the first portion of the last OFDM symbol is an initial portion of the last OFDM symbol up to a boundary within the last OFDM symbol, and encoding the information bits and the first padding bits to generate coded bits. The method additionally includes performing one of (i) padding coded bits corresponding to the last OFDM symbol or (ii) padding constellation points generated based on the coded bits corresponding to the last OFDM symbol such that the padded coded bits or the padded constellation points occupy a second portion of the last OFDM symbol, wherein the second portion is a remaining portion of the last OFDM symbol after the boundary. The method further includes generating the one or more OFDM symbols, including generating the last OFDM symbol to include (i) the coded information bits corresponding to the last OFDM symbol, (ii) the first padding bits in the first portion of the last OFDM symbol, and (ii) second padding bits or padding constellation points in the second portion of the last OFDM symbol, and generating the PHY data unit to include at least one or more OFDM symbols.

In other embodiments, the method includes any suitable combination of one or more of the following features.

The method further includes determining a number of excess information bits, of the set of information bits, to be included in the last OFDM symbol, and selecting a boundary value of the boundary within the last OFDM symbol based on the determined number of excess information bits.

The last OFDM symbol is a long OFDM symbol corresponding to an Inverse Digital Fourier Transform (IDFT) of a first size, and wherein selecting the value of the boundary comprises selecting the value from a set of integer multiples a number of data bits in a virtual short OFDM symbol, wherein the virtual short OFDM symbol corresponds to an Inverse Digital Fourier Transform (IDFT) of a second size that is a fraction of the first size.

Generating the PHY data unit further comprises including a signal extension field after the data portion if the selected boundary value exceeds a threshold, wherein a duration of the signal extension field is determined based on the selected boundary value.

The method further includes generating a signal field to be included in a preamble of the PHY data unit, wherein the signal field includes an indication of the selected boundary value.

The method further includes generating the preamble of the PHY data unit to further include the signal field.

The method further includes generating the PHY data unit to further include the preamble.

Generating the signal field comprises generating the signal field to further include an indication to indicate whether an extension signal field is included in the PHY data unit.

Encoding the information bits and the first padding bits to generate coded bits comprises encoding the information bits and the first padding bits using one or more binary convolutional code (BCC) encoders.

Encoding the information bits and the first padding bits to generate coded bits comprises encoding the information bits and the first padding bits using one or more low density parity check (LDPC) encoders.

Padding coded bits such that padded coded bits occupy the second portion of the last OFDM symbol comprises adding one or more padding constellation points to a set of constellation points generated based on the coded bits.

Padding coded bits such that padded coded bits occupy the second portion of the last OFDM symbol comprises repeating Y last coded bits, where Y is a positive integer greater than zero.

In another embodiment, an apparatus comprises a network interface device having one or more integrated circuits configured to receive a plurality of information bits to be included in a data portion of a physical layer (PHY) data unit. The one or more integrated circuits are further configured to add one or more first padding bits to the information bits such that the information bits, after being encoded, fill one or more OFDM symbols up to a first portion of a last OFDM symbol, wherein the first portion of the last OFDM symbol is an initial portion of the last OFDM symbol up to a boundary within the last OFDM symbol, and encode the information bits and the first padding bits to generate coded bits. The one or more integrated circuits are further still configured to perform one of (i) padding coded bits corresponding to the last OFDM symbol or (ii) padding constellation points generated based on the coded bits corresponding to the last OFDM symbol such that the padded coded bits or the padded constellation points occupy a second portion of the last OFDM symbol, wherein the second portion is a remaining portion of the last OFDM symbol after the boundary. The one or more integrated circuits are additionally configured to generate the one or more OFDM symbols, including generating the last OFDM symbol to include (i) the coded information bits corresponding to the last OFDM symbol, (ii) the first padding bits in the first portion of the last OFDM symbol, and (ii) second padding bits or padding constellation points in the second portion of the last OFDM symbol, and generate the PHY data unit to include at least one or more OFDM symbols.

In other embodiments, the apparatus includes any suitable combination of one or more of the following features.

The one or more integrated circuits are further configured to determine a number of excess information bits, of the set of information bits, to be included in the last OFDM symbol, and select a boundary value of the boundary within the last OFDM symbol based on the determined number of excess information bits.

The last OFDM symbol is a long OFDM symbol corresponding to an Inverse Digital Fourier Transform (IDFT) of a first size, and wherein the one or more integrated circuits are configured to select the value of the boundary from a set of integer multiples a number of data bits in a virtual short OFDM symbol, wherein the virtual short OFDM symbol corresponds to an Inverse Digital Fourier Transform (IDFT) of a second size that is a fraction of the first size.

The one or more integrated circuits are configured to generate the PHY data unit to further include a signal extension field after the data portion if the selected boundary value exceeds a threshold, wherein a duration of the signal extension field is determined based on the selected boundary value.

The one or more integrated circuits are further configured to generate a signal field to be included in a preamble of the PHY data unit, wherein the signal field includes an indication of the selected boundary value.

The one or more integrated circuits are further configured to generate the preamble of the PHY data unit to further include the signal field.

The one or more integrated circuits are further configured generate the PHY data unit to further include the preamble.

The one or more integrated circuits are further configured to generate the signal field to further include an indication to indicate whether an extension signal field is included in the PHY data unit.

The one or more integrated circuits are configured to encode the information bits and the first padding bits using one or more binary convolutional code (BCC) encoders.

The one or more integrated circuits are configured to encode the information bits and the first padding bits using one or more low density parity check (LDPC) encoders.

The one or more integrated circuits are configured to pad the coded bits such that padded coded bits occupy the second portion of the last OFDM symbol at least by adding one or more padding constellation points to a set of constellation points generated based on the coded bits.

The one or more integrated circuits are configured to pad the coded bits such that padded coded bits occupy the second portion of the last OFDM symbol at least by repeating Y last coded bits, where Y is a positive integer greater than zero.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a physical layer (PHY) data unit for transmission via a communication channel, the method comprising:
adding, at a first communication device, respective numbers of pre-encoder padding bits to respective sets of information bits corresponding to respective second communication devices to generate respective sets of padded information bits corresponding to the respective second communication devices, wherein the respective numbers of pre-encoder padding bits are determined such that the padded information bits, after being encoded, fill one or more OFDM symbols up to a common boundary within a last OFDM symbol;
encoding, at the first communication device, the respective sets of padded information bits to generate respective sets of coded bits;
generating, at the first communication device, the one or more OFDM symbols to include (i) the respective sets of coded information bits in an initial portion of the one or more OFDM symbols up to the common boundary within the last OFDM symbol to allow a receiving device to stop decoding the one or more OFDM symbols after decoding the initial portion of the one or more OFDM symbols, and (ii) respective numbers of post-encoder padding bits, added to the respective sets of coded bits, in a remaining portion of the one or more OFDM symbols following the common boundary; and
generating, at the first communication device, the PHY data unit to include at least the one or more OFDM symbols.

2. The method of claim 1, further comprising
for each of the second communication devices, determining, at the first communication device, (i) a respective initial minimum number of OFDM symbols needed to fit, after being encoded, the set of information bits corresponding to the second communication device and (ii) a respective initial value of a boundary within the last OFDM symbol; and
determining, at the first communication device, a value of the common boundary based at least in part on (i) the determined respective initial numbers of OFDM symbols and (ii) the determined respective initial values of the boundary within the last OFDM symbol.

3. The method of claim 2, wherein:
the method further comprises, for each of the second communication devices, determining, at the first communication device, a respective excess number of information bits that do not fit in a respective maximum integer number of OFDM symbols that can be entirely filled by the corresponding set of information bits, and
determining the initial value of the boundary for a particular one of the second communication devices comprises determining the initial value of the boundary based at least in part on the determined number of excess information bits for the particular second communication device.

4. The method of claim 2, wherein determining the value of the common boundary comprises
for each of the second communication devices, determining a respective packet duration based on (i) the corresponding determined initial number of OFDM symbols and (ii) the corresponding initial value of the boundary within the last OFDM symbol, selecting a greatest packet duration of the determined packet durations, and setting the value of the common boundary to the initial value of the boundary determined for the second communication device corresponding to the selected greatest packet duration.

5. The method of claim 4, wherein the method further comprises determining, at the first communication device based on the initial number of OFDM symbols determined for the second communication device corresponding to the selected greatest packet duration, a common number of OFDM symbols for the second communication devices, and generating the one or more OFDM symbols comprises generating the common number of OFDM symbols.

6. The method of claim 5, the respective numbers of pre-encoder padding bits are determined based at least in part on the common number of the OFDM symbols.

7. The method of claim 1, wherein generating the PHY data unit further comprises including a signal extension field after the data portion of the PHY data unit if the value of the common boundary exceeds a threshold, wherein a duration of the signal extension field is determined based on the value of the common boundary.

8. The method of claim 1, further comprising generating, at the first communication device, a signal field to be included in a preamble of the PHY data unit, wherein the signal field includes an indication to indicate a value of the common boundary within the last OFDM symbol, generating, at the first communication device, the preamble of the PHY data unit to further include the signal field, and generating, at the first communication device, the PHY data unit to further include the preamble.

9. The method of claim 1, further comprising adding, at the first communication device, the post-encoder padding bits to a particular set of coded bits by repeating Y last coded bits of the particular set of coded bits, where Y is a positive integer that corresponds to the number of post-encoder padding bits.

10. The method of claim 1, wherein generating the one or more OFDM symbols to include the respective sets of coded information bits comprises generating the one or more OFDM symbols to include the respective sets of coded information bits in respective frequency portions within each of the one or more OFDM symbols.

11. A first communication device, comprising:

a network interface device having one or more integrated circuits configured to add respective numbers of pre-encoder padding bits to respective sets of information bits corresponding to respective second communication devices to generate respective sets of padded information bits corresponding to the respective second communication devices, wherein the respective numbers of pre-encoder padding bits are determined such that the padded information bits, after being encoded, fill one or more OFDM symbols up to a common boundary within a last OFDM symbol;

encode the respective sets of padded information bits to generate respective sets of coded bits;

generate the one or more OFDM symbols to include (i) the respective sets of coded information bits in an initial portion of the one or more OFDM symbols up to the common boundary within the last OFDM symbol to allow a receiving device to stop decoding the one or more OFDM symbols after decoding the initial portion of the one or more OFDM symbols and (ii) respective numbers of post-encoder padding bits, added to the respective sets of coded bits, in a remaining portion of the one or more OFDM symbols following the common boundary; and generate a physical layer (PHY) data unit to include at least the one or more OFDM symbols.

12. The first communication device of claim 11, wherein the one or more integrated circuits are further configured to for each of the second communication devices, (i) determine a respective initial minimum number of OFDM symbols needed to fit, after being encoded, the set of information bits corresponding to the second communication device, and (ii) determine a respective initial value of a boundary within the last OFDM symbol; and determine a value of the common boundary based at least in part on (i) the determined respective initial numbers of OFDM symbols and (ii) the determined respective initial values of the boundary within the last OFDM symbol.

13. The first communication device of claim 12, wherein the one or more integrated circuits are further configured to for each of the second communication devices, determine a respective excess number of information bits that do not fit in a respective maximum integer number of OFDM symbols that can be entirely filled by the corresponding set of information bits, and determine the initial value of the boundary for a particular second communication device based at least in part on the determined number of excess information bits for the particular second communication device.

14. The first communication device of claim 12, wherein the one or more integrated circuits are configured to for each of the second communication device, determine a respective packet duration based on the corresponding determined initial number of OFDM symbols and the corresponding initial value of the boundary within the last OFDM symbol, select a greatest packet duration of the determined packet durations, and set the value of the common boundary to the initial value of the boundary determined for the second communication device corresponding to the selected greatest packet duration.

15. The first communication device of claim 14, wherein the one or more integrated circuits are configured to determine, based on the initial number of OFDM symbols determined for the communication device corresponding to the selected greatest packet duration, a common number of OFDM symbols for the second communication devices, and generate the one or more OFDM symbols at least by generating the common number of OFDM symbols.

16. The first communication device of claim 15, wherein the one or more integrated circuits are configured to determine the respective numbers of pre-encoder padding bits based at least in part on the common number of the OFDM symbols.

17. The first communication device of claim 11, wherein the one or more integrated circuits are configured to generate the PHY data unit to further include a signal extension field after the data portion of the PHY data unit if the value of the common boundary exceeds a threshold, wherein a duration of the signal extension field is determined based on the value of the common boundary.

18. The first communication device of claim 11, wherein the one or more integrated circuits are further configured to
- generate a signal field to be included in a preamble of the PHY data unit, wherein the signal field includes an indication set to indicate a value of the common boundary within the last OFDM symbol,
- generate the preamble of the PHY data unit to further include the signal field, and
- generate the PHY data unit to further include the preamble.

19. The first communication device of claim 11, wherein the one or more integrated circuits are configured to add the post-encoder padding bits to a particular set of coded bits by repeating Y last coded bits of the particular set of coded bits, wherein Y is a positive integer that corresponds to the number of post-encoder padding bits.

20. The first communication device of claim 11, wherein the one or more integrated circuits are configured to generate the one or more OFDM symbols to include the respective sets of coded information bits in respective frequency portions of the one or more OFDM symbols.

* * * * *